US010932229B2

(12) United States Patent
Lou et al.

(10) Patent No.: US 10,932,229 B2
(45) Date of Patent: Feb. 23, 2021

(54) METHOD AND APPARATUS FOR SUPPORTING COORDINATED ORTHOGONAL BLOCK-BASED RESOURCE ALLOCATION (COBRA) OPERATIONS

(71) Applicant: INTERDIGITAL PATENT HOLDINGS, INC., Wilmington, DE (US)

(72) Inventors: Hanqing Lou, Mineola, NY (US); Ronald G. Murias, Calgary (CA); Xiaofei Wang, Cedar Grove, NJ (US); Nirav B. Shah, San Diego, CA (US); Monisha Ghosh, Chappaqua, NY (US); Guodong Zhang, Syosset, NY (US); Frank La Sita, Setauket, NY (US); Robert L. Olesen, Huntington, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 13/826,402

(22) Filed: Mar. 14, 2013

(65) Prior Publication Data
US 2013/0286959 A1    Oct. 31, 2013

Related U.S. Application Data

(60) Provisional application No. 61/640,219, filed on Apr. 30, 2012, provisional application No. 61/724,438, (Continued)

(51) Int. Cl.
*H04W 72/04* (2009.01)
*H04L 5/00* (2006.01)
(Continued)

(52) U.S. Cl.
CPC ............ *H04W 72/04* (2013.01); *H04L 5/003* (2013.01); *H04L 5/0023* (2013.01); (Continued)

(58) Field of Classification Search
None
See application file for complete search history.

(56) References Cited

U.S. PATENT DOCUMENTS 8,717,957 B2 * 5/2014 Kim ...................... H04L 1/0053
370/311
8,842,606 B2 9/2014 Denteneer et al.
(Continued)

FOREIGN PATENT DOCUMENTS

CN    100393057 C    6/2008
CN    101978644 A    2/2011
(Continued)

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6GHz, IEEE P802.11ac/D2.0 (Jan. 2012).
(Continued)

*Primary Examiner* — Christopher M Crutchfield
*Assistant Examiner* — Alan L Lindenbaum
(74) *Attorney, Agent, or Firm* — Volpe Koenig

(57) ABSTRACT

A method and apparatus may be configured to support coordinated orthogonal block-based resource allocation (COBRA) operations. An access point (AP) may be configured to indicate to a plurality of stations (STA)s that it may support COBRA. Each WTRU may be configured to indi-
(Continued)

cate to the AP that it can support COBRA as well. The AP may be configured to transmit a COBRA controller information element (IE) comprising a plurality of fields to each of the WTRUs. Each WTRU may be configured to transmit a COBRA controllee IE comprising a plurality of fields. STA grouping management, group maintenance, channel access, beamforming, sounding and frequency and synchronization procedures are also described.

6 Claims, 36 Drawing Sheets

Related U.S. Application Data filed on Nov. 9, 2012, provisional application No. 61/751,453, filed on Jan. 11, 2013.

(51) Int. Cl.
*H04W 74/00* (2009.01)
*H04L 27/26* (2006.01)

(52) U.S. Cl.
CPC ........ *H04L 5/0055* (2013.01); *H04L 27/2602* (2013.01); *H04W 74/006* (2013.01); *H04L 5/0048* (2013.01)

(56) References Cited

U.S. PATENT DOCUMENTS

| | | | |
|---|---|---|---|
| 2003/0174690 A1* | 9/2003 | Benveniste | 370/350 |
| 2005/0141448 A1* | 6/2005 | Bolinth et al. | 370/329 |
| 2005/1411448 | 6/2005 | Bolinth et al. | |
| 2006/0007885 A1* | 1/2006 | Pollack | H04L 27/2602 370/328 |
| 2006/0034219 A1 | 2/2006 | Gu et al. | |
| 2007/0258384 A1* | 11/2007 | Sammour et al. | 370/252 |
| 2010/0008318 A1 | 1/2010 | Wentink et al. | |
| 2010/0046453 A1 | 2/2010 | Knowles et al. | |
| 2010/0046457 A1 | 2/2010 | Abraham et al. | |
| 2010/0329195 A1 | 12/2010 | Abraham et al. | |
| 2010/0329236 A1 | 12/2010 | Sampath et al. | |
| 2011/0002219 A1 | 1/2011 | Kim et al. | |
| 2011/0038332 A1* | 2/2011 | Liu | H04L 1/1685 370/329 |
| 2011/0044298 A1 | 2/2011 | Wentink et al. | |
| 2011/0096796 A1 | 4/2011 | Zhang et al. | |
| 2011/0110349 A1 | 5/2011 | Grandhi | |
| 2011/0110351 A1* | 5/2011 | Seok | H04W 4/20 370/338 |
| 2011/0194475 A1 | 8/2011 | Kim et al. | |
| 2011/0261708 A1* | 10/2011 | Grandhi | 370/252 |
| 2012/0026928 A1 | 2/2012 | Gong et al. | |
| 2012/0230242 A1 | 9/2012 | Kim et al. | |
| 2013/0155982 A1 | 6/2013 | Gaal et al. | |

FOREIGN PATENT DOCUMENTS

| | | |
|---|---|---|
| JP | 2012-500595 A | 1/2012 |
| JP | 2013-509105 A | 3/2013 |
| JP | 2013-526153 A | 6/2013 |
| WO | WO 2010/022091 A1 | 2/2010 |
| WO | WO 2011/025769 A1 | 3/2011 |
| WO | WO 2011/050320 A1 | 4/2011 |
| WO | WO 2011/065743 A2 | 6/2011 |
| WO | WO 2011/093668 A2 | 8/2011 |
| WO | WO 2011/130344 A1 | 10/2011 |
| WO | WO 2011/132847 A1 | 10/2011 |
| WO | 2012044863 A1 | 4/2012 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D1.06 (Mar. 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-REVmb/D12 (Nov. 2011).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.4.0 (Dec. 2011).

Third Generation Partnership Project, "Technical Specification Group Radio Access Network; Evolved Universal Terrestrial Radio Access (E-UTRA); Physical Channels and Modulation (Release 10)," 3GPP TS 36.211 V10.7.0 (Feb. 2013).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.2.0 (Feb. 2013).

IEEE Standard for Information technology—Telecommunications and information exchange between systems—Local and metropolitan area networks—Specific requirements; Part 11: Wireless LAN Medium Access control (MAC) and Physical Layer (PHY) Specifications; Amendment 8: IEEE 802.11 Wireless Network Management, IEEE Std 802.11v 2011, (Feb. 2011).

Giuseppe Bianchi, "Performance Analysis of the IEEE 802.11 Distributed Coordination Function", IEEE Journal on Selected Areas in Communications, vol. 18, No. 3, Mar. 2000.

Draft Standard for Information Technology—Telecommunications and information exchange between systems—Local and metropolitan area networks—Specific requirements, Part 11: Wireless LAN Medium Access Control (MAC) and Physical Layer (PHY) specifications Amendment 3: TV White Spaces Operation, IEEE P802.11af /D1.02, (Jun. 2011).

Draft Standard for Information Technology—Telecommunications and information exchange between systems Local and metropolitan area networks—Specific requirements, Part 11: Wireless LAN Medium Access Control (MAC) and Physical Layer (PHY) specifications, Amendment 6: Sub 1 GHz License Exempt Operation, IEEE P802.11ah D0.1, (May 2013).

Nee et al., "UL MU-MIMO for 11ac", Qualcomm, Document No. IEEE 802.11-09/0852-00-00ac, Jul. 2009, 10 pages.

Zhang et al., "Revisit 2MHz SIG Field", Document No. IEEE 802.11-12/0308r1, Mar. 2012, 13 pages.

Park, "Proposed Specification Framework for TGah," IEEE P802.11 Wireless LANs, IEEE 802.11-11/1137r6 (Mar. 12, 2012).

Stacey et al., "Specification Framework for TGac," IEEE P802.11 Wireless LANs, IEEE 802.11-09/0992r21 (Jan. 19, 2011).

* cited by examiner

800

| 802 | 804 | 806 | 808 | 810 | 812 | 814 | 816 818 | 820 |
|---|---|---|---|---|---|---|---|---|
| B0 B1 B2 | B3 B4 | B5 | B6 | B7 B8 B10 B11 | B10 B11 | B12 | B13 B15 |
| MAXIMUM MPDU LENGTH | SUPPORTED CHANNEL WIDTH SET | Rx LDPC | SHORT GI FOR 80 MHz | SHORT GI FOR 160 AND 80+80 MHz | Tx STBC | Rx STBC | SU BEAM-FORMER CAPABLE | SU BEAM-FORMEE CAPABLE | COMPRESSED STEERING NUMBER OF BEAMFORMER ANTENNAS SUPPORTED |

BITS: 2 2 1 1 1 1 3 1 1 3

| 822 | 824 | 826 | 828 | 830 | 832 | 834 | 836 | 838 | 840 | 842 |
|---|---|---|---|---|---|---|---|---|---|---|
| B16 B18 | B19 | B20 | B21 | B22 | B23 B25 | B25 B26 B27 | B28 | B29 | B30 | B31 |
| NUMBER OF SOUNDING DIMENSIONS | MU BEAM-FORMER CAPABLE | MU BEAM-FORMEE CAPABLE | VHT TXOP PS | +HTC-VHT CAPABLE | MAX A-MPDU LENGTH EXPONENT | VHT LINK ADAPTATION CAPABLE | Rx ANTENNA PATTERN CONSISTENCY | Tx ANTENNA PATTERN CONSISTENCY | E-VHT CAPABLE | E-VHT ENHANCED FEEDBACK SUPPORTED |

BITS: 2 1 1 1 1 3 3 1 1 1 1

FIG. 8

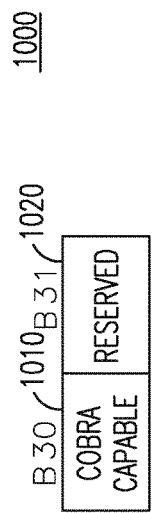
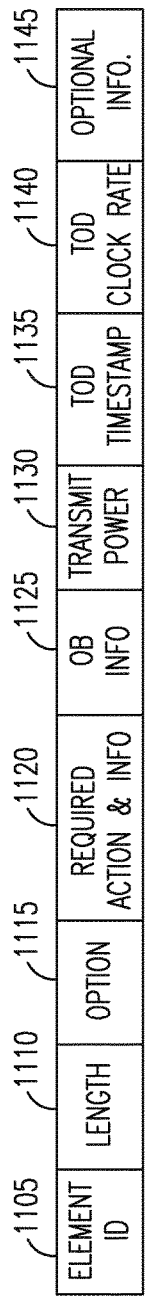
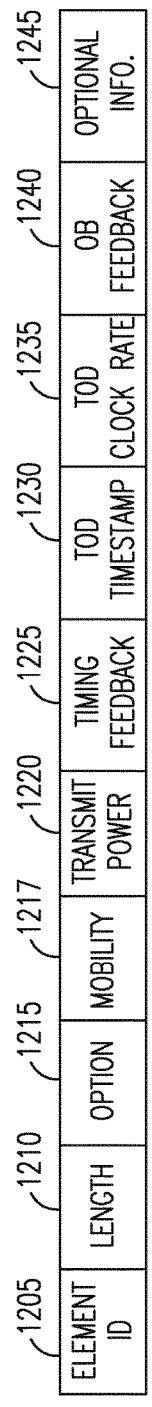
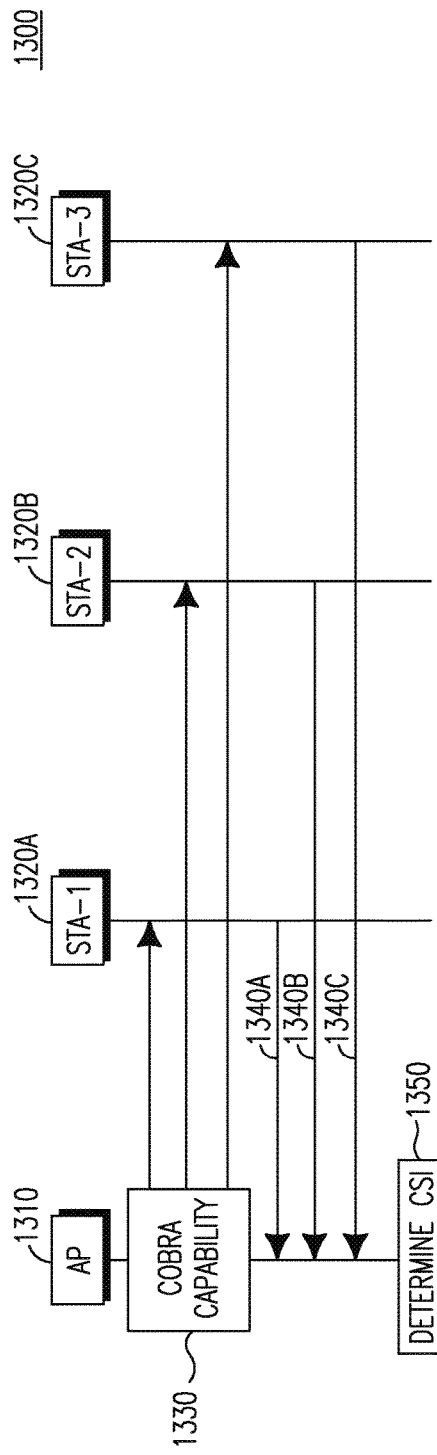
FIG. 10
FIG. 11
FIG. 12
FIG. 13

FIG. 23

| B16 | B18 | B19 | B20 | B21 | B22 | B23 | B25 B26 | B27 | B28 | B29 | B30 | B31 |
|---|---|---|---|---|---|---|---|---|---|---|---|---|
| NUMBER OF SOUNDING DIMENSIONS | Mu-BEAMFORMER CAPABLE | Mu-BEAMFORMEE CAPABLE | VHT TXOP PS | +HTC-VHT CAPABLE | MAXIMUM A-MPDU LENGTH EXPONENT | VHT LINK ADAPTATION CAPABLE | Rx ANTENNA PATTERN CONSISTENCY | Tx ANTENNA PATTERN CONSISTENCY | COBRA CONTROLLER CAPABLE | COBRA CONTROLLEE CAPABLE |
| 2310 | 2315 | 2320 | 2325 | 2330 | 2335 | 2340 | 2345 | 2350 | 2355 | 2360 |

| ORDER | INFORMATION |
|---|---|
| 1 | CATEGORY |
| 2 | VHT/E-VHT ACTION |
| 3 | COBRA MEMBERSHIP STATUS ARRAY |
| 4 | COBRA USER POSITION ARRAY |
| 5 | COBRA OPTIONS |

2400
— 2410
— 2420
— 2430
— 2440
— 2450

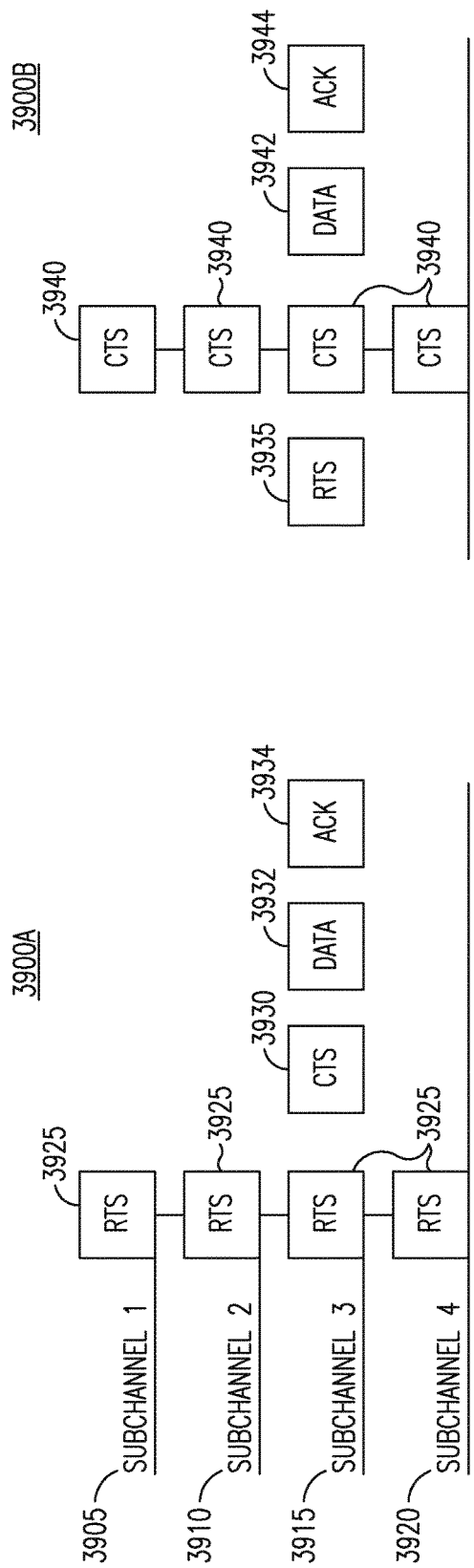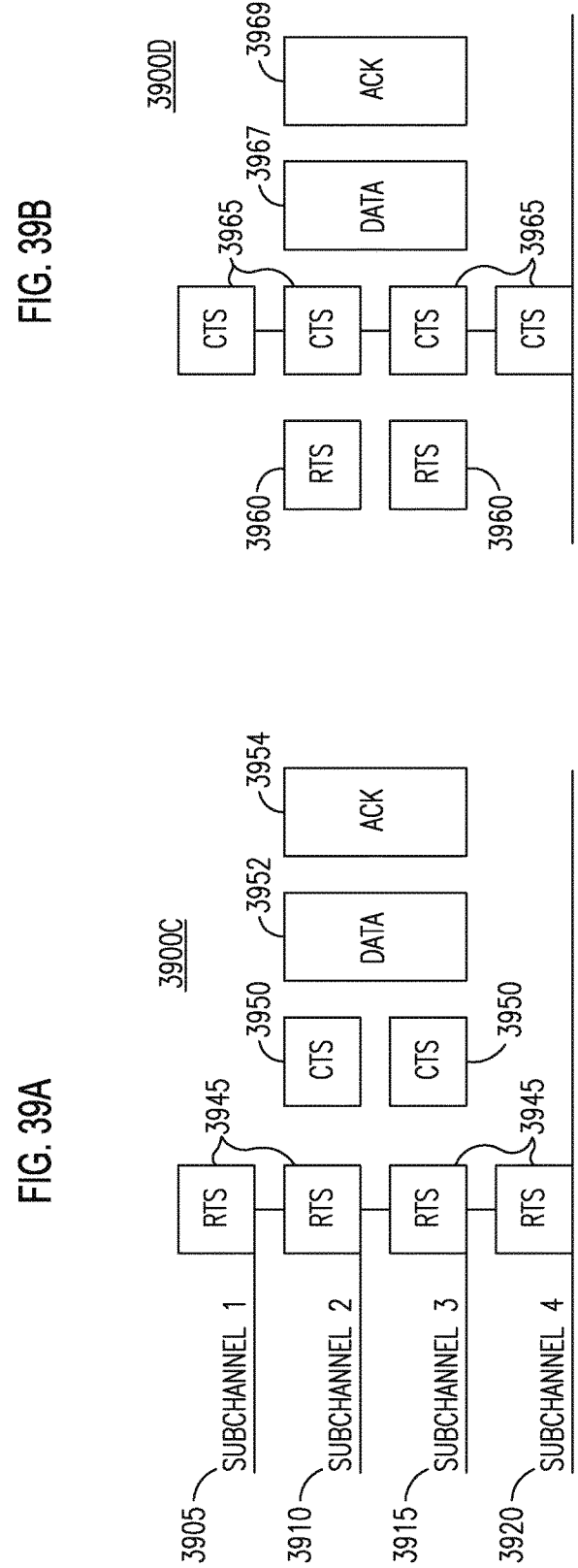

4200

| LENGTH | NSTS | GROUP ID | SHORT GI | ASSIGNMENT SEQENCE |
|---|---|---|---|---|
| 4210 | 4220 | 4230 | 4240 | 4250 |

| MCS | STBC | FEC CODING | BEAMFORMED | CRC |
|---|---|---|---|---|
| 4310 | 4320 | 4330 | 4340 | 4350 |

FIG. 43

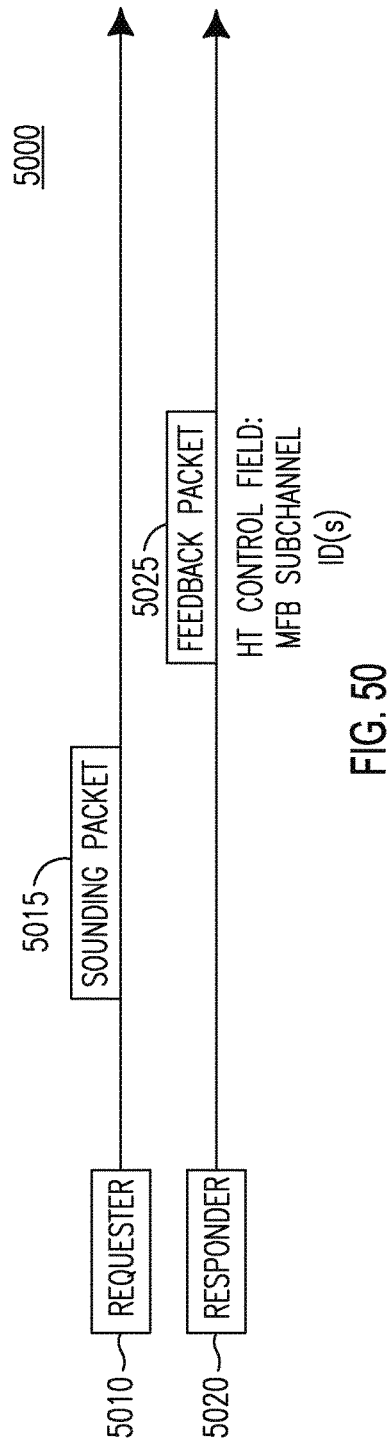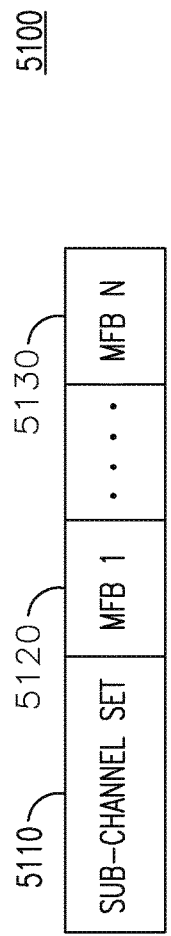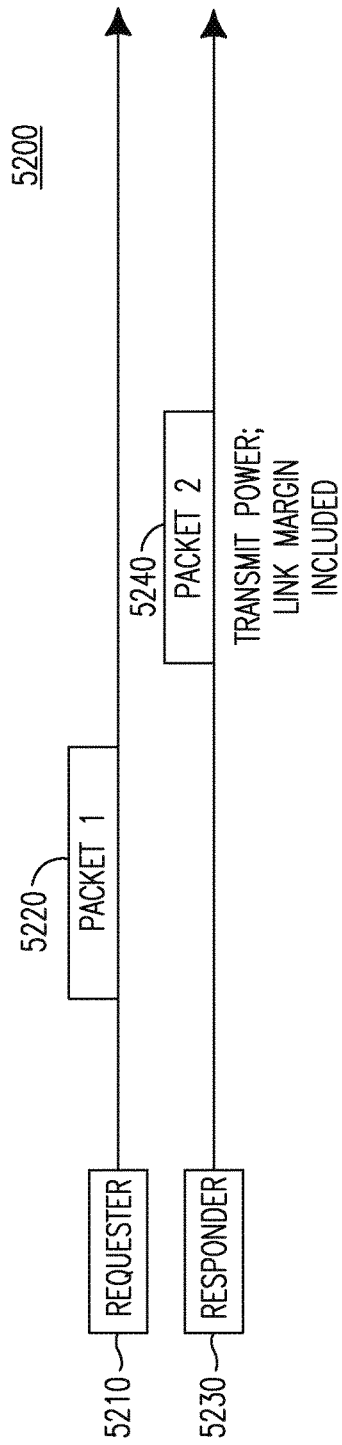
FIG. 50
FIG. 51
FIG. 52

METHOD AND APPARATUS FOR SUPPORTING COORDINATED ORTHOGONAL BLOCK-BASED RESOURCE ALLOCATION (COBRA) OPERATIONS

CROSS REFERENCE TO RELATED APPLICATIONS

This application claims the benefit of U.S. provisional application No. 61/640,219 filed on Apr. 30, 2012, U.S. provisional application No. 61/724,438 filed on Nov. 9, 2012, and U.S. provisional application No. 61/751,453 filed on Jan. 11, 2013, the contents of which are hereby incorporated by reference.

BACKGROUND

A wireless local area network (WLAN) in an infrastructure basic service set (BSS) mode may include an access point (AP) for the BSS and one or more stations (STAs), (i.e., wireless transmit/receive units (WTRUs)), associated with the AP. The AP may have access to or interface with a distribution system (DS) or another type of wired/wireless network that may carry traffic in and out of the BSS. Traffic to STAs that originates from outside the BSS may arrive through the AP and may be delivered to the STAs. Traffic originating from STAs to destinations outside the BSS may be transmitted to the AP to be delivered to the respective destinations. Traffic between STAs within the BSS may also be transmitted through the AP, where the source STA may transmit traffic to the AP, and the AP may deliver the traffic to the destination STA. Such traffic between STAs within a BSS may be referred to as peer-to-peer traffic. Such peer-to-peer traffic may also be transmitted directly between the source and destination STAs with a direct link setup (DLS) using an IEEE 802.11e DLS or an IEEE 802.11z tunneled DLS (TDLS). A WLAN in an independent BSS (IBSS) mode may not include an AP, and thus the STAs may communicate directly with each other. This mode of communication may be referred to as an "ad-hoc" mode of communication.

In IEEE 802.11 infrastructure mode of operation, the AP may transmit a beacon on a fixed channel referred to as the primary channel. The primary channel may be 20 MHz wide and may be the operating channel of the BSS. The primary channel may also be used by the STAs to establish a connection with the AP. The channel access mechanism in an IEEE 802.11 system may be carrier sense multiple access with collision avoidance (CSMA/CA). In this mode of operation, every STA, including the AP, may sense the primary channel. If the channel is detected to be busy, the STA may back off. Hence, only one STA may transmit at any given time in a given BSS.

SUMMARY

A method and apparatus may support coordinated orthogonal block-based resource allocation (COBRA) operations. An access point (AP) may be configured to indicate to a plurality of wireless transmit/receive units (WTRUs) that the AP may support COBRA. A WTRU may also be referred to as a station (STA), a non-AP STA, or a user. Each WTRU may be configured to indicate to the AP that the WTRU may support COBRA as well. The AP may be configured to transmit a COBRA controller information element (IE) comprising a plurality of fields to each of the WTRUs. Each WTRU may be configured to transmit a COBRA controllee IE comprising a plurality of fields. User grouping management, group maintenance, channel access, beamforming, sounding and frequency and synchronization procedures may be modified to support COBRA operations.

BRIEF DESCRIPTION OF THE DRAWINGS

A more detailed understanding may be had from the following description, given by way of example in conjunction with the accompanying drawings wherein:

FIG. 8 is a diagram of an example E-VHT capabilities information field;

FIG. 10 is a diagram of an example very high throughput (VHT) capabilities information field configured to support COBRA;

FIG. 11 is a diagram of an example COBRA controller IE;

FIG. 12 is a diagram of another example of the COBRA controllee IE;

FIG. 13 is a diagram of an example grouping information acquisition procedure;

FIG. 23 is a diagram of an example VHT capabilities information field;

FIG. 24 is a diagram of an example COBRA group ID management frame;

FIG. 39A is a diagram of an example request to send (RTS)/clear to send (CTS) protection mechanism for asymmetrical communications;

FIG. 39B is a diagram of another example RTS/CTS protection mechanism for asymmetrical communications;

FIG. 39C is a diagram of another example RTS/CTS protection mechanism for asymmetrical communications;

FIG. 39D is a diagram of another example RTS/CTS protection mechanism for asymmetrical communications;

FIG. 42 is a diagram of an example O-SIG field;

FIG. 43 is a diagram of an example S-SIG field;

FIG. 50 is a diagram of an example explicit channel quality indicator (CQI) feedback mechanism;

FIG. 51 is a diagram of an example MFB subfield;

FIG. 52 is a diagram of an example implicit CQI estimation procedure;

DETAILED DESCRIPTION

Figure 1A:
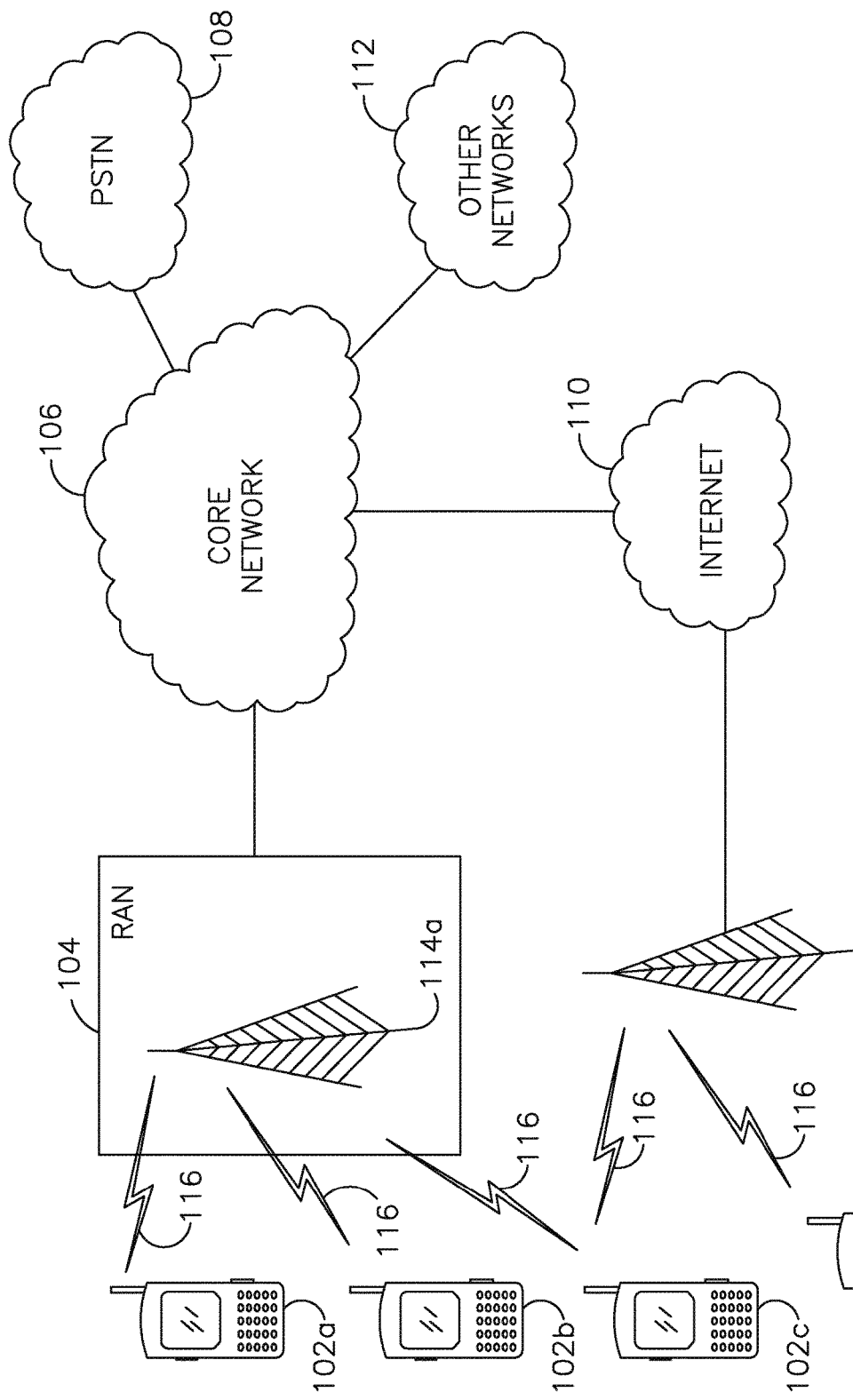
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1×, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
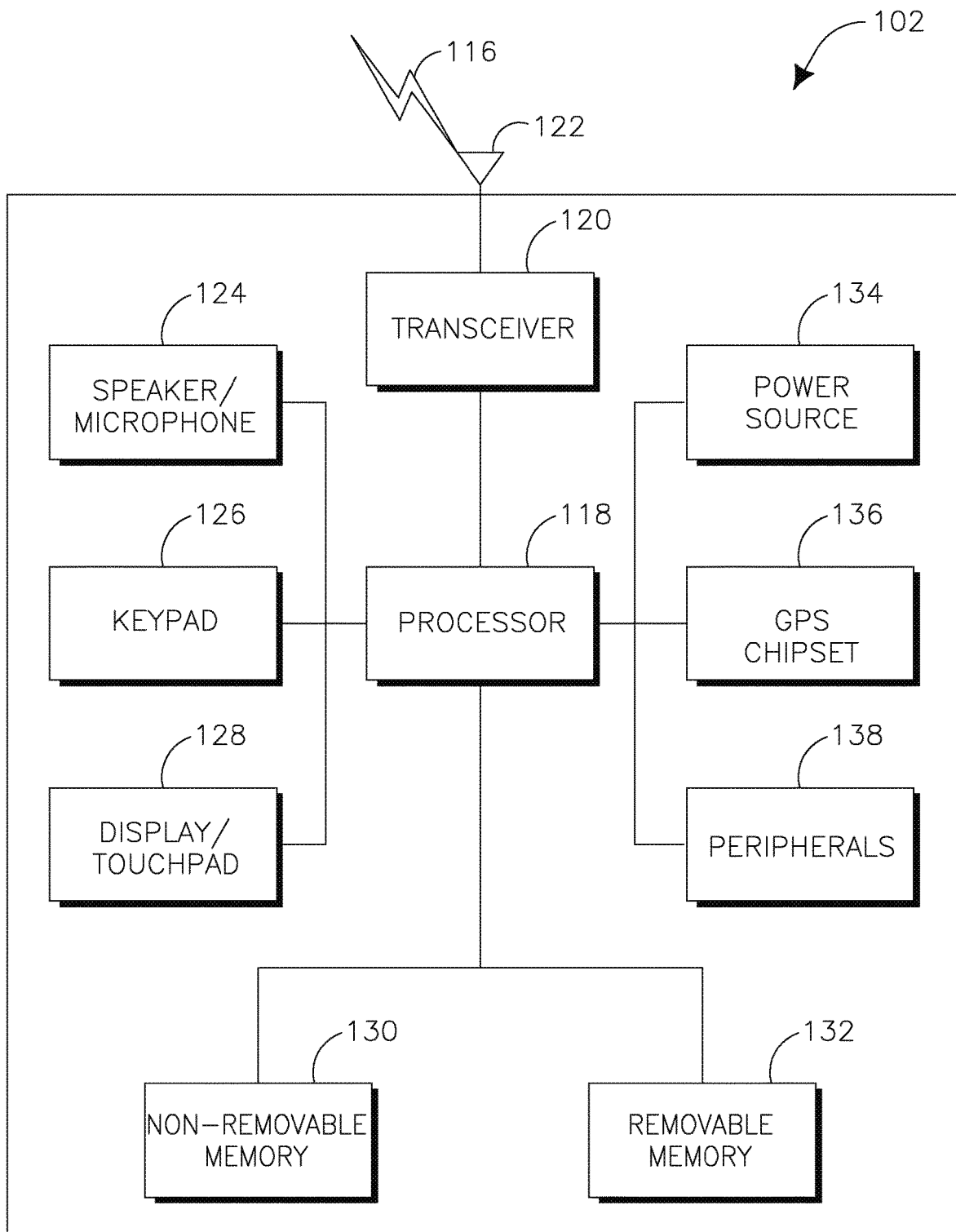
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
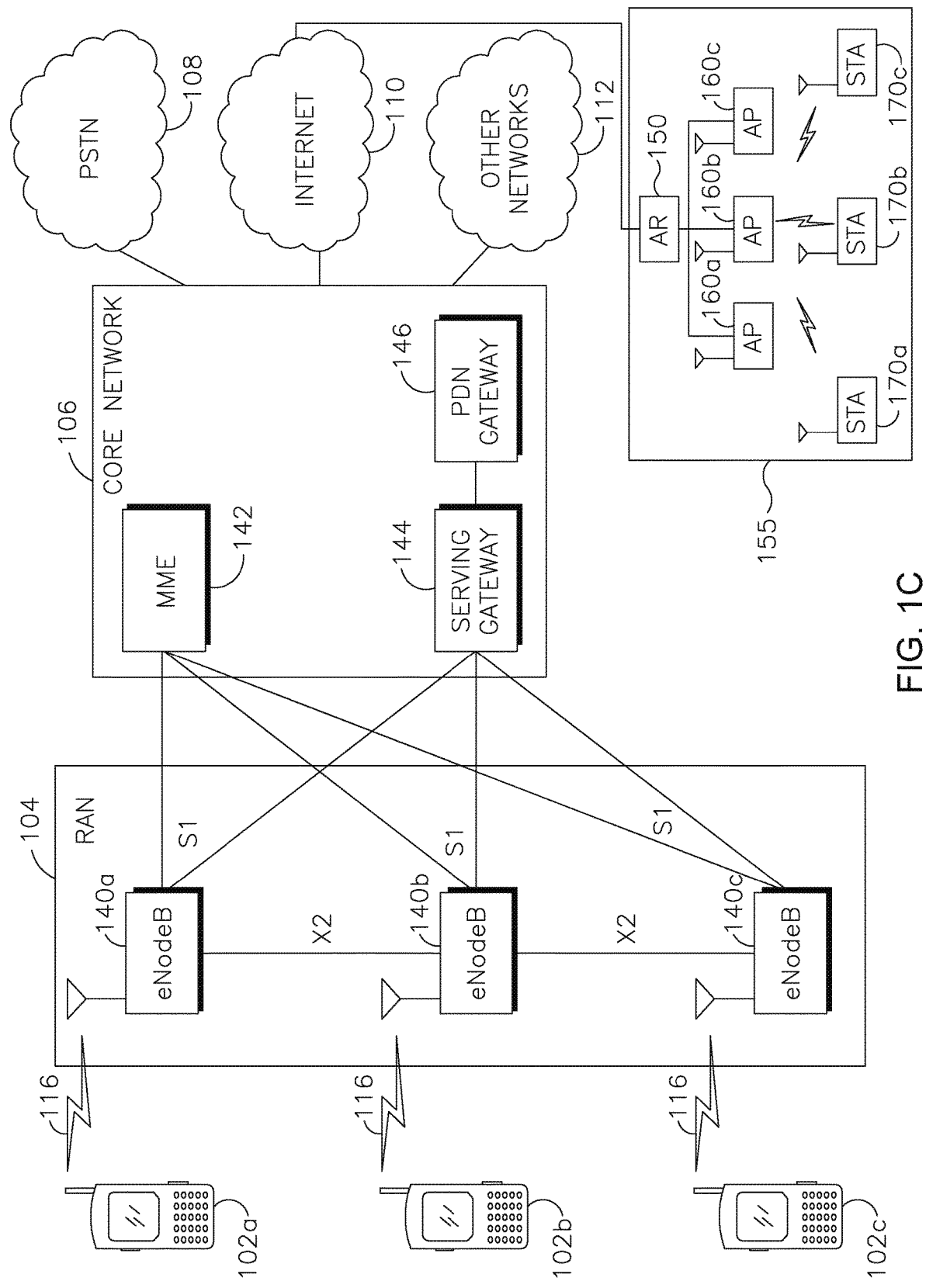
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ E-UTRA radio technology to communicate with the WTRUs 102a, 102b, 102c over the air interface 116.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Herein, the terminology "STA" includes but is not limited to a wireless transmit/receive unit (WTRU), a user equipment (UE), a mobile station, a fixed or mobile subscriber unit, a pager, a cellular telephone, a personal digital assistant (PDA), a computer, a mobile Internet device (MID) or any other type of user device capable of operating in a wireless environment. When referred to herein, the terminology "AP" includes but is not limited to a base station, a Node-B, a site controller, or any other type of interfacing device capable of operating in a wireless environment.

For reference, 802.11n and 802.11ac, may operate in frequencies from 2 to 6 GHz. In 802.11n, high throughput (HT) STAs may use a 40 MHz wide channel for communication. This may be achieved by combining a primary 20 MHz channel with another adjacent 20 MHz channel to form a 40 MHz wide channel. In 802.11ac, very high throughput (VHT) STAs may support 20 MHz, 40 MHz, 80 MHz and 160 MHz wide channels. While 40 MHz and 80 MHz channels are formed by combining contiguous 20 MHz channels, similar to 802.11n, a 160 MHz channel may be formed either by combining 8 contiguous 20 MHz channels or two non-contiguous 80 MHz channels (80+80 configuration). As an example, for the "80+80" configuration, the data, after channel encoding, may be passed through a segment parser that divides it into two streams. Inverse fast Fourier transform (IFFT) and time domain processing may be performed on each stream separately. The streams may then be mapped on to the two channels and the data may be sent out. On the receiving end, this mechanism is reversed and the combined data may be sent to the medium access control (MAC) layer.

Also, the request to send (RTS)/clear to send (CTS) short interframe space (SIFS) may be 16 μs, and the guard interval (GI) may be 0.8 μs. Transmissions from nodes within 100 m may remain within the GI, but beyond 100 m, the delay may be longer than 0.8 μs. At 1 km, the delay may be over 6 μs.

For reference 802.11af and 802.11ah devices may operate in frequencies that are less than 1 GHz. For 802.11af and 802.11ah, the channel operating bandwidths may be reduced as compared to 802.11n and 802.11ac. 802.11af may support 5 MHz, 10 MHz and 20 MHz wide bands in television (TV) white space (TVWS), while 802.11ah may support 1 MHz, 2 MHz, 4 MHz, 8 MHz and 16 MHz in non-TVWS. Some STAs in 802.11ah may be considered to be sensors with limited capabilities and may only support 1 and 2 MHz transmission modes.

In WLAN systems that utilize multiple channel widths, such as 802.11n, 802.11ac, 802.11af, and 802.11ah, there may be a primary channel that may have a bandwidth equal to the largest common operating bandwidth supported by all STAs in the BSS. The bandwidth of the primary channel may be limited by the STA that supports the smallest bandwidth operating mode. In the example of 802.11ah, the primary channel may be 1 or 2 MHz wide if there are one or more STAs that only support 1 and 2 MHz modes while the AP and other STAs in the BSS may support 4 MHz, 8 MHz and 16 MHz operating modes. All carrier sensing, and network allocation vector (NAV) setting may depend on the status on the primary channel. For example, if the primary channel is busy due to an STA, supporting only 1 and 2 MHz operating modes, transmitting to the AP, then the entire available frequency bands may be considered busy even though a majority of them may remain idle and available. In 802.11ah and 802.11af, packets may be transmitted using a clock that is down clocked 4 or 10 times as compared to 802.11ac.

In the United States, the available frequency bands that may be used by 802.11ah are from 902 MHz to 928 MHz. In Korea it is from 917.5 MHz to 923.5 MHz; in Japan it is from 916.5 MHz to 927.5 MHz. The total bandwidth available for 802.11ah may be 6 MHz to 26 MHz, depending on the country code.

To improve spectral efficiency, 802.11ac may implement downlink (DL) multi-user multiple-input multiple-output (MIMO) (MU-MIMO) transmission to multiple STAs in the time frame of a same symbol, for example, during a DL orthogonal frequency division multiplexing (OFDM) symbol. The potential for the use of DL MU-MIMO may be applied to 802.11ah. Since DL MU-MIMO, as it is used in 802.11ac, may use the same symbol timing to multiple STAs, interference of the waveform transmissions to multiple STAs may not be an issue. However, all STAs involved in MU-MIMO transmission with the AP may use the same channel or band, which may limit the operating bandwidth to the smallest channel bandwidth that may be supported by the STA included in the MU-MIMO transmission with the AP.

802.11ac may leverage additional bandwidth than that used in 802.11n to significantly improve the throughput relative to those supported by previous systems based on the 802.11 specifications. Although DL MU-MIMO was introduced in 802.11ac to improve the spectral efficiency, additional improvements are needed to allow for an improved QoS and connection reliability for the user. Methods that allow further improvements in spectral efficiency for 802.11ac and 802.11ah may be implemented.

In one embodiment, a coordinated block-based resource allocation (COBRA) transmission method may be implemented as an alternate method of WLAN medium access. This example method may use a generic sub-carrier based multiple access scheme. The basis for the transmission and coding scheme for COBRA may include multicarrier modulation and filtering, and time, frequency, space, and polarization domains.

COBRA may implement OFDMA sub-channelization, SC-FDMA sub-channelization and filter-bank multicarrier (FBMC) sub-channelization, and may improve the spectral efficiency of OFDM methods used in wireless fidelity (WiFi) systems which have been previously described by 802.11n, 802.11ac, 802.11af, and 802.11ah. These examples and associated embodiments may combine the features of CSMA and orthogonal block based resource allocation methods.

An advantage of these proposed COBRA schemes may be the reduction of the preamble overhead. COBRA may reduce this overhead by transmitting in smaller bandwidth, thus the burst length may be decreased while the system throughput may remain the same. The preamble overhead per burst may be reduced. This may be true for uplink transmission, as well as downlink transmissions.

Figure 2:
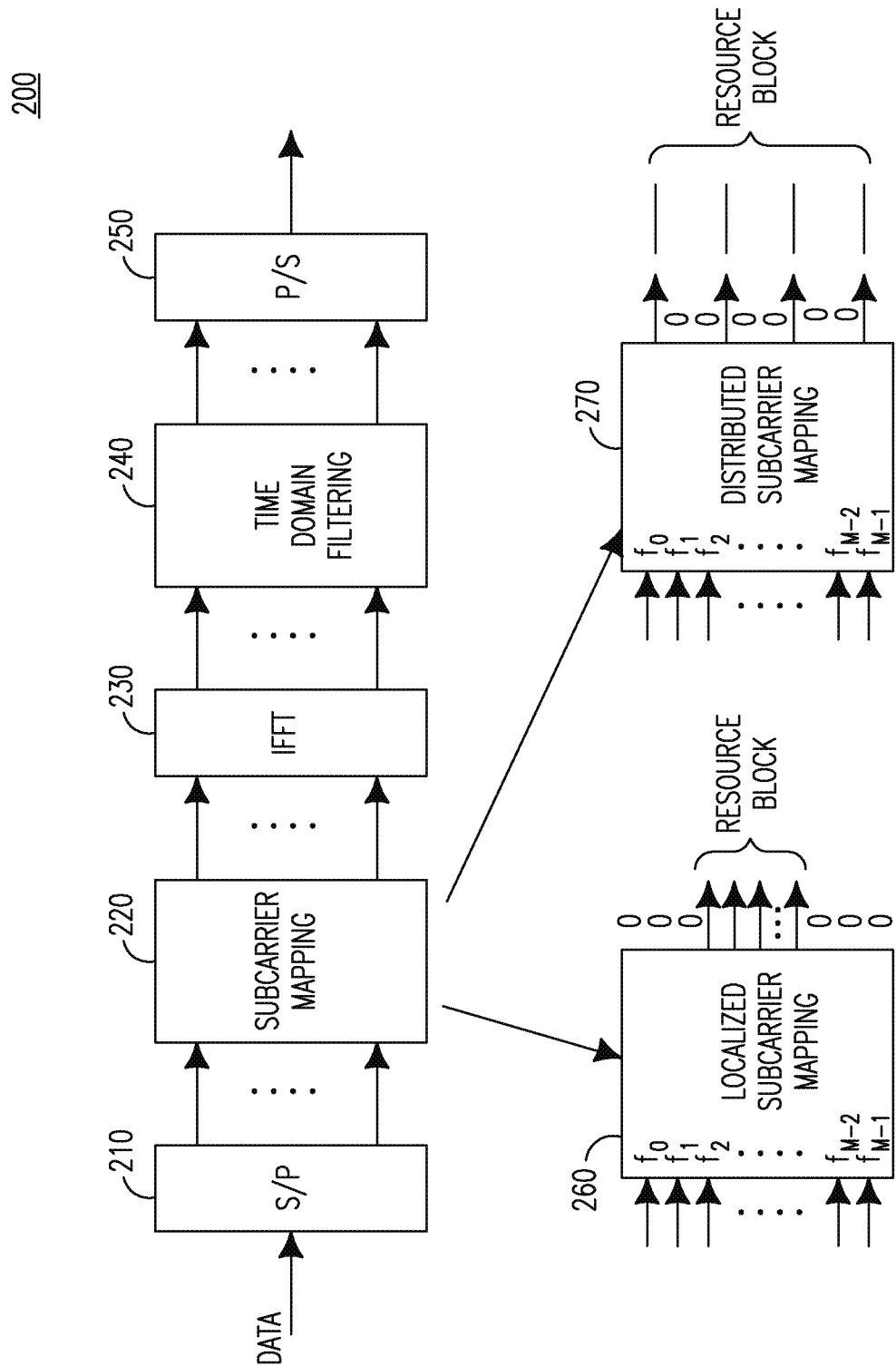
FIG. 2 is a diagram of any example physical layer (PHY) of a coordinated orthogonal block-based resource allocation (COBRA) system that may be configured to perform time and frequency domain filtering.

FIG. 2 is a diagram of an example physical layer (PHY) 200 of a COBRA system that may be configured to perform time and frequency domain filtering. The PHY 200 may include a serial-to-parallel converter (S/P) unit 210, a sub-carrier mapping unit 220, an inverse fast Fourier transform (IFFT) unit 230, a time domain filtering unit 240, and a parallel-to-serial converter (P/S) unit 250. The sub-carrier mapping unit 220 may include a localized sub-carrier mapping unit 260 and/or a distributed sub-carrier mapping unit 270.

The PHY 200 structure may allow for flexible implementations. For example, a sub-channel may be defined as a frequency time resource block, which may include multiple sub-carriers in the frequency domain, and/or time domain. This definition may be applied to the entire packet frame.

A sub-channel may also be defined for sub-carriers that may be allocated in adjacent sub-carriers and may be referred to as localized sub-channel allocation. Alternatively, a sub-channel may include the allocation of non-adjacent sub-carriers and may be referred to as distributed sub-channel allocation.

WiFi systems may not use the concept of a sub-channel. In this embodiment, a sub-channel may enable the allocation of a portion of the time, and/or frequency resource to one or more users in a WiFi system. This embodiment may support sub-channel allocation in a backward compatible manner with the previously described WiFi systems. For example, this embodiment may support the use of sub-channels in a system wherein existing WiFi OFDM transmissions exist without interference. A sub-channel may use existing CSMA procedures defined by the previously noted WiFi systems.

Figure 3:
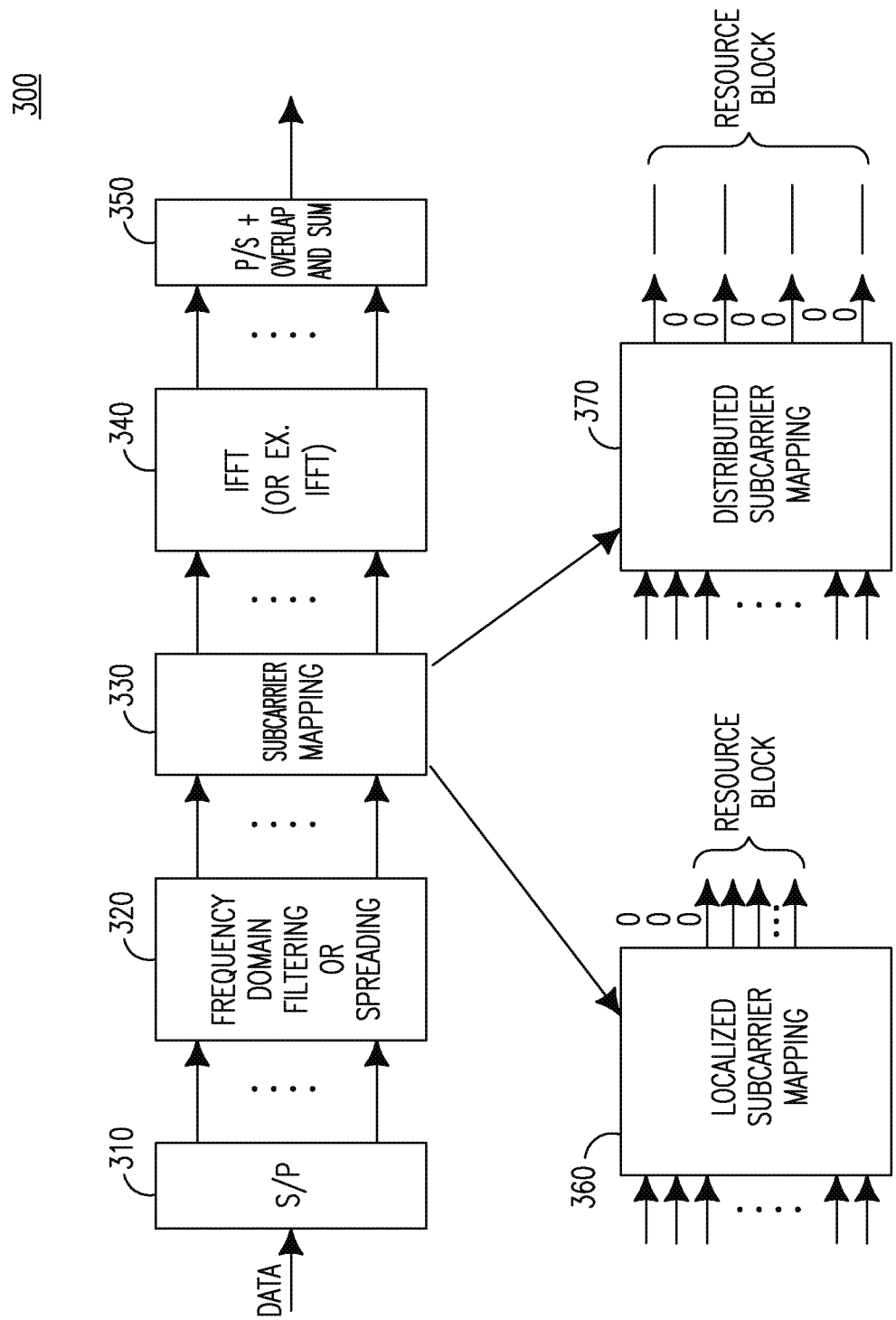
FIG. 3 is a diagram of an example PHY COBRA system configured to perform frequency domain filtering and/or spreading.

FIG. 3 is a diagram of an example PHY COBRA system 300 configured to perform frequency domain filtering and/or spreading. The PHY COBRA system 300 may include an S/P unit 310, a frequency domain filtering or spreading unit 320, a sub-carrier mapping unit 330, an IFFT unit 340, and a P/S+ Overlap and Sum unit 350. The IFFT unit 340 may be an extended IFFT unit, and may include one or more sub-carriers than those supported by the FFT. The P/S+ Overlap and Sum unit 350 may be a filter bank with an overlapping factor K, where a data element may modulate 2K−1 carriers. In this example, K consecutive IFFT outputs may overlap in the time domain. The filter bank output may be provided by an overlap and sum operation over the K outputs in the time domain. The sub-carrier mapping unit 330 may include a localized sub-carrier mapping unit 360 and/or a distributed sub-carrier mapping unit 370.

The COBRA scheme may provide a mechanism to transmit signals with different functionality in a more efficient, and flexible way. For example, typical WLAN systems may use management frames, control frames and data frames. Basic management frames include beacon frames, association and reassociation request frames, association and reassociation response frames, disassociation frames, probe request frames, probe response frames, authentication frames, deauthentication frames, action and action no positive acknowledgement (ACK) frames, and the like. Basic control frames include request-to-sent (RTS) frames, clear-to-send (CTS) frames, ACK frames, block ACK request (BAR) frames, Multi-traffic identifier (TID) BAR frames, block ACK (BA) frames, Multi-TID BA frames, packet switched (PS)-Poll frames, contention free (CF)-end and CF-end+CF-ACK frames, control wrapper frames, and the like.

A COBRA capable AP may cooperate and arrange a COBRA transmission that may convey different types of frames on different sub-channels. Example logical sub-channels that may be used for COBRA transmission may include, but are not limited to, a UL random access channel, a sounding channel, a feedback channel, an ACK channel, a broadcast channel, and a data channel. Sub-channelization may be predefined by a standard or determined by the WLAN system. In general, localized sub-channelization and distributed sub-channelization may be utilized.

In a UL random access channel example, the AP may assign one or more sub-channels for uplink random access. The random access channel may be shared by multiple STAs simultaneously, while each STA may utilize its pre-assigned or randomly determined random access sequence. The random access channel may be utilized for the purpose of UL time/frequency synchronization, power control, bandwidth request, and initial access. For example, the STA may use an uplink random access channel for a PS-poll, an RTS frame, and/or a probe request frame. In this example, once the random access channel is assigned, the STAs may use it for certain UL frames. For example, STA1 may transmit a PS-poll frame to the AP using the random access channel, while STA2 may transmit an RTS frame on the random access channel simultaneously. STA3 may transmit a Prob Request frame on the random access channel. STA1, STA2, and STA3 may utilize different random access sequences, so that the AP may distinguish them. The AP may arrange a random access channel periodically or it may be arranged based on one or more system requirements. For example, there may be several devices that have uplink traffic to transmit, and the AP may not have a long queue buffered in the system. In this example the AP may arrange one or more random access channels to request from STAs whether they have uplink traffic to transmit.

In a sounding channel example, the AP may assign one or more sub-channels for sounding. Sounding may be utilized for beamforming/precoding training, signal-to-noise ratio (SNR) measurement, and the like. Sounding on one or more sub-channels may be more efficient when the STA is known to perform transmission on the one or more sub-channels. The structure of the sounding channel may follow the normal sounding frame defined for WLANs.

In a feedback channel example, the feedback channel may be utilized for SNR feedback or sounding feedback. The feedback channel may be used for closed loop schemes.

In an ACK channel example, the AP may assign one or more sub-channels for ACK. A delayed ACK or BA may be transmitted on one or more sub-channels. Moreover, the AP may group ACKs for multiple STAs and transmit the ACKs in the one or more assigned ACK channels.

In a broadcast channel example, the AP may assign one or more sub-channels for broadcast information, while the rest of the sub-channel(s) may be utilized for multicast or unicast. In a data channel example, the AP may assign one or more sub-channels for data transmission.

Figure 4:
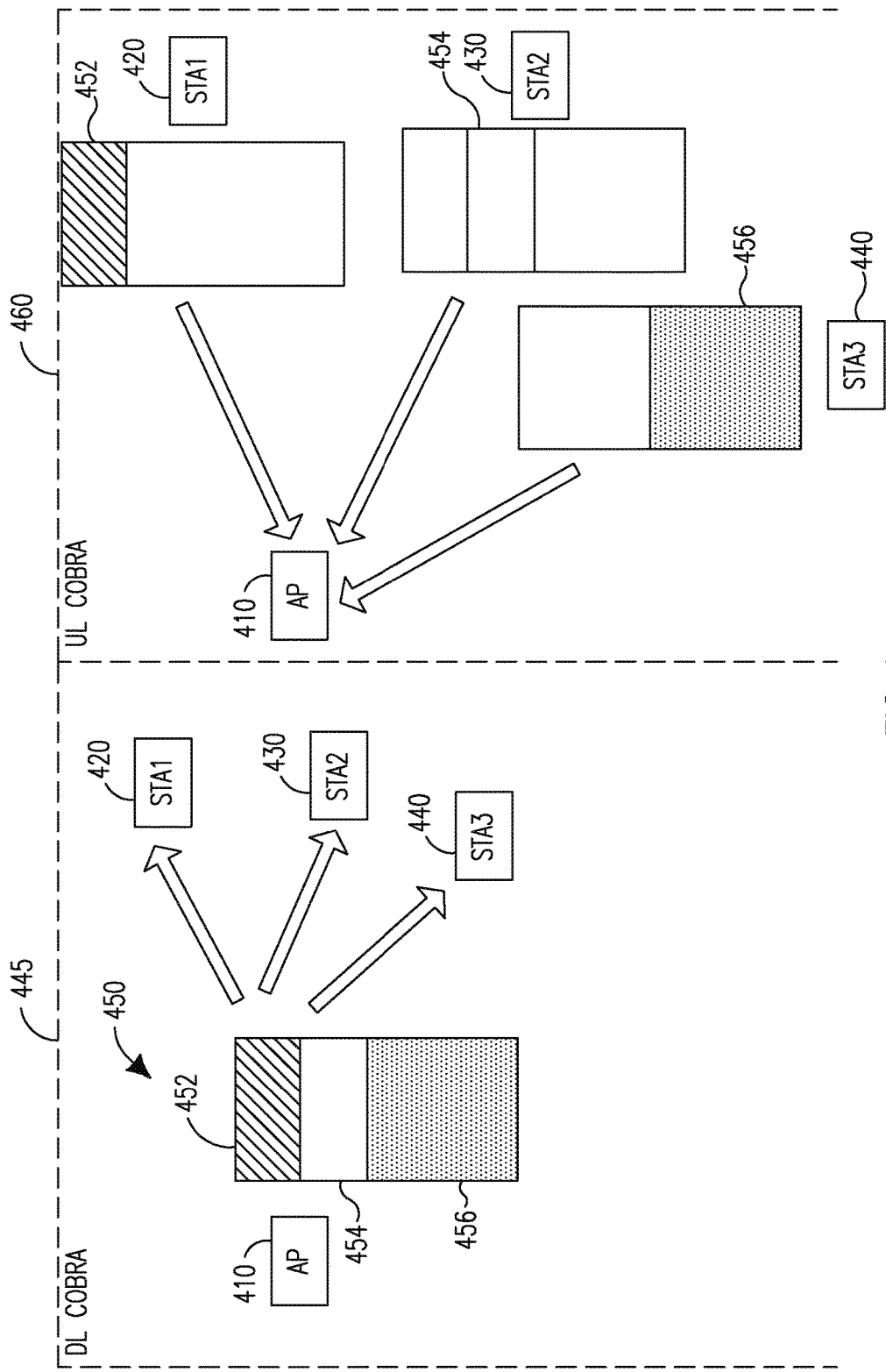
FIG. 4 is a diagram of an example localized COBRA system.

FIG. 4 is a diagram of an example localized COBRA system 400. In this example, the localized COBRA system 400 may include an AP 410, STA-1 420, STA-2 430, and STA-3 440. In a DL COBRA phase 445, the AP 410 may transmit a frame 450 that includes a frequency-time resource 452 for STA-1 420, a frequency-time resource 454 for STA-2 430, and a frequency-time resource 456 for STA-3 440. In a UL COBRA phase 460, STA-1 420 may transmit based on the frequency-time resource 452, STA-2 430 may transmit based on the frequency-time resource 454, and STA-3 440 may transmit based on the frequency-time resource 456.

Figure 5:
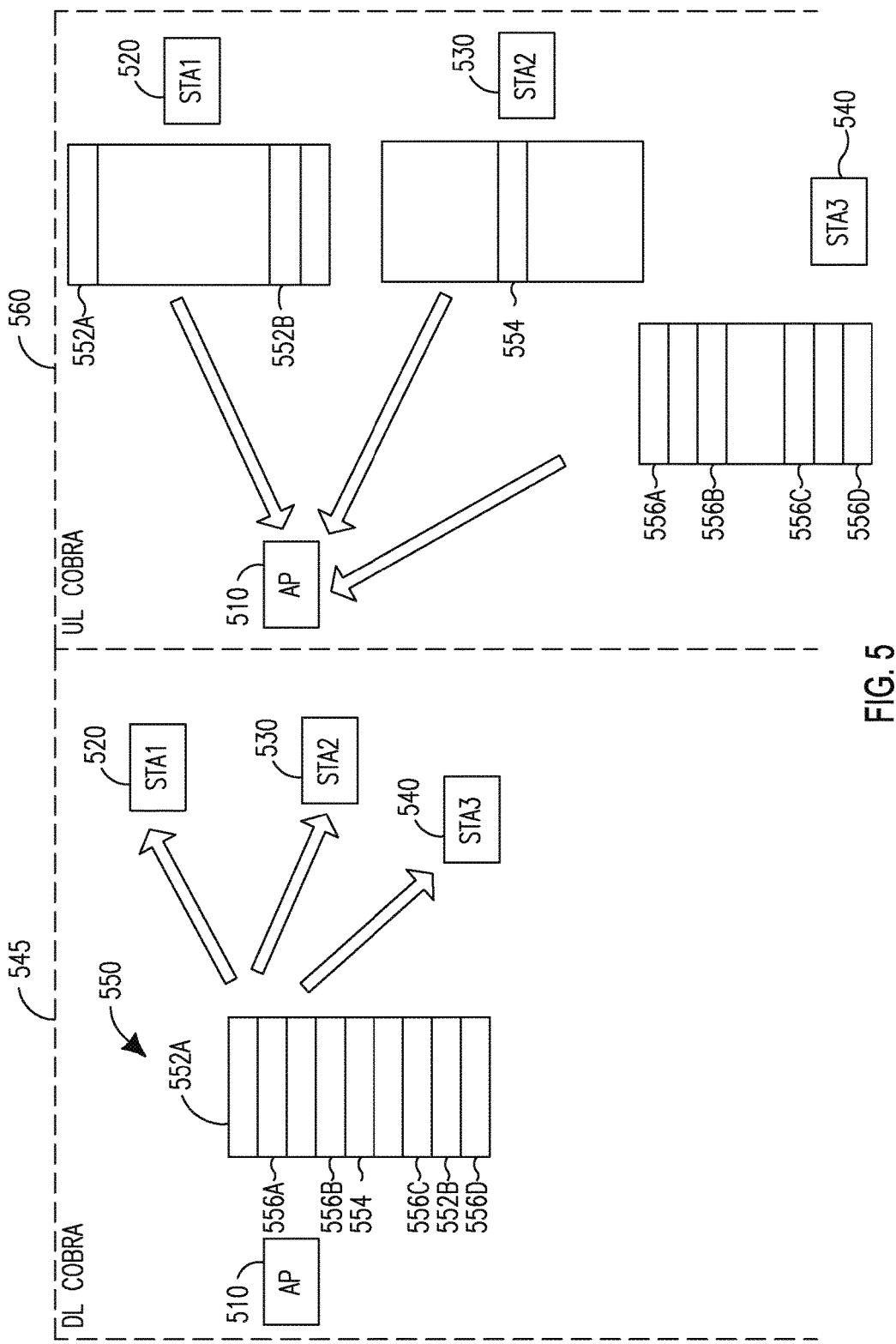
FIG. 5 is a diagram of an example distributed COBRA system.

FIG. 5 is a diagram of an example distributed COBRA system 500. In this example, the distributed COBRA system 500 may include an AP 510, STA-1 520, STA-2 530, and STA-3 540. In a DL COBRA phase 545, the AP 510 may transmit a frame 550 that includes frequency-time resources 552a and 552b for STA-1 520, a frequency-time resources 554 for STA-2 530, and frequency-time resources 556a, 556b, 556c, and 556d for STA-3 540. In a UL COBRA phase 560, STA-1 520 may transmit based on the frequency-time resources 552a and 552b, STA-2 530 may transmit based on the frequency-time resource 554, and STA-3 540 may transmit based on the frequency-time resources 556a, 556b, 556c, and 556d.

Figure 6:
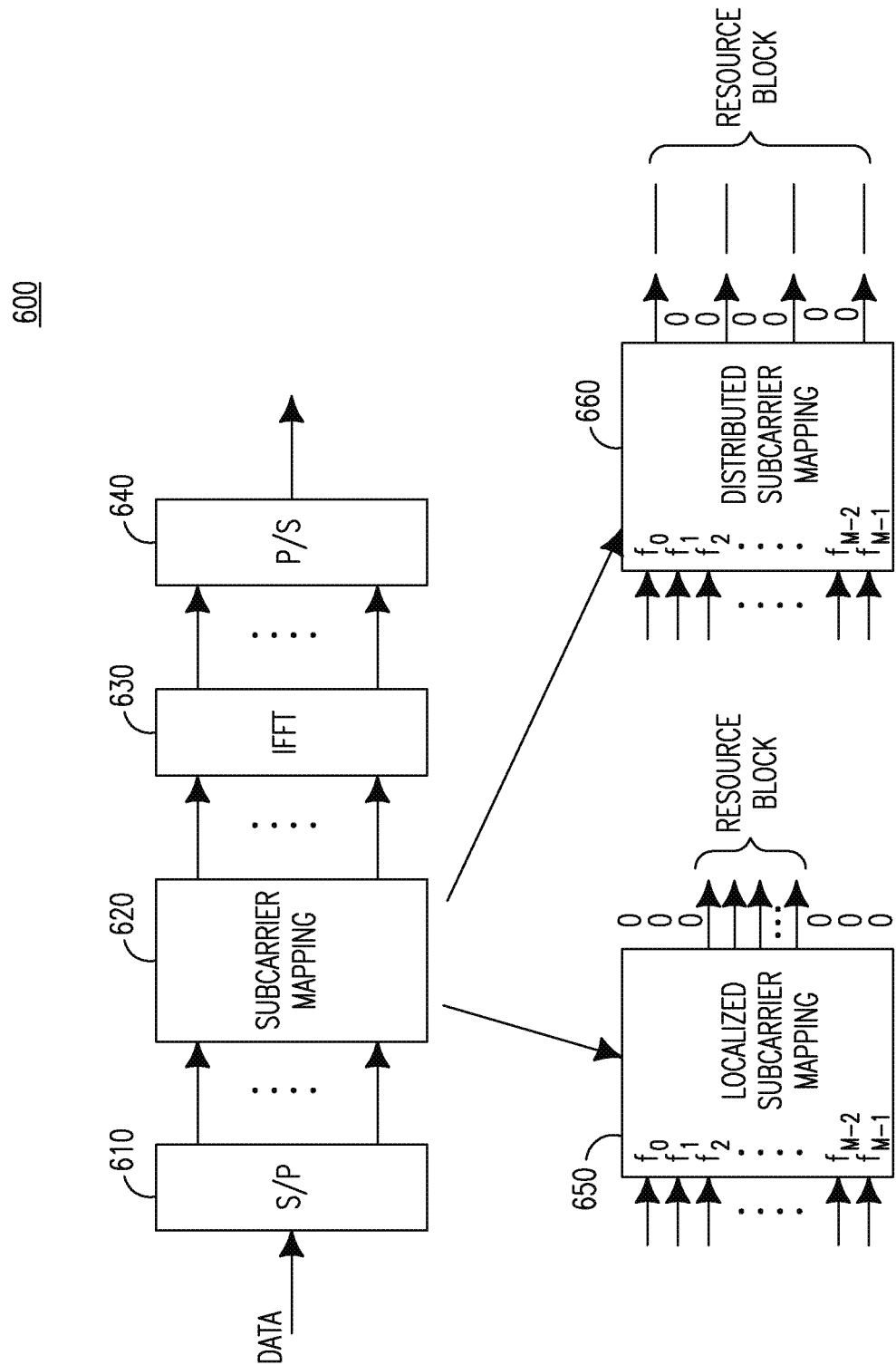
FIG. 6 is a diagram of an example PHY configured to perform orthogonal frequency division multiple access (OFDMA) sub-channelization.

FIG. 6 is a diagram of an example PHY 600 configured to perform orthogonal frequency division multiple access (OFDMA) sub-channelization. OFDMA sub-channelization may be performed by using a portion of a sub-carrier mapping for an allocation to a user. The sub-carrier mapping may be performed in a manner that may allow the allocation of OFDM to others users in the band.

Referring to FIG. 6, the PHY 600 may include an S/P unit 610, a sub-carrier mapping unit 620, an IFFT unit 630, and a P/S unit 640. The sub-carrier mapping unit 620 may include a localized sub-carrier mapping unit 650 and/or a distributed sub-carrier mapping unit 660.

An example COBRA system may utilize OFDMA sub-channelization. This example may use PHY configured for enhanced very high throughput (E-VHT) communications.

Figure 7:
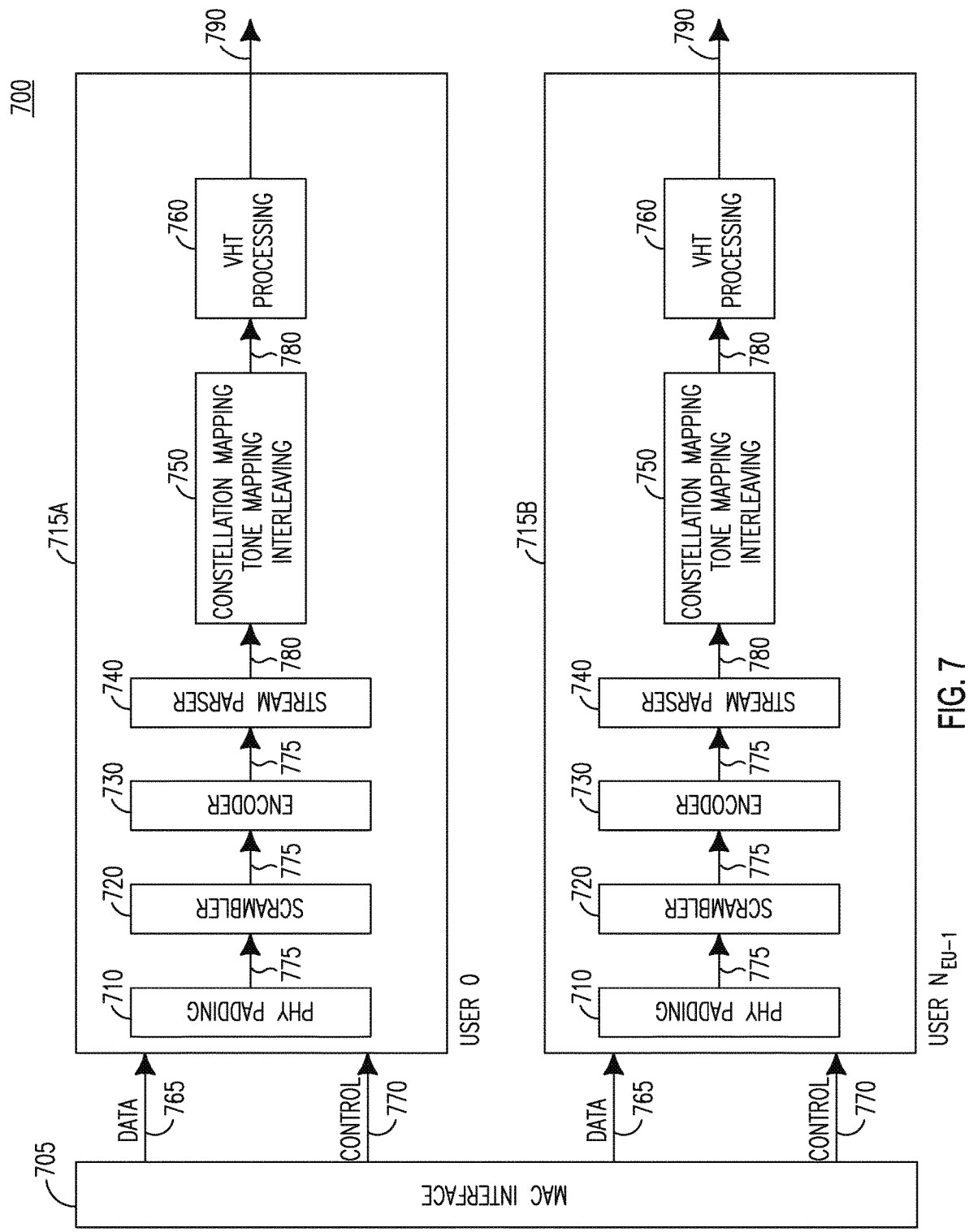
FIG. 7 is a diagram of a transmitter processing unit 700 for a device that may be configured to support E-VHT communications.

FIG. 7 is a diagram of a transmitter processing unit 700 for a device that may be configured to support E-VHT, or similar communications. The transmitter processing unit 700 may include a MAC interface 705, and one or more processing units 715a and 715b. The number of processing units may be based on the number of users in the COBRA system, and each of the users may be assigned a processing unit. Each processing unit 715a and 715b may include a PHY padding unit 710, a scrambler unit 720, an encoder unit 730, a stream parser unit 740, a constellation mapping/tone mapping interleaving unit 750, and a VHT processing unit 760. The PHY padding unit 710 may receive a data stream 765 and control stream 770 from the MAC interface 705 and send an NES data stream 775 to the scrambler unit 720. The scrambler unit 720 may scramble the NES data stream 775 and send it to the encoder unit 730. In one example, the scrambler unit 720 may split the NES data stream 775 into multiple NES data streams. The encoder unit 730 may encode the NES data stream 775 and send it to the stream parser unit 740. The stream parser unit may parse the NES data stream 775 and send one of NSS spatial streams 780 to the constellation mapping/tone mapping interleaving unit 750. The VHT processing unit 760 may convert the NSS spatial streams 780 to NSTS space-time stream 790 for transmission.

In an E-VHT example, the supported bandwidth CH-BANDWIDTH allocated for each user may be similar to that supported by IEEE 802.11ac, for example, 20 MHz, 40 MHz, 80 MHz, 160 MHz, or 80+80 MHz, where 80+80 MHz may refer to discontiguous allocations. The total bandwidth allocated to two users in a COBRA system using an E-VHT PPDU may likewise be limited to the total bandwidth supported by a single user, for example 20 MHz, 40 MHz, 80 MHz, 120 MHz, 160 MHz, 20+20 MHz, 40+40 MHz, or 80+80 MHz, where a plus sign may be an indication of the allocation of discontiguous channels to users. The MAC interface 705 may be modified to specify the total bandwidth allocated by the AP. The user bandwidth allocation may also be specified based on IEEE 802.11ac for user bandwidth allocation, and may be modified to indicate the intended user.

COBRA devices may support backward compatibility by supporting simultaneous E-VHT. In addition, VHT transmit processing may allow simultaneous support for future STAs that may support E-VHT, and IEEE 802.11ac devices that may support VHT processing.

FIG. 8 is a diagram of an example E-VHT capabilities information field 800. The E-VHT capabilities information field 800 may include, for example, a maximum MPDU length subfield 802, a supported channel width set subfield 804, an Rx LDPC subfield 806, a short GI for 80 MHz subfield 808, a short GI for 160 and 80+80 MHz subfield 810, a Tx STBC subfield 812, an Rx STBC subfield 814, an SU beamformer capable subfield 816, an SU beamformee capable subfield 818, a compressed steering number of beamformer antennas supported subfield 820, a number of sounding dimensions subfield 822, an MU beamformer capable subfield 824, an MU beamformee capable subfield 826, a VHT TXOP PS subfield 828, a +HTC-VHT capable subfield 830, a maximum A-MPDU length exponent subfield 832, a VHT link adaptation capable subfield 834, an Rx antenna pattern consistency subfield 836, a Tx antenna pattern consistency subfield 838, an E-VHT capable subfield 840, and an E-VHT enhanced feedback supported subfield 842. The bit positions B30, and B31, may provide new fields applicable for STAs that may support the E-VHT.

An E-VHT STA may notify the AP that it is an E-VHT STA by transmitting an E-VHT capabilities element to the AP using an E-VHT capabilities information field in a management information element. For example, the E-VHT capable subfield 840 may indicate support for E-VHT signaling, receiver procedures, and/or OFDMA scheduling. The E-VHT capable subfield 840 may be set to 1 if the STA is either E-VHT capable, or is enabled to support E-VHT capabilities. The E-VHT enhanced feedback supported subfield 842 may indicate support for OFDMA enhanced feedback methods, for example, it may indicate enhanced channel state feedback support to enable downlink cooperative transmission methods. The E-VHT enhanced feedback supported subfield 842 may be set to 1 if the STA supports enhanced feedback. The E-VHT enhanced feedback supported subfield 842 may be set to 0 of the STA does not support enhanced feedback. Alternatively, the E-VHT enhanced feedback supported subfield 842 may be reserved if the STA does not support E-VHT capabilities.

Figure 9:
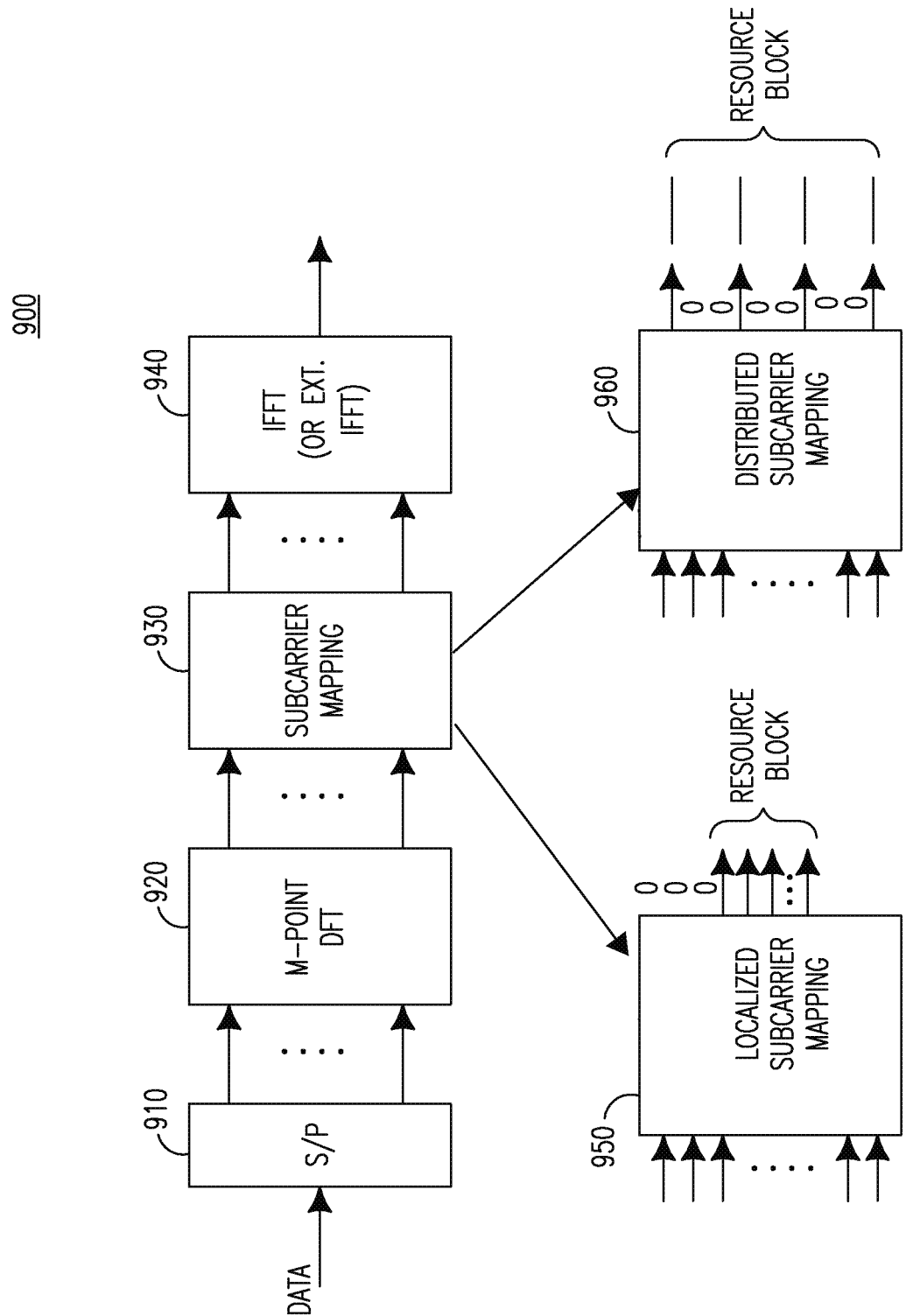
FIG. 9 is a diagram of an example PHY configured to perform single carrier frequency division multiple access (SC-FDMA) sub-channelization.

FIG. 9 is a diagram of an example PHY 900 configured to perform single carrier frequency division multiple access (SC-FDMA) sub-channelization. The PHY 900 may include, an S/P unit 910, an m-point discrete Fourier transform (DFT) unit 920, a sub-carrier mapping unit 930, and an IFFT unit 940. The IFFT unit 940 may be an extended IFFT unit, and may include one or more sub-carriers than those supported by the FFT. The sub-carrier mapping unit 930 may include a localized sub-carrier mapping unit 950 and/or a distributed sub-carrier mapping unit 960.

SC-FDMA sub-channelization may be performed by the use of DFT spreading in the frequency domain before the application of an IDFT/IFFT. This scheme may allow the simultaneous orthogonal transmission of SC-FDMA between APs and STAs, and may reduce peak-to-average power ratio (PAPR) afforded by SC-FDMA. Localized sub-channelization and/or distributed sub-channelization may be utilized by this embodiment as well.

COBRA devices may use filter-bank multi-carrier (FBMC) transmissions, and may include the use of offset quadrature amplitude modulation (OQAM)/orthogonal frequency division multiplexing (OFDM).

In some WiFi systems, for example in 802.11ah, coverage range may be a problem. Detection of a STAs at the edge of the coverage area of the AP may be difficult when the coverage range requirement is large. COBRA may be used to improve the connection quality between STAs and APs, depending on the conditions involved. For example, if a node is near the edge of the AP range, reduction of the number of sub-carriers in use may be coupled with an increase in transmit power, and may result in a better connection. On the other hand, a node close to the AP or near the edge of the AP range but experiencing a fade over one or more sub-channels in use may benefit from a change in sub-channel assignment. A sub-channel may be independently optimized for range detection performance for other sub-channels.

The existing grouping mechanism in 802.11 may be designed for DL MU-MIMO. There is no mechanism for any kind of UL group management. In addition, in order for an AP to conduct effective grouping of users, the AP may acquire sufficient information about the STAs, a process that may add to the overall overhead. Currently, there is no effective information acquisition and group mechanism defined in 802.11. Moreover, the current grouping method is not flexible and there is no adequate group management mechanism.

Furthermore, the STAs may not indicate their preferences or changes in grouping. Therefore, a grouping and group management mechanism is desired that may acquire information about the STAs and AP with limited overhead, allow STAs to indicate their preferences and enable the AP to conduct grouping effectively and efficiently. A procedure, mechanism and signaling used to conduct grouping of STAs for COBRA may be used to implement a user grouping information acquisition procedure.

In order to enable COBRA, the STAs may be divided into groups, and the groups may be overlapping, where each group may be assigned to a separate COBRA channel. Unlike the possible use of MU-MIMO within a COBRA channel, each group of STAs assigned to a separate COBRA channel may concurrently transmit, and receive, packets to/from the AP. Feedback may be provided by STAs by transmitting frames that include a COBRA Controllee IE.

MU-MIMO may be used within a COBRA channel utilizing a legacy MU-MIMO procedure, for example an 802.11ac procedure. Compatibility for desired orthogonal block-based resources may be implemented by dividing frequency/time resources into orthogonal blocks (OB), each of which, for example, may include one or more OFDM sub-carriers within a COBRA channel. The OBs may then be assigned by the AP to STAs using criteria such as buffered traffic, anticipated traffic requirements, periodicity, and/or traffic priorities. The assigned OBs may overlap for different STAs if, for example, MU-MIMO is used within a COBRA channel using the same OBs. STAs in a COBRA group may be assigned to one or more OBs, such that they have desirable channel conditions. The assignment may be static, semi-dynamic, or dynamic.

Irrespective of the particular combination of criteria that is used for grouping, the AP may use these criteria to enable it to determine a preferred grouping of STAs within a COBRA channel, as well as within non-COBRA channels. To enable the AP to group STAs within a COBRA channel, methods that facilitate such operations may include procedures for acquiring and providing feedback of grouping-related information, and procedures for managing and maintaining COBRA grouping.

FIG. 10 is a diagram of an example very high throughput (VHT) capabilities information field 1000 configured to support COBRA. An AP may indicate to the STAs that it may support COBRA. A STA may indicate to the AP that it may support COBRA as well. This may be performed by using one of the reserved bits, namely, Bit 30 (B30) 1010 and Bit 31 (B31) 1020 of the VHT capabilities information field 1000 as indicated by FIG. 10. The VHT capabilities information field 1000 may be a field of the VHT capabilities element. In order to support the COBRA capabilities, for example, Bit 30 1010 of the same information field, may be configured to indicate that the device is COBRA capable. If an AP may support COBRA, it may set B30 in the VHT capabilities information field 1000 to "1", and may be included in the VHT capabilities element that may be found in frames such as probe response frames, beacon frames, and association response frames. If a STA may support COBRA, it may set B30 1010 in the VHT capabilities information field 1000 to "1", and may be included in the VHT capabilities element that may be found in frames such as a probe request frame and an association request frame. Alternatively, similar indications may be conducted using other bits to indicate such COBRA capabilities.

An AP may need many types of information prior to being able to divide STAs into groups. Several new information elements may be defined to accommodate the information exchange that may facilitate COBRA operations. For example, the AP may include a COBRA controller information element (IE).

FIG. 11 is a diagram of an example COBRA controller IE 1100. The COBRA controller IE 1100 may include an element ID field 1105 to identify that the IE is a COBRA controller IE, a length field 1110 to indicate the length of the COBRA controller IE 1100, and an option field 1115 to indicate which types of information are contained in the COBRA controller IE 1100. The option field 1115 may be implemented as binary numbers to indicate the option.

In a first example, the option field 1115 may also be implemented as a bit map to indicate the type of information contained, such as a required action and information field 1120 that the AP may require from the STAs to support COBRA. This required action and information field 1120 may be implemented as a bit map to indicate a list of information that STAs wanting to perform COBRA operation may provide and actions that they may conduct. For example, the information may include a STA transmit power for indicating the transmit power that the STA uses to transmit to the AP, synchronization by the STAs, such that their clock offset and propagation delays to the AP may be determined within a precision of at least in the order of hundreds of nanoseconds, the frequency offset that the STAs measured when receiving the current frame, OB feedback of the channel condition of one or more OBs, traffic specification indicating which STAs may provide information to the AP on the expected traffic pattern such as traffic priorities, traffic data rate, maximum service intervals and minimal service intervals, sleep information, and the like, and/or mobility, whereby the STAs may provide information to the AP on their mobility pattern.

In a second example, the option field 1115 may also be configured to indicate the presence of an OB information field 1125 that may indicate the OBs available to the BSS and provide the specifications of OB feedback that the COBRA-capable STAs or COBRA controllees may provide. The OB information field 1125 may also include BSS OB information, such as information on OBs available in the BSS, channel width, such as the width of the entire available channel, primary channel location, sub-carrier spacing, and/or OB size (for example, number of sub-carriers contained in one OB), OB feedback specifications, such as specifications of the OB feedback that the COBRA controllees may send to the AP or the COBRA controller, OB range, such as the range of OBs that a COBRA controllee may provide feedback for, and/or codebook information, such as a number of bits to encode channel conditions for each OB.

In a third example, the option field 1115 may also be configured to indicate the presence of a transmit power field 1130 to indicate the transmit power used to transmit the current frame.

In a fourth example, the option field 1115 may also be configured to indicate the presence of a time of departure (TOD) timestamp field 1135 as defined in the optional location and time measurement feature in 802.11v. The TOD timestamp may be an integer value with a time unit of 1/TOD clock rate.

In a fifth example, the option field 1115 may also be configured to indicate the presence of a TOD clock rate field 1140 to indicate a TOD clock rate as defined in the optional location and time measurement feature in 802.11v.

In a sixth example, the option field 1115 may also be configured to indicate the presence of an optional information field 1145 to indicate other optional information that is needed to support UL MU-MIMO transmissions and receptions, and UL SC-FDMA transmissions and receptions, e.g. multiple antennas or not.

The COBRA controller IE 1100 may be included in a broadcast frame such as a beacon or action frame without ACK, or unicast frames such as probe response, association response and other management and control or action frames to support COBRA transmit power control, synchronization, group management and transmissions and receptions.

STAs that desire to participate in COBRA, after receiving a COBRA controller IE 1100 from the AP, may respond with a frame containing a COBRA controllee IE.

FIG. 12 is a diagram of an example of the COBRA controllee IE 1200. The COBRA controllee IE 1200 may include an element ID field 1205 to identify that the COBRA controllee IE 1200 is a COBRA controllee IE, a length field to indicate the length of the COBRA controllee IE 1200, and an option field 1215 to indicate which types of information are contained in the COBRA controllee IE 1200. The option field 1215 may be implemented as binary numbers to indicate the option. Alternatively, the option field 1215 may also be implemented as a bit map to indicate the type of information contained, such as the frequency offset that the STAs measured when receiving the a frame from the AP containing the COBRA controller IE 1200, or OB feedback, such as compressed or uncompressed OB feedback as specified by the OB information field in the COBRA controller IE 1100 received from the AP. In addition, the STA may also indicate its own OB preference, for example, the OBs on which the STA observes the best channel conditions, and the like, or traffic specification, such as the STAs providing information to the AP on the expected traffic pattern such as traffic priorities, traffic data rate, maximum service intervals and minimal service intervals, and the like, or may also include information on current buffer size for different access classes (ACs) or priorities.

The STAs may provide information to the AP on their mobility pattern. A mobility field 1217 may be configured in a format that may include bearings, and speed in 3-D dimensions, or the mobility field 1217 may be configured in a format of one bit to indicate whether the STA is stationary or mobile. The mobility field 1217 may be configured to indicate the level of mobility out of several levels related to speed that the expected channel changes take place.

The option field 1215 may be configured to indicate the presence of a transmit power field 1220 that may include the transmit power used to transmit the current frame, the maximum transmit power possible at the STA, the minimum transmit power possible at the STA, possible levels of transmit power at the STAs, feedback on the measured received signal strength indicator (RSSI) of the last frame that may contain the COBRA controller IE 1100 from the AP and/or the transmit power value that may be contained in the COBRA controller IE 1100.

The option field 1215 may also be configured to indicate the presence of a timing feedback field 1225 that may include the time difference T1 between the TOD timestamp contained in the last COBRA controller IE 1100 from the AP and the time of arrival (TOA) timestamp when that frame is received at the STA measured by the local TOD clock of which the rate of the TOD clock may be included in the same COBRA Controller IE 1100.

The option field 1215 may also be configured to indicate the presence of a TOD timestamp field 1230 as defined in the optional Location and Time Measurement feature in 802.11v. The TOD Timestamp may be an integer value with a time unit of 1/TOD clock rate.

The option field 1215 may also be configured to indicate the presence of a TOD clock rate field 1235 that may indicate the TOD clock rate as defined in the optional location and time measurement feature in 802.11v.

The option field 1215 may also be configured to indicate the presence of an OB feedback field 1240 or an optional information field 1245 that may include other optional information that may support COBRA transmissions and receptions such as mobility, traffic specification, number of antennas, SC-FDMA capability, and the like.

FIG. 13 is a diagram of an example grouping information acquisition procedure 1300. An AP 1310 and STA-1 1320a, STA-2 1320b, and STA-3 1320c are shown in FIG. 13. The AP may transmit a frame 1330 that indicates its COBRA capability. The COBRA capability may be indicated in a VHT capabilities information field, and may be transmitted in frames such as a beacon, probe response, association response and other management, control or action frames.

A STA may transmit a frame that indicates its COBRA capability. The COBRA capability may be indicated in a VHT Capabilities information field, and may be transmitted in frames such as a probe request, association request and other management, control or action frames.

The AP may also include a COBRA Controller IE in the beacon, probe response, association response or other broadcast or unicast management, control or action frame, to indicate the required information and actions from all COBRA Controllee STAs, such as OB feedback, and the like. The AP may also indicate information on itself such as transmit power used, TOD of the current frame, TOD clock rate, and the like.

The COBRA controllee STAs 1320a, 1320b, and 1320c, after receiving the UL COBRA Controller IE in a beacon, or other broadcast or unicast frame, may respond with a frame 1340a, 1340b, and 1340c, respectively, that may include a COBRA controllee IE to provide transmit power feedback, T1 that may be the time difference measured between the TOD and TOA of the frame 1330 containing the COBRA controller IE at the STA. In addition, OB feedback may be also provided according to the OB information field 1125 contained in the preceding COBRA controller IE.

The AP 1310 may then determine CSI 1350 between the STAs and the AP on each of the OBs for which the STA provided feedback. Alternatively, the AP 1310 may determine the pathloss between the COBRA controller and controllee. The path loss may be determined using:

$$\text{Pathloss} = \text{TxPower}_{AP} - \text{RSSI}_{STA}, \quad \text{Equation (1)}$$

or $$\text{Pathloss} = \text{TxPower}_{STA} - \text{RSSI}_{AP}, \quad \text{Equation (2)}$$

where the $\text{TxPower}_{AP}$, $\text{RSSI}_{STA}$ and $\text{TxPower}_{STA}$ may be obtained by from the COBRA Controller IE and the $\text{RSSI}_{AP}$ is measured at the AP.

The AP 1310 may then subsequently determine propagation delay between the COBRA controller and the COBRA controllees by using:

$$P\text{Delay} = (T1 + (\text{TOA}_{AP} - \text{TOD}_{STA}))/2, \quad \text{Equation (3)}$$

where T1, $\text{TOD}_{STA}$ may be obtained from the COBRA Controllee IE and the $\text{TOA}_{AP}$ may be measured at the AP using the TOD clock.

The AP 1310 may then subsequently determine the TOD clock offset using:

$$C\_\text{Offset} = (T1 - (\text{TOA}_{AP} - \text{TOD}_{STA}))/2, \quad \text{Equation (4)}$$

where T1, $\text{TOD}_{STA}$ may be obtained from the COBRA controllee IE 1200 and the $\text{TOA}_{AP}$ may be measured at the AP using the TOD clock. The AP 1310 may subsequently use the grouping management procedure to manage COBRA groups.

Initial grouping management procedures and/or grouping maintenance management procedures may be performed to manage COBRA groups. For example, a STA may use one criterion or a subset of criteria for grouping STAs into one or more COBRA groups. The UL and DL COBRA groups may be the same or they may be different.

Figure 14:
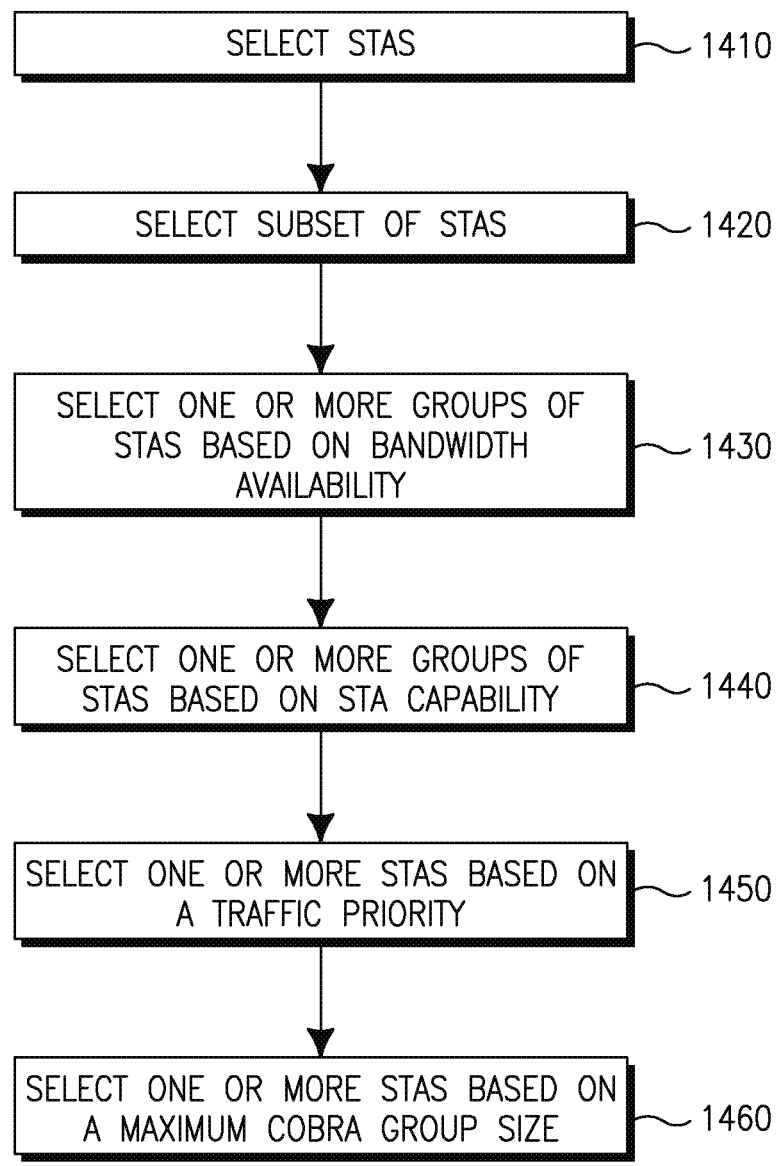
FIG. 14 is a diagram of an example grouping procedure.

FIG. 14 is a diagram of an example grouping procedure 1400. In this example, the AP may select 1410 one or more STAs that are COBRA capable and with similar received power as measured at the AP. This group may be referred to as subset of STAs C1. The exact range variations among C1 STAs may depend on the AP receiver processing capabilities and/or the power adjustment capabilities of the one or more STAs, and the like.

The AP may further select 1420 from the candidate set C1 a subset of STAs with similar propagation delay, and this second subset of STAs may be referred to as C2 STAs. The exact range variations among C2 STAs may depend on the GI value, BSS coverage radius and the timing adjustment capabilities of the C2 STAs, and the like.

The AP may select 1430 one or more groups of STAs based on a bandwidth availability. For example, the AP may select one or more groups of STAs such that their collective desirable OBs when concurrently transmitting or receiving, occupy all or a majority of the total bandwidth available to the BSS so that there may not be severe resource underutilization.

The AP may select 1440 one or more groups of STAs based on a STA capability. For example, the AP may select one or more groups of STAs that are capable of UL MU-MIMO or UL SC-FDMA.

The AP may select 1450 one or more STAs based on a traffic priority. For example, the AP may select all STAs with similar traffic priorities and/or periodicities. The final COBRA group may also be selected 1460 based on a maximum COBRA group size limit.

Figure 15:
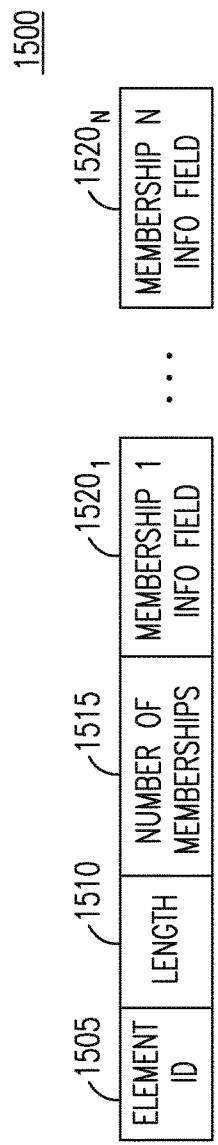
FIG. 15 is a diagram of an example of a unicast COBRA group management IE.

FIG. 15 is a diagram of an example of a unicast COBRA group management IE 1500. The unicast COBRA group management IE 1500 may include an element ID field 1505 that may identify that the unicast COBRA group management IE 1500 is a unicast COBRA IE, a length field 1510 that may indicate the length of the unicast COBRA IE, a number of memberships field 1515 that may indicate the number of group memberships included in the information element N, and membership 1-N information fields 15201, 1520N that may indicate that each field may contain the information of a group membership for the STA.

The STAs may be informed by the AP of the groups they belong to using, for example, a frame that includes a COBRA group management IE or field, depending on the implementation. A COBRA controllee STA may belong to multiple groups. Its UL and DL COBRA groups may be the same or may be different. The COBRA group management IE may be included in broadcast, or unicast management, control or action frames. The AP may transmit a unicast frame to a STA that may include a unicast COBRA group management IE or field to inform the STA of its group memberships.

Figure 16:
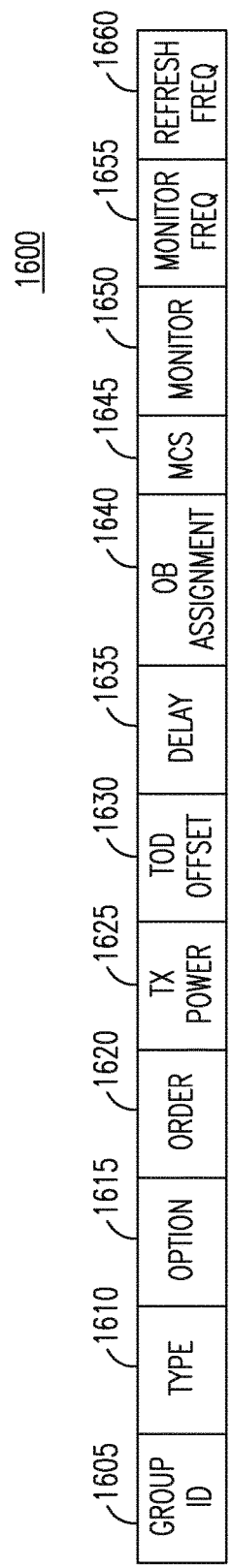
FIG. 16 is a diagram of an example membership information field.

FIG. 16 is a diagram of an example membership information field 1600. The STAs may be informed of their grouping by the AP using frames containing the COBRA group management IE by following a group management procedure. As shown in FIG. 16, each of the membership information fields 1600 may contain a group ID field 1605 that may identify the group that the membership information field 1600 is assigned to, and a type field 1610 that may indicate a type of the group. This type field 1610 may indicate that the group is DL COBRA, UL COBRA, DL/UL COBRA or other type of group. For example, the same IE may also be used for MU-MIMO or SC-FDMA group management.

Each of the membership information fields 1600 may contain an option field 1615 that may be configured as a bitmap or other encoding to indicate which types of information may be included in the remainder of the membership information field 1600. Each of the membership information fields 1600 may contain and order field 1620 that may indicate the order of the STA in the group. Each of the membership information fields 1600 may include a Tx power field 1625 to indicate the transmit power the STA may use to transmit when conducting COBRA transmissions in the current group. Each of the membership information fields 1600 may contain a TOD offset field 1630 that may indicate the offset between the TOD clocks at the AP and the STA. This TOD offset may be positive or negative and may be configured using 2's complement, where 2's complement may refer to integer arithmetic or a binary representation of an integer value.

Each of the membership information fields 1600 may contain a delay field 1635 that may indicate the delay that the STA may adjust for when participating in COBRA transmissions to the AP in the current group. This delay may be used to adjust for the difference in the propagation delay from each STA such that the COBRA UL packets may arrive at the AP within a GI. The delay may be positive or negative and may be implemented using 2's complement, where 2's complement may refer to integer arithmetic or a binary representation of an integer value.

Each of the membership information fields 1600 may contain an OB assignment field 1640 that may indicate the OBs that the STA may tune to when receiving DL COBRA packets and the OBs that the STA may use to transmit when participating in UL COBRA transmissions in the current group. The OB assignment may be configured to use, for example, encoded OB numbers, where the encoded OB numbers may be expressed as OB ranges or expressed as bitmaps of OBs.

Each of the membership information fields 1600 may contain a modulation and coding scheme (MCS) field 1645 that may indicate the MCS that the STA may adapt when participating in UL COBRA transmissions to the AP in the current group. Each of the membership information fields 1600 may contain a monitor field 1650. The monitor field 1650 may be one or a few bits that may indicate whether the STA may monitor for channel changes between the AP and the STA. Each of the membership information fields 1600 may contain a monitor frequency field 1655 that may indicate the frequency with which the STA may monitor for changes in the channel between the AP and the STA, by monitoring, for example, the beacon from the AP. The monitor frequency may be based on, for example, mobility patterns. Each of the membership information fields 1600 may contain a refresh frequency field 1660 that may indicate the minimal frequency with which the STA may refresh its setting with the AP. The refresh frequency may be based on, for example, mobility patterns.

Figure 17:
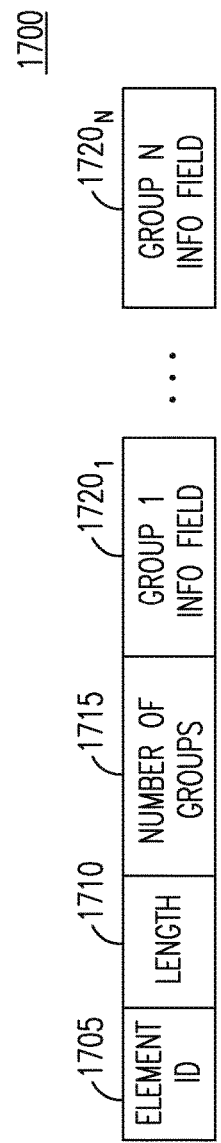
FIG. 17 is a diagram of an example broadcast COBRA group management IE.

FIG. 17 is a diagram of an example broadcast COBRA group management IE 1700. An AP may manage one or more groups simultaneously by transmitting a broadcast frame that includes a broadcast COBRA group management IE 1700 or field. The broadcast COBRA group management IE 1700 or field may contain an element ID field 1705 that may identify that the broadcast COBRA group management IE 1700 is a broadcast COBRA group management IE 1700, a length field 1710 that may indicate the length of the broadcast COBRA group management IE 1700, a number of groups field 1715 that may indicate the number of group information fields included in the broadcast COBRA group management IE 1700, and group 1-N information fields 17201 and 1720N, where each field may contain the information of a group.

Figure 18:
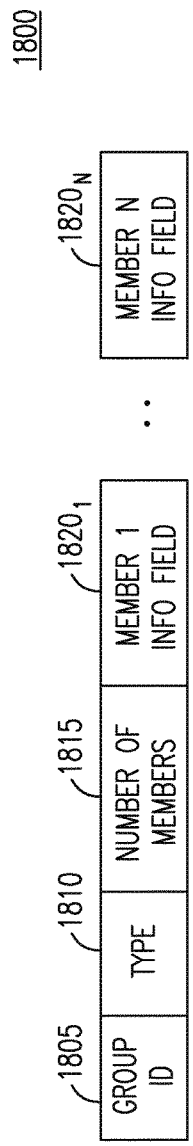
FIG. 18 is a diagram of an example group information field in the broadcast COBRA group management IE of FIG. 17.

FIG. 18 is a diagram of an example group information field 1800 in the broadcast COBRA group management IE of FIG. 17. The group information field 1800 may include the description of the members in each group, a group ID field 1805, a type field 1810, a number of members field 1815 indicating the number of STAs contained in this group, and member 1-N information fields 18201 and 1820N, that may each contain the information of a member STA in the group. The order of the member in the group may be implicitly expressed by the order of the associated member information field 1820.

Figure 19:
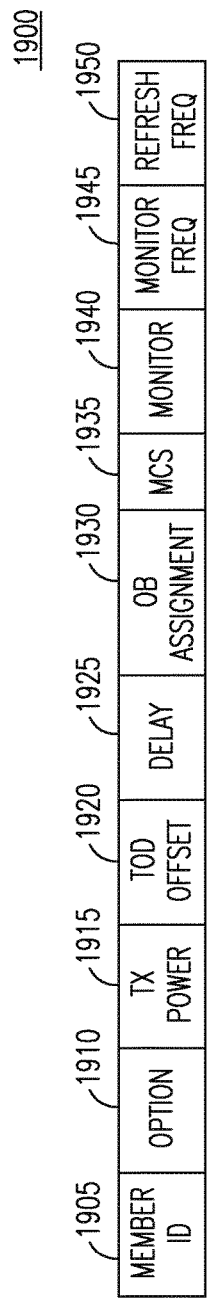
FIG. 19 is a diagram of an example member information field.

FIG. 19 is a diagram of an example member information field 1900. The member information field 1900 is similar to the membership information field 1520 of FIG. 15. The member information field 1900 may contain a member ID field 1905 that may indicate the ID of the member STA, and may be configured as an AID, MAC Address or other form of IDs that the AP and the STAs agree upon. The member information field 1900 may also include an option field 1910 that may be configured as a bitmap or other encoding to indicate which types of information may be included in the remainder of the member information field 1900. The member information field 1900 may include a Tx power field 1915 to indicate the transmit power the STA may use to transmit when conducting COBRA transmissions in the current group. The member information field 1900 may contain a TOD offset field 1920 that may indicate the offset between the TOD clocks at the AP and the STA. This TOD offset may be positive or negative and may be configured using 2's complement, where 2's complement may refer to integer arithmetic or a binary representation of an integer value.

The member information field 1900 may contain a delay field 1925 that may indicate the delay that the STA may adjust for when participating in COBRA transmissions to the AP in the current group. This delay may be used to adjust for the difference in the propagation delay from each STA such that the COBRA UL packets may arrive at the AP within a GI. The delay may be positive or negative and may be implemented using 2's complement, where 2's complement may refer to integer arithmetic or a binary representation of an integer value.

The member information field 1900 may contain an OB assignment field 1930 that may indicate the OBs that the STA may tune to when receiving DL COBRA packets and the OBs that the STA may use to transmit when participating in UL COBRA transmissions in the current group. The OB assignment may be configured to use, for example, encoded OB numbers, where the encoded OB numbers may be expressed as OB ranges or expressed as bitmaps of OBs.

The member information field 1900 may contain a modulation and coding scheme (MCS) field 1935 that may indicate the MCS that the STA may adapt when participating in UL COBRA transmissions to the AP in the current group. The member information field 1900 may contain a monitor field 1940. The monitor field 1940 may be one or a few bits that may indicate whether the STA may monitor for channel changes between the AP and the STA. The member information field 1900 may contain a monitor frequency field 1945 that may indicate the frequency with which the STA may monitor for changes in the channel between the AP and the STA, by monitoring, for example, the beacon from the AP. The monitor frequency may be based on, for example, mobility patterns. The member information field 1900 may contain a refresh frequency field 1950 that may indicate the minimal frequency with which the STA may refresh its setting with the AP. The refresh frequency may be based on, for example, mobility patterns.

Figure 20:
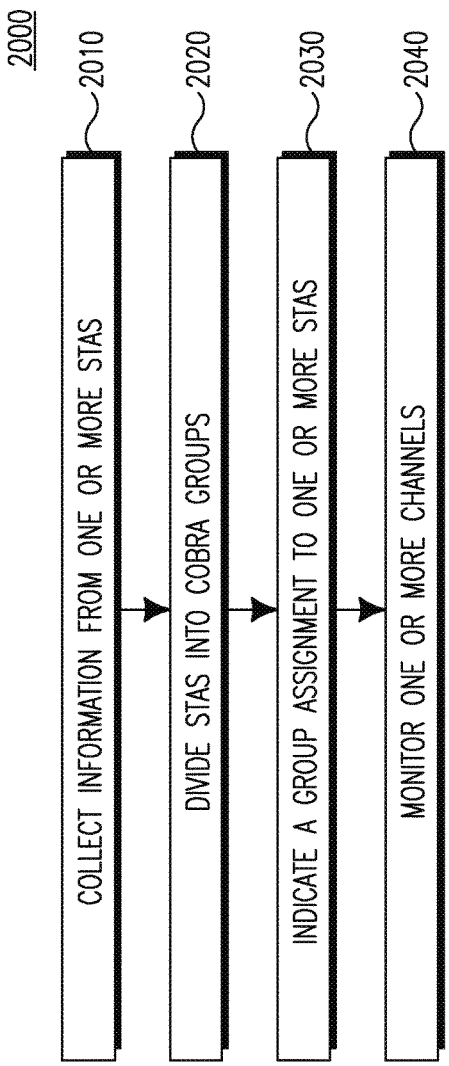
FIG. 20 is a diagram of an example COBRA initial group management procedure.

FIG. 20 is a diagram of an example COBRA initial group management procedure 2000. For example, an AP may collect information 2010 from one or more STAs that may be necessary to divide STAs into COBRA groups by following the grouping information acquisition procedure. The AP may divide the STAs 2020 into COBRA groups by following the group selection procedure. The division of the STAs into COBRA groups may be based on different UL and DL COBRA groups.

The AP may transmit a frame 2030 that indicates a group assignment to one or more STAs. In one example, the AP may transmit a unicast frame to a STA containing the unicast COBRA group management IE or field. The STA may then know its groups. The STA may adjust its parameters as specified in the membership information field for the appropriate group when participating in the associated UL COBRA group transmissions to the AP or DL COBRA receptions from the AP.

In another example, the AP may transmit a broadcast frame to all STAs containing the broadcast COBRA group management IE or field. The STAs may then know its groups. The STAs may adjust their respective parameters as specified in the respective member information fields in the appropriate group information field when participating in the associated UL COBRA group transmissions to the AP or DL COBRA receptions from the AP.

Once the COBRA groups are formed by the AP, the groups may be maintained due to changes in the environment such as interference, channel changes or due to changes at each of the member STAs due to mobility, and the like. The group maintenance may be performed by having the AP and the STA conduct monitoring of the channel between them and regroup the STAs in case such an action is desirable.

The AP may monitor 2040 one or more channels between the AP and the STAs with a pre-defined frequency. In addition to monitoring the one or more channels, the AP may perform group maintenance. The STAs may also monitor the channel between the AP and one or more STAs if AP indicates such actions for the STAs in the Membership Information field or in the Member Information field. Using the information in the COBRA Controller Information Element included in the beacon frames as well as PLCP headers, the STAs may estimate information such as Channel State Information on the OBs, Pathloss, TOD Clock Offset, Propagation Delay, etc. If the changes have exceeded a pre-defined threshold, the STA may inform the AP of the changes.

If the TOD Clock Offset has been correctly adjusted by group management procedures, the TOD Clock may be assumed to be synchronized for a pre-defined interval, which may be the Refresh Interval=1/Refresh Frequency. The STAs may then monitor the Propagation Delay by calculating PDelay=TOASTA−TODAP where TODAP may be included in the frame in the COBRA Controller Information Element and the TOASTA may be locally measured at the STA when the frame containing the COBRA Controller Information Element arrives.

Figure 21:
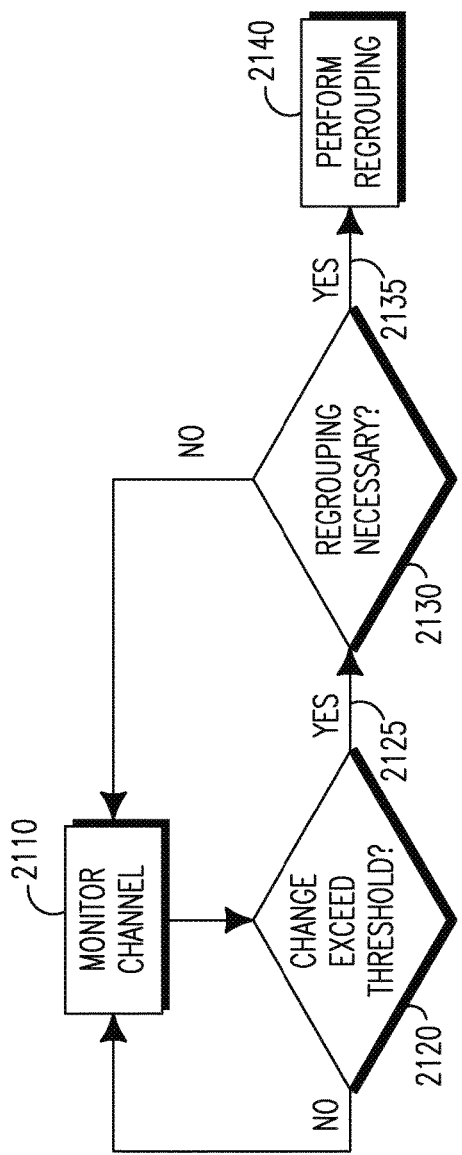
FIG. 21 is a diagram of an example group maintenance procedure.

FIG. 21 is a diagram of an example group maintenance procedure 2100 that may be performed, separately, or in conjunction with, the monitoring 2040 of the one or more channels described in FIG. 20. Referring to FIG. 21, the AP may monitor 2110 the channel between the AP and the STAs. The AP may determine 2120 whether changes have exceeded a pre-defined threshold. If a change has exceeded a pre-defined threshold 2125, the AP may determine 2130 whether a regrouping is necessary or desirable. If the AP determines 2135 that a regrouping is necessary or desirable, the AP may perform a regrouping 2140. The AP may receive a frame from one or more STAs that may include new information. The AP may perform a regrouping using the new information from the STAs using the group selection procedure, and the group management procedure if such an action is necessary or desirable.

Figure 22:
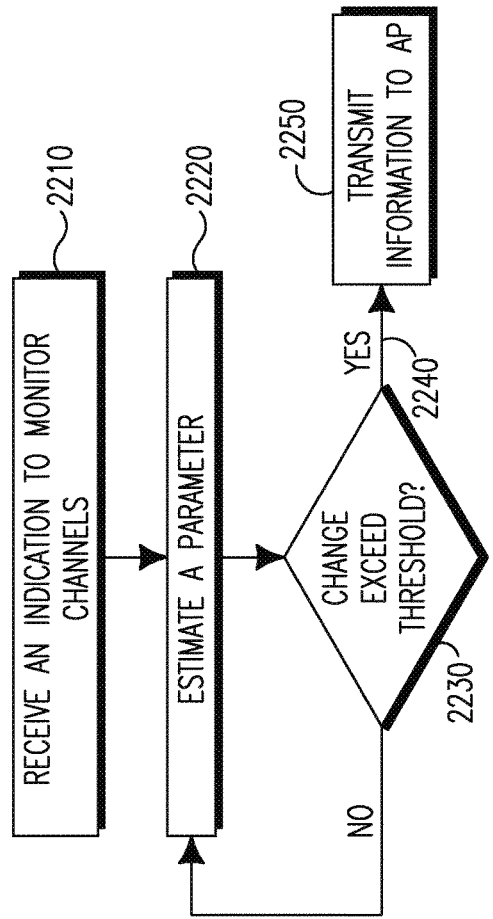
FIG. 22 is a diagram of another example group maintenance procedure.

FIG. 22 is a diagram of another example group maintenance procedure 2200 that may be performed, separately, or in conjunction with, the monitoring 2040 of the one or more channels described in FIG. 20. The AP may indicate that STAs may monitor the channels between the AP and the STAs. The STAs may receive 2210 a frame that indicates that the STAs may monitor the channels between the AP and the STAs and estimate 2220 using the beacon frames parameters such as Channel State Information on OBs, Pathloss, TOD Clock Offset, Propagation Delay, and the like. The STA may determine 2230 whether a change exceeds a pre-defined threshold. If the STA determines that a change has exceeded a pre-defined threshold 2240, the STA may transmit 2250 the new information to the AP using a frame containing the COBRA controllee IE. The AP may conduct regrouping using the new information from the STAs using the group selection procedure, and the group management procedure if such an action is necessary or desirable.

As an example implementation of COBRA that may utilize OFDMA sub-channelization, this embodiment may perform COBRA grouping procedures for enhanced very high throughput (E-VHT) communications. The E-VHT communications may be an extension to the VHT communications described in IEEE 802.11ac.

FIG. 23 is a diagram of an example VHT capabilities information field 2300. The VHT capabilities information field 2300 may include a number of sounding dimensions subfield 2310, an MU-beamformer capable subfield 2315, an MU-beamformee capable subfield 2320, a VHT TXOP PS subfield 2325, a +HTC-VHT capable subfield 2330, a maximum A-MPDU length exponent subfield 2335, a VHT link adaptation capable subfield 2340, an Rx antenna pattern consistency subfield 2345, a Tx antenna pattern consistency subfield 2350, a COBRA controller capable subfield 2355, and a COBRA controllee capable subfield 2360. In this example, an E-VHT STA may declare that it is COBRA capable using the COBRA controller capable subfield 2355 and/or the COBRA controllee capable subfield 2360 in the VHT capabilities information field 2300.

An E-VHT STA may also declare that it is COBRA capable using one or more bits in an E-VHT capabilities element whereby one bit is used to indicate that the STA is COBRA controller capable and/or one bit is used to indicate that the STA is COBRA controllee capable.

FIG. 24 is a diagram of an example COBRA group ID management frame action field 2400 format. The COBRA group ID management frame action field 2400 may include a category field 2410, a VHT or E-VHT action field 2420, a COBRA membership status array field 2430, a COBRA user position array field 2440, and a COBRA options field 2450. The COBRA group ID management frame action field 2400 may be an action frame of category VHT, or category E-VHT. It may be transmitted by the AP to assign or change the user position of a STA for one or more COBRA group IDs. The VHT or E-VHT action field 2420 of the COBRA group ID management frame action field 2400 may contain the information shown in Table 1.

TABLE 1

| Subfield | Definition | Encoding |
|---|---|---|
| COBRA Controller Capable | May indicate support for operation as a COBRA Controller and the associated signaling and procedures | Set to 0 if not supported Set to 1 if supported |
| COBRA Controllee Capable | May indicate support for operation as a COBRA Controllee and the associated signaling and procedures | Set to 0 if not supported Set to 1 if supported |

Figure 25:
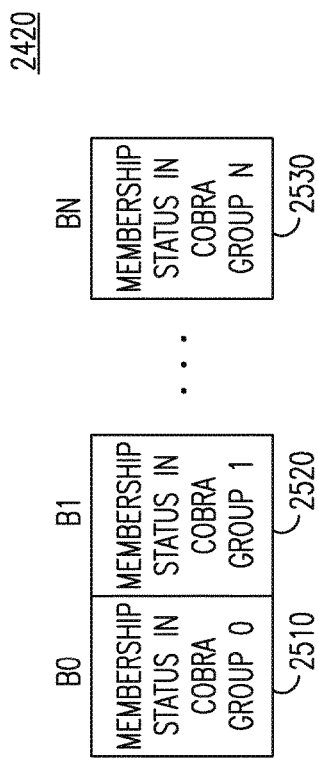
FIG. 25 is a diagram of an example COBRA membership status array field.
Figure 26:
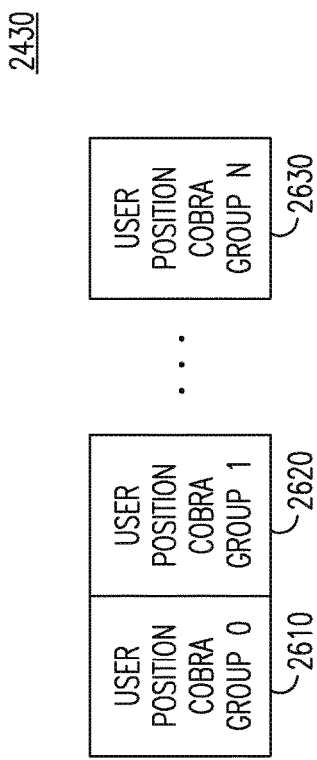
FIG. 26 is a diagram of an example COBRA user position array field.
Figure 27:
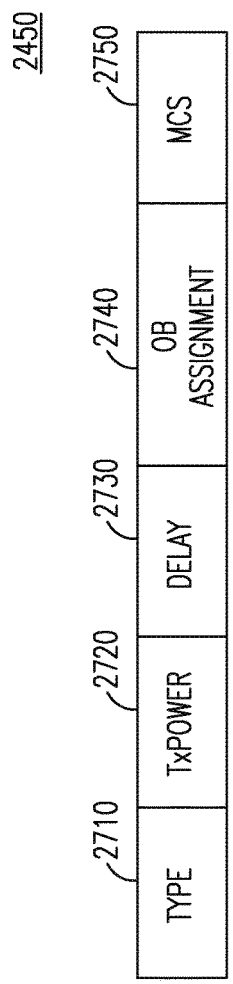
FIG. 27 is a diagram of an example COBRA group option field.

The category field 2410 may be set to the value for VHT or E-VHT. The VHT or E-VHT action field 2420 may be set to the value for COBRA group ID management. The COBRA membership status array field 2430 may include a membership status for each COBRA group 2510, 2520, and 2530, as shown in FIG. 25. The COBRA user position array 2440 may include a user position for each COBRA group 2610, 2620, and 2630, as shown in FIG. 26. Each field of a user position in the COBRA group may be one or more bits.

The COBRA group ID management frame action field 2400 may contain options for each of the COBRA groups for which the STA may be assigned to as a member. For example, the COBRA group option field 2450 for one COBRA group may include a type subfield 2710, a Tx power subfield 2720, a delay subfield 2730, an OB assignment subfield 2740, and an MCS subfield 2750, as shown in FIG.

27. An example value of each subfield of the COBRA group option field 2450 is shown in Table 2.

TABLE 2

| Subfield | Definition | Encoding |
| --- | --- | --- |
| Type | May indicate the type of the COBRA Group | Set to DL COBRA if it is a DL COBRA Group; Set to UL COBRA if it is a UL COBRA Group; Set to UL/DL COBRA if it is a COBRA Group for both DL and UL; Set to DL SC-FDMA if it is a DL SC-FDMA Group; Set to UL SC-FDMA if it is a UL SC-FDMA Group; Set to UL/DL SC-FDMA if it is a SC-FDMA Group for both DL and UL; |
| TxPower | May indicate the TxPower that the STA should use when transmitting in UL COBRA Group | Value in dBm for TxPower |
| Delay | May indicate the delay that the STA should apply when transmitting in UL COBRA Group | Positive or negative value in time, e.g., in units of us |
| OB Assignment | May indicate assignment of Orthogonal Blocks | ID of one or more OBs |
| MCS | May indicate the MCS that the STA should apply when transmitting in UL COBRA Group | Value indicating various MCS for the particular PHY used |

Assignments or changes of user positions corresponding to one or more COBRA Group IDs may be performed using a COBRA group ID management frame. A STA may be assigned to multiple COBRA groups by setting multiple subfields of the COBRA membership status array field to 1 in the COBRA group ID management frame addressed to that STA. A STA may have only one user position in each COBRA group of which it is a member. The user position of a STA in each group of which it may be a member may be indicated by the associated subfield in the COBRA user position array field in the COBRA group ID management frame addressed to the STA. An AP may assign the same user position for each COBRA group ID to different STAs.

An AP may transmit a group ID management frame if dot11VHTOptionImplemented or dot11E-VHTOption-Implemented is true. A COBRA group ID management frame may be transmitted to a VHT STA or an E-VHT STA that may include the COBRA controllee capable field in the VHT capabilities element or in the E-VHT capabilities element set equal to 1. A COBRA group ID management frame may be transmitted as an individually addressed frame or a broadcast frame. A COBRA group ID management frame may be transmitted to a STA in addition to the VHT MU-MIMO group ID management frame.

In another embodiment, the grouping procedures may be performed to group STAs on an ad hoc basis. STAs may be organized into COBRA groups on an ad hoc basis when channel conditions change frequently between the STAs and the AP, due to reasons such as STA mobility, a high level of interference, unpredictable interference, a fast changing environment, and the like.

It may be desirable to group STAs based on channel characteristics. For example, if several nodes are experiencing a fade over a similar set of sub-carriers, it may be desirable to schedule transmissions to and/or from those nodes at different times, grouping each with nodes that may experience favorable conditions on those same sub-carriers. In this example, the full bandwidth may be utilized with minimal fading for each user in the group.

In order for the AP to determine if the signal from a sub-channelized node is due to distance or fade, the AP may examine both the received power on a sub-channel as well as the timing offset on that sub-channel. If the timing offset of a weak signal is long, the AP may assume that the STA is distant and therefore assign a single sub-channel or a small number of sub-channels to that STA. On the other hand, if the timing offset of a weak signal is short, the AP may assume that a node is at close range and is experiencing a fade on the sub-channel. In this example, the AP may perform broadband sounding measurements, request the STA to determine a better channel, or move that node to a randomly chosen alternate sub-channel.

The number and location of sub-channels assigned to a STA may be based on channel conditions for that STA. For example, distance from the AP and selective fading may be used as criteria for selection of sub-channels, either measured by the STA or the AP. Distance estimates based on timing may be used in conjunction with sub-carrier power readings to determine whether a node is weak because of path loss or because of fading. If the timing offset is large and the signal is weak, this may indicate that a node is at some distance. In this case, the node may benefit from a reduction in sub-channel size, allowing for power concentration, or a different sub-channel allocation. However, if the timing offset is small and the power signal is weak, this may indicate that the node is near but is experiencing a frequency selective fade. In this example, the node may benefit from a re-assignment to a new sub-channel.

Grouping may also be performed based on the requirements of the device, for example, either localized or distributed sub-carrier allocations, MU-MIMO or SC-FDMA capable. The STA may explicitly request a sub-channel or sub-channels for UL or DL transmissions. The request may be based on data load, channel conditions, or some other requirements known to the STA. In this case, one or more short or long term sub-channels may be assigned to a user and approximate frequency of transmission requests may be taken into consideration when assigning the sub-channels. In this example, a short term sub-channel may refer to a temporary sub-channel assignment. The STA may request specific sub-channels or it may request the exclusion of specific sub-channels. A request for specific sub-channels may include an order of preference.

One way for a STA to request the use of one or more sub-channels may be to transmit a sub-channelized RTS (sRTS) only on the sub-channels it requires. The AP, detecting this sub-channelized request, may then know the sub-channel requirements of the STA without additional messaging, and may assign sub-channels accordingly. In this example, the STA may assume that it may eventually receive an UL grant on the same sub-channels used to submit the request. In the event that the AP is unable to accommodate this request, the AP may indicate the failure to comply as part of the CTS or sub-channelized CTS (sCTS) message. The failure to comply may be indicated using a bit or a field in a CTS frame or an sCTS frame.

When the STA submits an RTS, the duration field may indicate the amount of data to be sent, and the AP may use this information to determine the number of sub-channels required to accommodate the request. This estimation may involve balancing requests from STAs such that the overall sub-channelized UL transmission duration is relatively the same for all sub-channelized STAs transmitting during the burst.

The STA may perform sounding measurements to determine which sub-channels are better suited for sub-channelized transmission or reception. These measurements may be performed during DL transmissions, regardless of the intended recipient of the transmission, and may be used by the STA in an explicit or implicit sub-channel request.

In this example, the AP may determine one or more ideal sub-channels based on a channel estimation (CHEST) at a receiver conducted on a full-band message, for example, an RTS transmitted over all sub-channels. CHEST may be used to derive an estimate of the channel state for demodulation of the received signal. In another example, channel sounding may be performed by the AP to observe the physical channels for each STA. Channel measurements may be performed to determine the preferred sub-channels to use and the AP may base a sub-channel assignment on one or more of the channel measurements. The channel measurements may be performed assuming channel reciprocity.

Blind detection of sub-channels may be performed. Even with timing correction, two or more STAs transmitting in the UL on distinct sub-channels may arrive at the AP with a time offset. This timing offset may result in a similar phase rotation for all sub-carriers transmitted by each STA. The AP may then blindly detect sub-channels in use by each STA, using this information alone or along with confirmation by CRC, for example.

In 802.11ah, for example, a large number of devices may be supported, for example on the order of two to six thousand devices, for data transmission. This example may be supported by limiting the amount of simultaneous data transmissions to control collisions with a large number of STAs. However, to improve the spectral efficiency of the network, a large number of devices may be supported, and the simultaneous transmission of data rates that are consistent with the bandwidths that are typically used in 802.11ac, for example 20 to 160 MHz may be needed.

Methods which enable the support of a large number of devices in a system that support bandwidths used by 802.11ac may be used for a further improvement of spectral efficiency in these systems. Existing WLAN systems may utilize CSMA/CA as a MAC protocol, which is a distributed channel access scheme. The AP/STA may defer when it senses a transmission. Therefore, it may not be suitable for multiple STAs within one BSS transmitting/receiving simultaneously. In order to increase spectral efficiency, multiple STAs may be able to share the frequency time resources and communicate more efficiently.

A MAC Layer may be configured to enable standalone downlink COBRA transmission, standalone uplink COBRA transmission, and combined DL/UL COBRA transmissions. Time/frequency synchronization, uplink power control, and antenna calibration may be built in to the MAC layer. With different MAC layer configurations, the messages and signaling utilized for uplink transmission control may be different. The common idea, however, may be to better utilize the message exchanging before the UL COBRA traffic to sound the channel, and convey necessary control information.

Variations of MAC layer configurations and procedures may be applied. For example, the MAC signaling for synchronization and power control, for example, request and response exchanges, may be transmitted immediately before the UL MU-MIMO session. It may also be possible to transmit the synchronization and power control messages separately before UL MU-MIMO session.

A MAC layer may be configured to setup a standalone DL COBRA transmission. An AP may perform a clear channel assessment (CCA) and obtain the operation channel. The AP may start a DL COBRA transmission. A DL COBRA Group ID may be included in the SIG field of a DL COBRA frame, which may imply the sub-channelization of one or more STAs. Before initiating a COBRA session, the AP may communicate with a STA using a group ID management frame to identify one or more groups and/or one or more user positions of the STA.

Upon receiving the DL COBRA frame, the STAs may check the DL COBRA group ID to determine whether they are intended recipient of the DL COBRA session. Intended STAs may identify the sub-channels assigned to them by reading user position information, and an unintended STA may set its NAV accordingly. A MAC frame of each STA, including a MAC header and data, may be allocated in the specific sub-channels.

Figure 28:
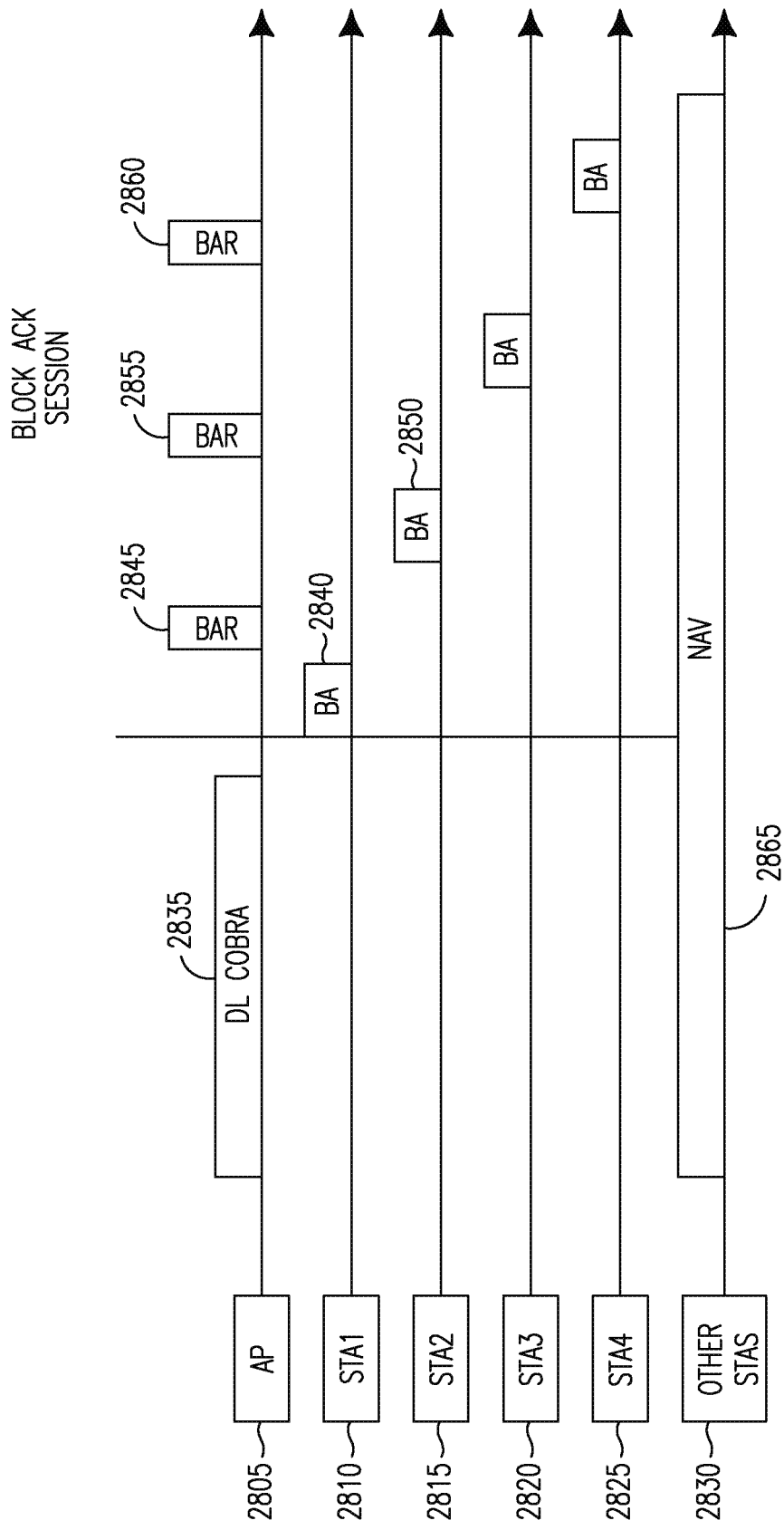
FIG. 28 is a diagram of an example standalone DL COBRA transmission

FIG. 28 is a diagram of an example standalone DL COBRA transmission 2800. In this example, an AP 2805, a STA-1 2810, a STA-2 2815, a STA-3 2820, a STA-4 2825, and a number of other STAs 2830 are shown. The AP 2805 may transmit a DL COBRA frame 2835 to STA-1 2810, STA-2 2815, STA-3 2820, and STA-4 2825. The DL COBRA frame 2835 may include a group ID for the COBRA transmission in a SIG field. STA-1 2810 may transmit a block ACK (BA) 2840 in response to the DL COBRA frame. In response to receiving the BA 2840 from STA-1 2810, the AP 2805 may transmit a block ACK requirement (BAR) frame 2845 to STA-2 2815. The BAR frame 2845 may be transmitted on the sub-channel STA-2 2815 may have utilized, or it may be transmitted over the entire bandwidth. Another choice may be to transmit a BAR frame 2845 on the sub-channel STA-2 may have utilized, and repeat it on all of the other sub-channels. STA-2 2810 may transmit a BA 2850 to the AP 2805. The AP 2805 may transmit a BAR 2855 and 2860 to the rest of intended STAs in a similar manner. Upon receiving the DL COBRA frame 2835, the other STAs 2830 may determine that they are not an intended recipient, and may reset their NAVs 2865.

A MAC layer may be configured to setup a standalone UL COBRA transmission. Synchronization, including frequency synchronization, timing synchronization, power control and calibration, may be performed to align all the UL COBRA STAs in frequency, time, power, and multiple antenna sense, so that the receiver may be able to detect and decode the signals simultaneously.

Figure 29:
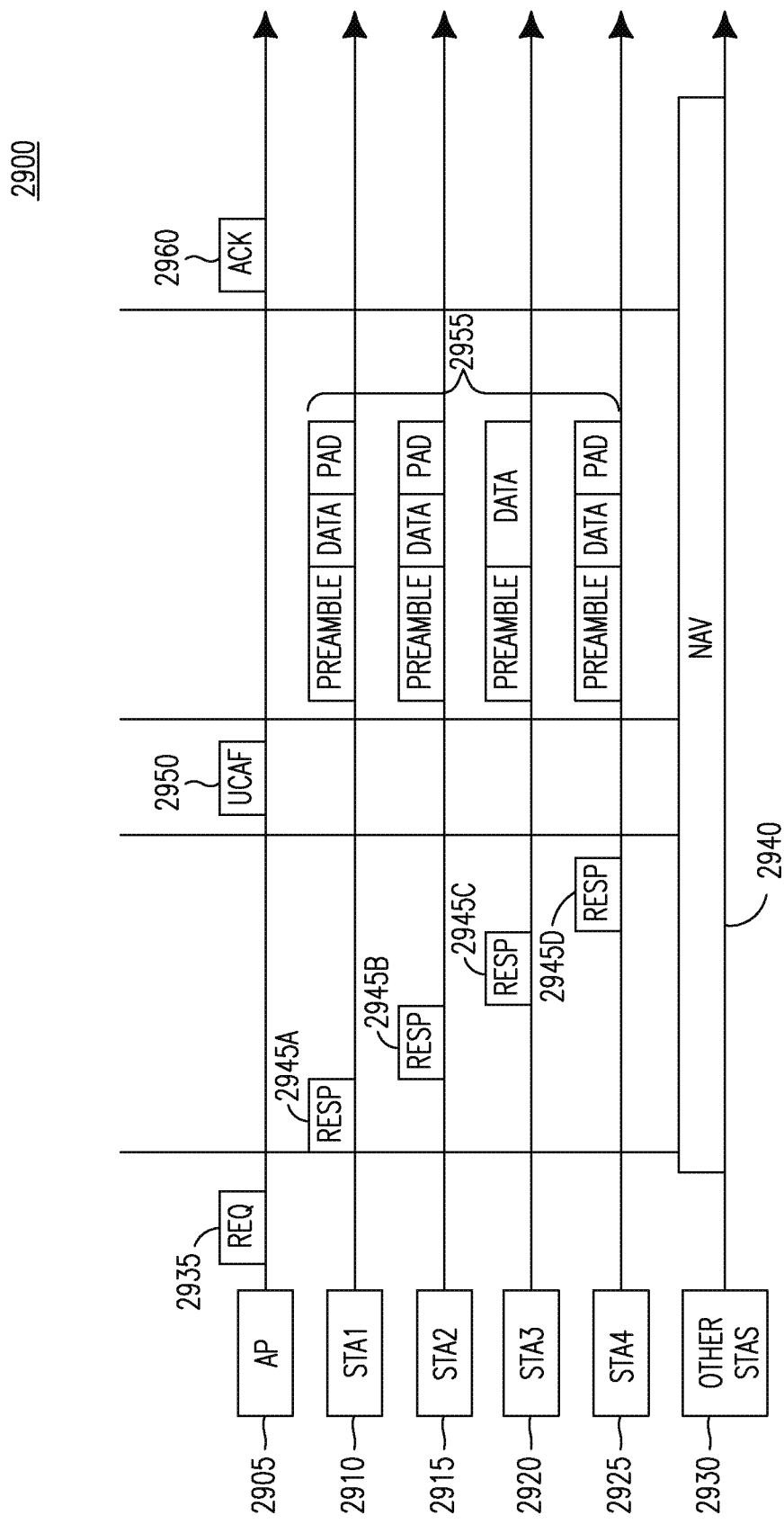
FIG. 29 is a diagram of an example standalone UL COBRA transmission.

Uplink transmission control may be performed using one or more handshakes during a MAC layer setup of the UL COBRA TXOP. FIG. 29 is a diagram of an example standalone UL COBRA transmission 2900.

In this example, an AP 2905, a STA-1 2910, a STA-2 2915, a STA-3 2920, a STA-4 2925, and a number of other STAs 2930 are shown. An AP may transmit a request (Req) frame 2935 may be transmitted with regular sounding PHY convergence procedure (PLCP) protocol data unit (PPDU) format. A regular sounding PPDU may be a PPDU with additional LTFs that may be used to sound the channel. A Req frame 2935 may be unicasted, multicasted, or broadcasted from an AP to STAs. The Req frame 2935 may poll a group of STAs for UL COBRA transmission. STAs within the group may check whether uplink traffic is ready to transmit, and begin frequency, time, power synchronization and a calibration procedure accordingly to align with the AP and other UL COBRA STAs 2930. The other STAs 2930 that may not be listed within the group may set their NAVs 2940. The Req frame 2935 may be transmitted on one or more wide band channels, over all of the sub-channels, or it may be transmitted on a sub-channel, and repeated with or without phase rotation on all of the other sub-channels.

A response (Resp) frame 2945a, 2945b, 2945c, and 2945d may be transmitted with a regular sounding PPDU format from each STA 2910, 2915, 2920, and 2925 to the AP 2905 sequentially. Alternatively, the Resp frames 2945a, 2945b, 2945c, and 2945d may be transmitted after the respective STA receives a Req frame 2935 addressed to itself. The AP 2905 may utilize these Resp frames 2945a, 2945b, 2945c, and 2945d for channel sounding, and prepare to receive one or more space division multiple access (SDMA) weights accordingly. The Resp frames 2945a, 2945b, 2945c, and 2945d may include the following information: uplink traffic indication, transmit power, sounding information, and/or calibration information. Since transmit power may be indicated in Resp frames 2945a, 2945b, 2945c, and 2945d, the AP 2905 may evaluate the link, for example, estimate the SNR, and select an MCS for the STAs 2910, 2915, 2920, and 2925. The Resp frames 2945a, 2945b, 2945c, and 2945d may be transmitted on one or more wide band channels, over all of the sub-channels, or they may be transmitted on a sub-channel, and repeated with or without phase rotation on all of the other sub-channels. The Resp frames 2945a, 2945b, 2945c, and 2945d may also be transmitted over one or multiple sub-channels.

A UL COBRA announcement frame (UCAF) 2950 may be transmitted from the AP 2905 to the plurality of STAs 2910, 2915, 2920, and 2925. The UCAF frame 2950 may be transmitted on one or more wide band channels, over all of the sub-channels, or they may be transmitted on a sub-channel, and repeated with or without phase rotation on all of the other sub-channels.

The AP 2905 may refine the UL COBRA group and redefine the group ID according to the feedback from Resp frames 2945a, 2945b, 2945c, and 2945d and/or a grouping strategy. The AP 2905 may assign each intended UL COBRA STAs 2910, 2915, 2920, and 2925 an uplink MCS, necessary pad bits, LTF/STF transmission, and so on. The AP 2905 may also assign one or more sub-channels as a random access channel. STAs with uplink traffic may utilize the random access channel to transmit control messages such as RTS. Multiple STAs 2910, 2915, 2920, and 2925 may transmit simultaneously using the same one or more dedicated random access channels. The UL COBRA transmission 2955 from each of the STAs 2910, 2915, 2920, and 2925 may include a preamble, data, and one or more padding bits, if needed. A reserved UL COBRA group ID may be utilized for random access channel. Information about timing, frequency, power adjustments and calibration may be transmitted as well. In response to receiving the simultaneous UL COBRA transmission from the STAs 2910, 2915, 2920, and 2925, the AP 2905 may transmit an ACK 2960. The ACK 2960 may be transmitted sequentially or by using a DL COBRA transmission or frame. In one example, all the STAs may share the single preamble. For example, if STA1 is assigned sub-channel 1 for uplink transmission, it may transmit a preamble and data on sub-channel 1 only. In another example, all the STAs may transmit a preamble on the entire band even though each STA may only be assigned a portion of the band. In this example, the AP may receive a composition of all the preambles from all the STAs. The preamble in this example may include an STF and an LTF only, and a SIG field may not be necessary since the AP may already have the information to be included in the SIG field. In this example, the AP may assign this information to the STAs in a UCAF. Table 3 shows an example of information that may be included in a UCAF 2950.

TABLE 3

| Field | | Description |
|---|---|---|
| BW | | Bandwidth for UL COBRA transmission |
| Uplink COBRA Group ID | | May contain Membership Status Array, User Position Array, etc. |
| Short GI | | Whether short GI is utilized for UL COBRA transmission |
| User Specific Profile | MCS | MCS used for the STA |
| | Nsts | Number of space time stream used for the STA |
| | Length | Length of useful data A-MPDU pre-EOF padding in PSDU in units of 4 octets |
| | Padding | Number of pad bits used for the STA |
| | Power adj | Power adjustment for the STA |
| | Freq adj | Frequency adjustment for the STA |
| | STBC | Whether STBC is utilized |
| | Coding | BCC or LDPC |

An uplink COBRA group ID may be configured for a UL COBRA transmission. Similar to group ID, which may be configured mainly for DL MU-MIMO transmission, assignments or changes of a UL COBRA group ID may be performed using a group ID management frame. The group ID management frame may contain a membership status array and/or a COBRA user position array. Transmission of a COBRA group ID management frame may be complete before the transmission of an MU PPDU either in DL or UL. However, it may not be necessary that the UL COBRA group ID and the DL COBRA group ID are the same. Each STA may, therefore, also maintain a parameter UL-GROUP_ID in PHYCONFIG_VECTOR.

When a STA receives a UCAF with the group ID for which the MembershipStatusInGroupID[k] is equal to 1, indicating that the STA belongs to the group, the STA may analyze the UserPositionInGroupID, determine the corresponding user specific profile, and prepare for the UL COBRA transmission accordingly. The User Position field may imply one or more sub-channels allocated to the STA. At the same time, the STA may temporarily suspend a CCA function until the end of UL COBRA transmission.

An ACK frame may be transmitted from AP to STAs. The ACK frame may be transmitted sequentially to multiple STAs or it may be transmitted with DL COBRA.

Figure 30:
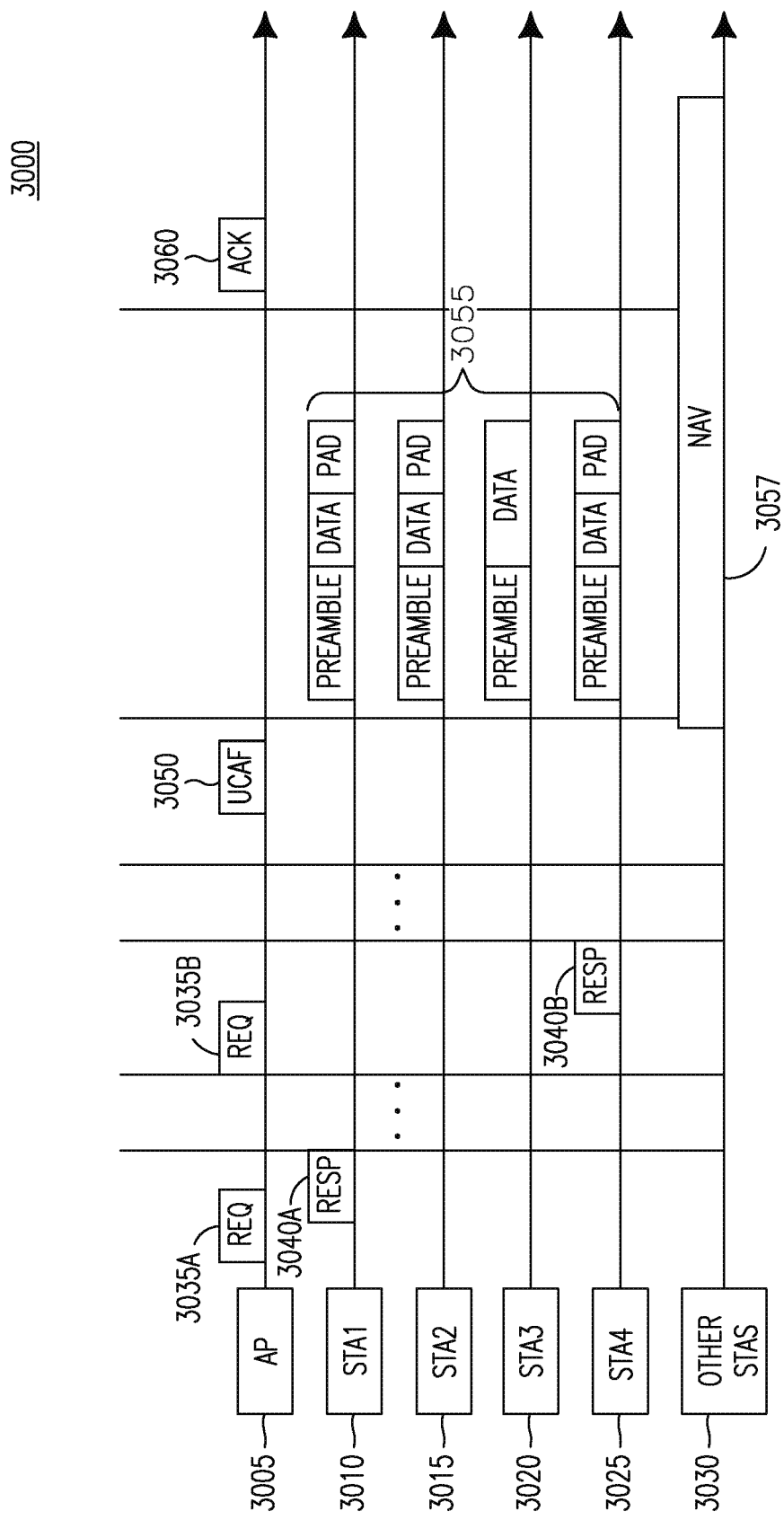
FIG. 30 is a diagram of another example of a standalone UL COBRA transmission.

FIG. 30 is a diagram of another example of a standalone UL COBRA transmission 3000. In this example, an AP 3005, a STA-1 3010, a STA-2 3015, a STA-3 3020, a STA-4 3025, and a number of other STAs 3030 are shown. Req frames 3035a and 3035b and Resp frames 3040a and 3040b may be transmitted separately before a UL COBRA session to perform, for example, synchronization, power control, and/or sounding.

A UCAF 3050 may be transmitted from the AP 3005 to the plurality of STAs 3010, 3015, 3020, and 3025. The UCAF frame 3050 may be transmitted on one or more wide band channels, over all of the sub-channels, or they may be transmitted on a sub-channel, and repeated with or without phase rotation on all of the other sub-channels.

The AP 3005 may refine the UL COBRA group and redefine the group ID according to the feedback from Resp frames 3040a and 3040b and/or a grouping strategy. The AP 3005 may assign each intended UL COBRA STAs 3010, 3015, 3020, and 3025 an uplink MCS, necessary pad bits, LTF/STF transmission, power adjustment, and so on. The AP 3005 may also assign one or more sub-channels as a random access channel. STAs with uplink traffic may utilize the random access channel to transmit control messages such as RTS. Multiple STAs 3010, 3015, 3020, and 3025 may transmit simultaneously using the same one or more dedicated random access channels. The UL COBRA transmission 3055 from each of the STAs 3010, 3015, 3020, and 3025 may include a preamble, data, and one or more padding bits, if needed. A reserved UL COBRA group ID may be utilized for random access channel. Information about timing, frequency, power adjustments and calibration may be transmitted as well. The other STAs 3030 that may not be listed within the group may set their NAVs 3057. In response to receiving the simultaneous UL COBRA transmission from the STAs 3010, 3015, 3020, and 3025, the AP 3005 may transmit an ACK 3060. The ACK 3060 may be transmitted sequentially or by using a DL COBRA transmission or frame. In one example, all the STAs may share the single preamble. For example, if STA1 is assigned sub-channel 1 for uplink transmission, it may transmit a preamble and data on sub-channel 1 only. In another example, all the STAs may transmit a preamble on the entire band even though each STA may only be assigned a portion of the band. In this example, the AP may receive a composition of all the preambles from all the STAs. The preamble in this example may include an STF and an LTF only, and a SIG field may not be necessary since the AP may already have the information to be included in the SIG field. In this example, the AP may assign this information to the STAs in a UCAF.

Figure 31:
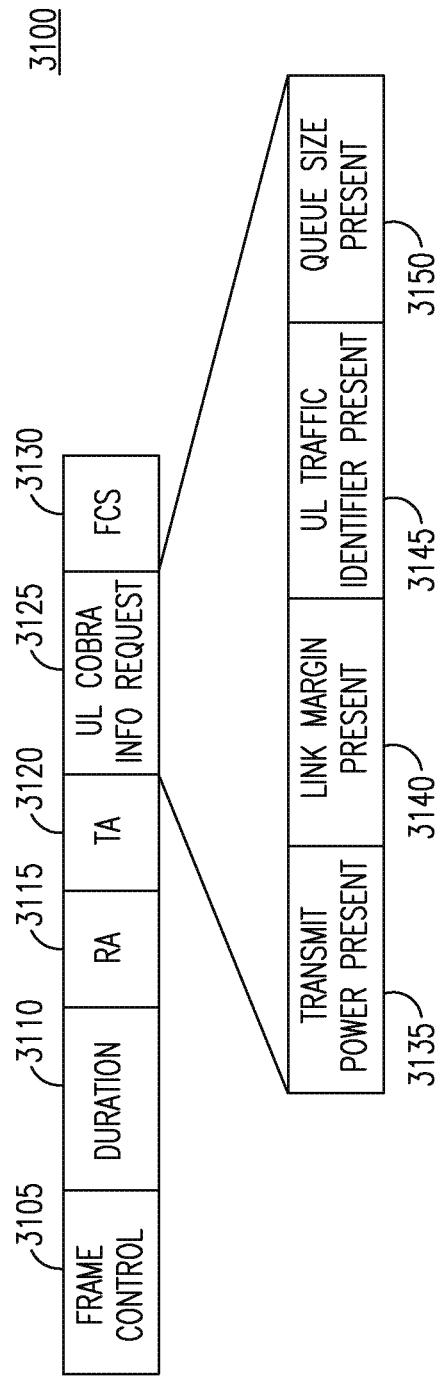
FIG. 31 is a diagram of an example MAC frame format of a COBRA Req frame.

FIG. 31 is a diagram of an example MAC frame format of a COBRA Req frame 3100. The COBRA Req frame 3100 may include a frame control field 3105, a duration field 3110, a receiver address (RA) field 3115, a transmitter address (TA) field 3120, a UL COBRA information request field 3125, and an FCS field 3130. The UL COBRA information request field 3125 may include a transmit power present subfield 3135, a link margin present subfield 3140, a UL traffic identifier present subfield 3145, and a queue size present subfield 3150.

An AP may utilize the COBRA Req frame 3100 to unicast to a STA. In this example, the RA field 3115 may indicate the MAC address of the AP, and the TA field 3120 may indicate the MAC address of the STA. The transmission sequences may follow the procedures shown in FIGS. 29 and 30. The COBRA Req frame 3100 may also be used to multicast to a group of STAs. A COBRA multicast group MAC address may be indicated in the TA field 3120. The UL COBRA information request field 3125 may be defined for uplink COBRA information. The UL COBRA information request field 3125 may include a transmit power present subfield 3135 that may indicate whether the UL transmit power used subfield may be transmitted in a COBRA Resp frame, a link margin present subfield 3140 that may indicate whether the UL link margin subfield used may be transmitted in a COBRA Resp frame, a UL traffic identifier present subfield 3145 that may indicate whether the UL traffic identifier subfield may be transmitted in a COBRA Resp frame, and a queue size present subfield 3150 that may indicate whether the UL queue size subfield may be transmitted in a COBRA Resp frame. The transmit power present subfield 3135, link margin present subfield 3140, UL traffic identifier present subfield 3145, and the queue size present subfield 3150 may each be one or more bits.

Figure 32:
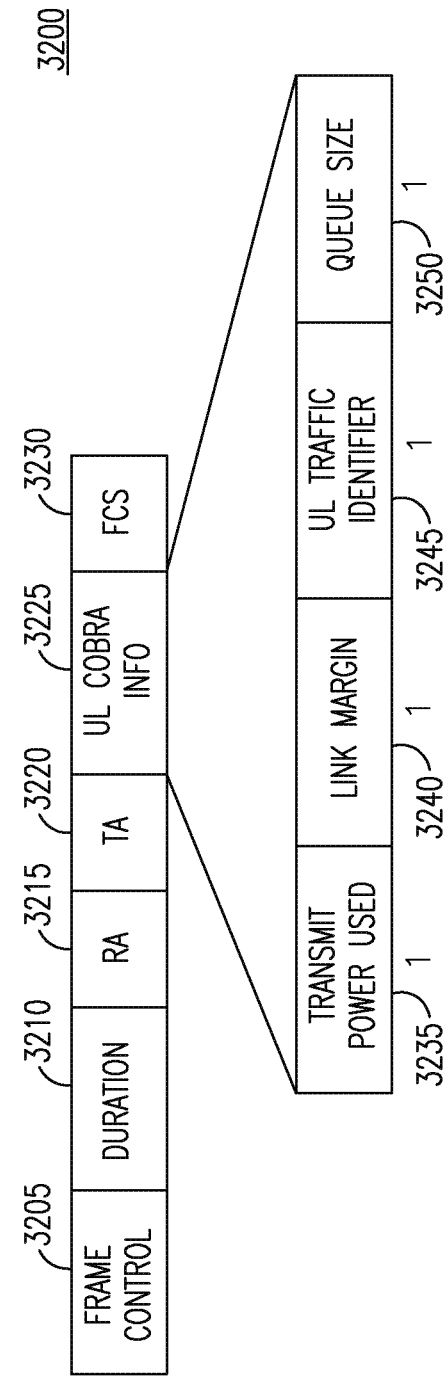
FIG. 32 is a diagram of an example COBRA Resp frame format.

FIG. 32 is a diagram of an example COBRA Resp frame 3200 format. The COBRA Resp frame 3200 may include a frame control field 3205, a duration field 3110, an RA field 3215, a TA field 3220, a UL COBRA information field 3225, and an FCS field 3230. The UL COBRA information field 3225 may include a transmit power used subfield 3235, a link margin subfield 3240, a UL traffic identifier subfield 3245, and a queue size subfield 3250. The COBRA Resp frame 3200 may be an uplink frame transmitted from a STA to an AP. The RA field 3215 and TA field 3220 may indicate a STA MAC address and an AP MAC address, respectively.

Figure 33:
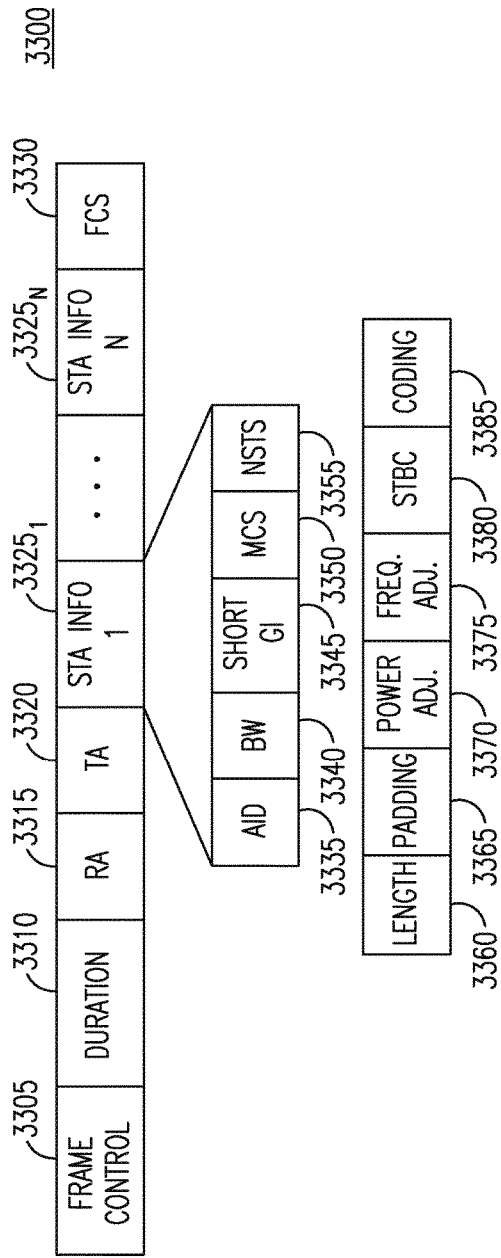
FIG. 33 is a diagram of an example per-user-based UCAF.

A UCAF may be configured as a control frame. FIG. 33 is a diagram of an example per-user-based UCAF 3300. The per-user-based UCAF 3300 may include a frame control field 3305, a duration field 3310, an RA field 3315, a TA field 3320, one or more STA information fields 3325a to 3325n, and an FCS field 3330. The TA field 3320 may indicate the address of the AP transmitting the per-user-based UCAF 3300. The RA field 3315 may indicate the address of one of the intended STAs, a multicast group address, or a broadcast address. The STA information fields 3325a to 3325n may be configured to include scheduling information for a UL COBRA transmission. Each of the STA information fields 3325a to 3325n may include an association ID (AID) subfield 3335, a bandwidth (BW) subfield 3340, a short guard interval (GI) subfield 3345, a modulation and coding scheme (MCS) subfield 3350, a number of supported transmission streams (Nsts) subfield 3355, a length subfield 3360, a padding subfield 3365, a power control adjustment subfield 3370, a frequency adjustment subfield 3375, a space-time block code (STBC) subfield 3380, and a coding subfield 3385. The AID subfield 3335 may be a partial AID subfield, and may indicate the intended STA expected to perform a UL COBRA transmission. A value of the AID subfield 3335 or partial AID subfield may be defined to indicate a random access channel. The BW subfield 3340 may indicate an operating bandwidth of the AP. The short GI subfield 3345 may indicate whether a short guard interval is applied. The MCS subfield 3350 may indicate a modulation and coding scheme. The Nsts subfield 3355 may indicate a number of spatial time streams transmitted. The length subfield 3360 may indicate the length of the MAC packet passed to the PHY layer. The padding subfield 3365 may indicate a number of bytes needed to fill the sub-channel(s) assigned. Power control adjustment subfield 3370 may indicates the uplink power adjustment that the AP may request the STAs to follow. The frequency adjustment subfield 3375 may indicate the frequency offset adjustment for an uplink transmission that the AP may request the STAs to follow. The STBC subfield 3380 may indicate whether space-time block coding is utilized. The coding subfield 3385 may indicate the rate and type of FEC coding used, for example convolutional or LDPC. A COBRA group ID may be transmitted in a SIG field of the PHY header. Sub-channel allocation may be implicitly defined in COBRA group ID by user positions. Alternatively, a sub-channel ID may be inserted into the STA information field to explicitly define the corresponding sub-channels assigned to the STA.

Figure 34:
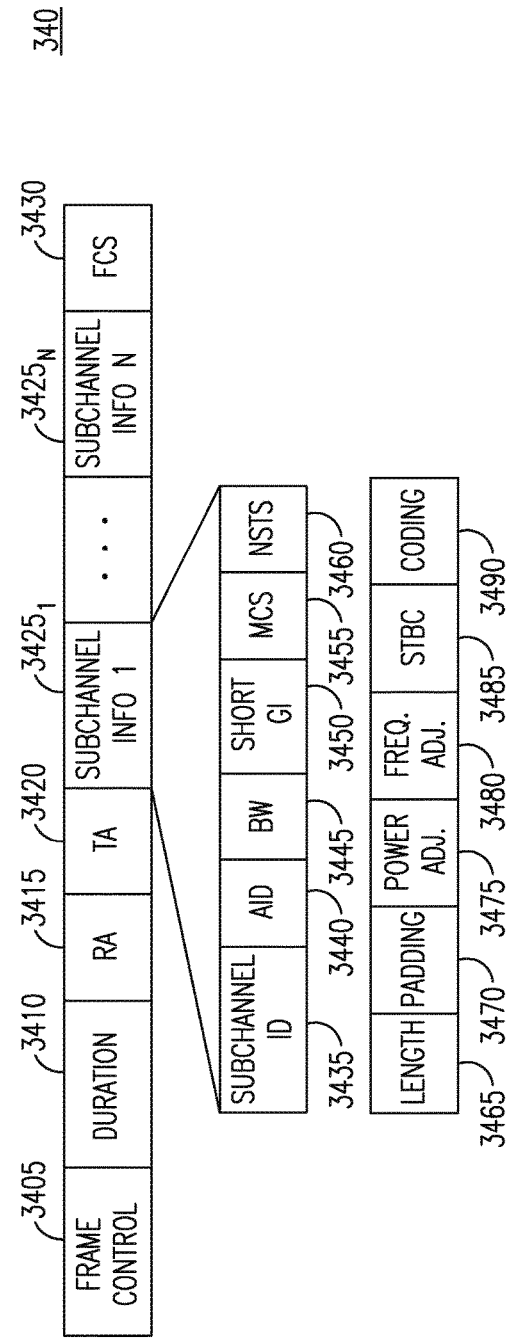
FIG. 34 is a diagram of another example of a per-user-based UCAF.

FIG. 34 is a diagram of another example of a per-user-based UCAF 3400. The per-user-based UCAF 3400 may include a frame control field 3405, a duration field 3410, an RA field 3415, a TA field 3420, one or more sub-channel information fields 3425a to 3425n, and an FCS field 3430. The TA field 3420 may indicate the address of the AP transmitting the per-user-based UCAF 3400. The RA field 3415 may indicate the address of one of the intended STAs, a multicast group address, or a broadcast address. The sub-channel information fields 3432a to 3425n may be configured to include scheduling information about each sub-channel. Each of the sub-channel information fields 3425a to 3425n may include a sub-channel ID subfield 3435, an AID subfield 3440, a BW subfield 3445, a short GI subfield 3450, an MCS subfield 3455, an Nsts subfield 3460, a length subfield 3465, a padding subfield 3470, a power adjustment subfield 3475, a frequency adjustment subfield 3480, an STBC subfield 3485, and a coding subfield 3490. The sub-channel ID subfield 3435 may be used to refer to a sub-channel on which the UL COBRA transmission may be conveyed. The AID subfield 3440 may be configured to include a full AID or a partial AID of a STA that may perform a UL COBRA transmission on the sub-channel. If a sub-channel is assigned for a random access channel, a value of the AID subfield 3440 may be used to indicate the sub-channel. The rest of the subfield defined in the sub-channel information field 3425a may be the same as a user-based UCAF.

Figure 35:
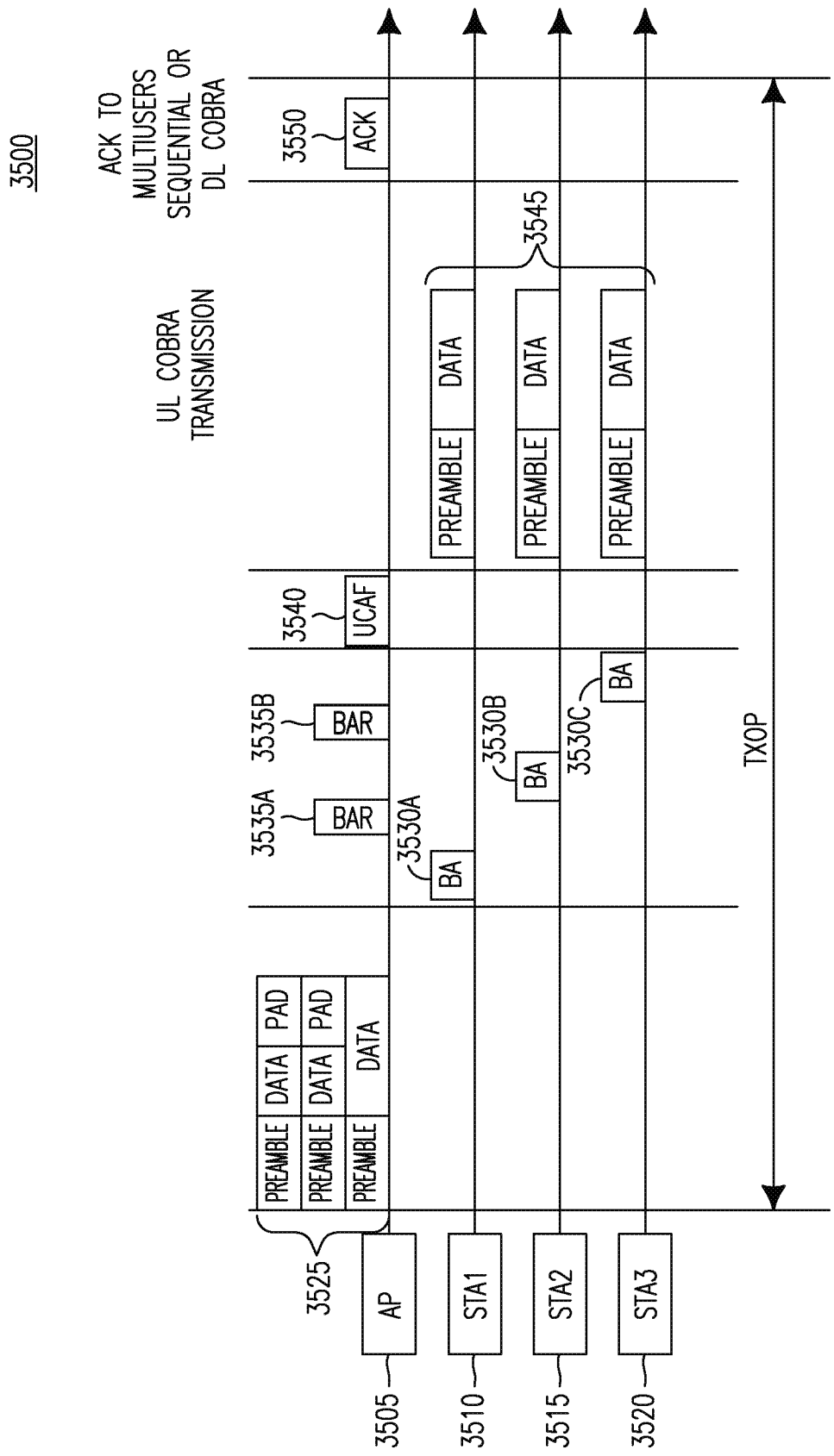
FIG. 35 is a diagram of an example combined DL/UL COBRA transmission.

MAC signaling, synchronization procedures, and power control mechanisms may be implemented for combined DL/UL COBRA transmission. FIG. 35 is a diagram of an example combined DL/UL COBRA transmission 3500.

In this example, an AP 3505 may perform a DL COBRA transmission by transmitting a DL COBRA frame 3525 to STA-1 3510, STA-2 3515, and STA-3 3520. The AP 3505 may transmit the DL COBRA frame 3525 after it conducts CCA and obtains one or more channels. A DL COBRA group ID may be configured and transmitted in a SIG field of a DL COBRA frame. Upon receiving the DL COBRA frame 3525, the STAs 3510, 3515, and 3520 may check the DL COBRA group ID to determine whether they are an intended recipient of the DL COBRA session. The intended STAs may identify the sub-channels assigned to them based on the user position information, and the unintended STAs may set their NAVs accordingly.

In this example, STA-1 3510 may receive the DL COBRA frame 3525 and transmit a block ACK (BA) 3530a in response. The AP 3503 may transmit BA request (BAR) frames 3535a and 3535b, and each of the STAs 3515, and 3520 may transmit a BA frame 3530b and 3530c with a regular sounding PPDU format or a normal PPDU format to the AP 3505 sequentially. In one example, the AP 3505 may utilize these BA frames 3530a and 3530b for uplink channel sounding and transmit BAR frames 3535a and 3535b in response. The BA frames in this example may be a modified version of an 802.11 BA frame. BA frames may include an uplink traffic indication, a transmit power, a calibration response, a power report, and the like.

The AP 3505 may transmit a UCAF 3540 to STAs 3510, 3515, and 3520. The AP 3505 may refine the UL COBRA group and reconfigure the UL COBRA group ID based the feedback from BA frames 3530a, 3530b, and 3530c and/or a grouping strategy. The AP 3505 may assign each of the UL COBRA STAs 3510, 3515, and 3520 an uplink MCS, one or more padding bits if necessary, an LTF/STF transmission, and so on. The AP 3505 may also assign one or more sub-channels as a random access channel. Each of the STAs 3510, 3515, and 3520 with uplink traffic may utilize the random access channel to transmit control messages such as, for example, an RTS. STAs 3510, 3515, and 3520 may transmit simultaneously 3545 using the same dedicated random access channel. A reserved UL COBRA group ID may be utilized for random access channel. Information about timing, frequency, power adjustments and calibration may be transmitted in the UL COBRA transmission. The AP 3505 may transmit an ACK frame 3550 sequentially to STAs 3510, 3515, and 3520, or it may be transmitted using a DL COBRA transmission or frame.

One advantage of sub-channelization may be to allow multiple access attempts, for example, RTS, at the same time by allocating one or more sub-channels exclusively for RACH-style random access. This procedure may allow STAs to transmit control messages such as RTS during the transmission of data or other signals by other STAs. To reduce the impact of collisions on the random access sub-channel, orthogonal codes, for example, Zadoff-Chu codes, may be used. The RA channels may be permanently assigned or the AP may periodically open one or more RA channels, for example, during periods where long transmissions may be occurring on other sub-channels.

A dedicated random access channel may be used for initial channel access, whereby the STAs that attempt to associate with the AP may utilize the dedicated random access channel to transmit a Probe Request. The dedicated random access channel may also be used for periodic channel access, whereby the STAs that may be active and may have uplink traffic may utilize the dedicated random access channel for timing/frequency synchronization, and/or power control.

A dedicated random access channel may also be used for a bandwidth request, whereby the STAs that may have uplink traffic or have just awakened from sleeping mode may utilize the dedicated random access channel to request UL COBRA bandwidth, for example, as an RTS or as a PS-Poll. It may be possible to assign a subgroup of orthogonal codes or random sequences to one or more of the functions mentioned above. In this way, the STAs may not include the functionality information in the contents of the random access channel signal.

Figure 36:
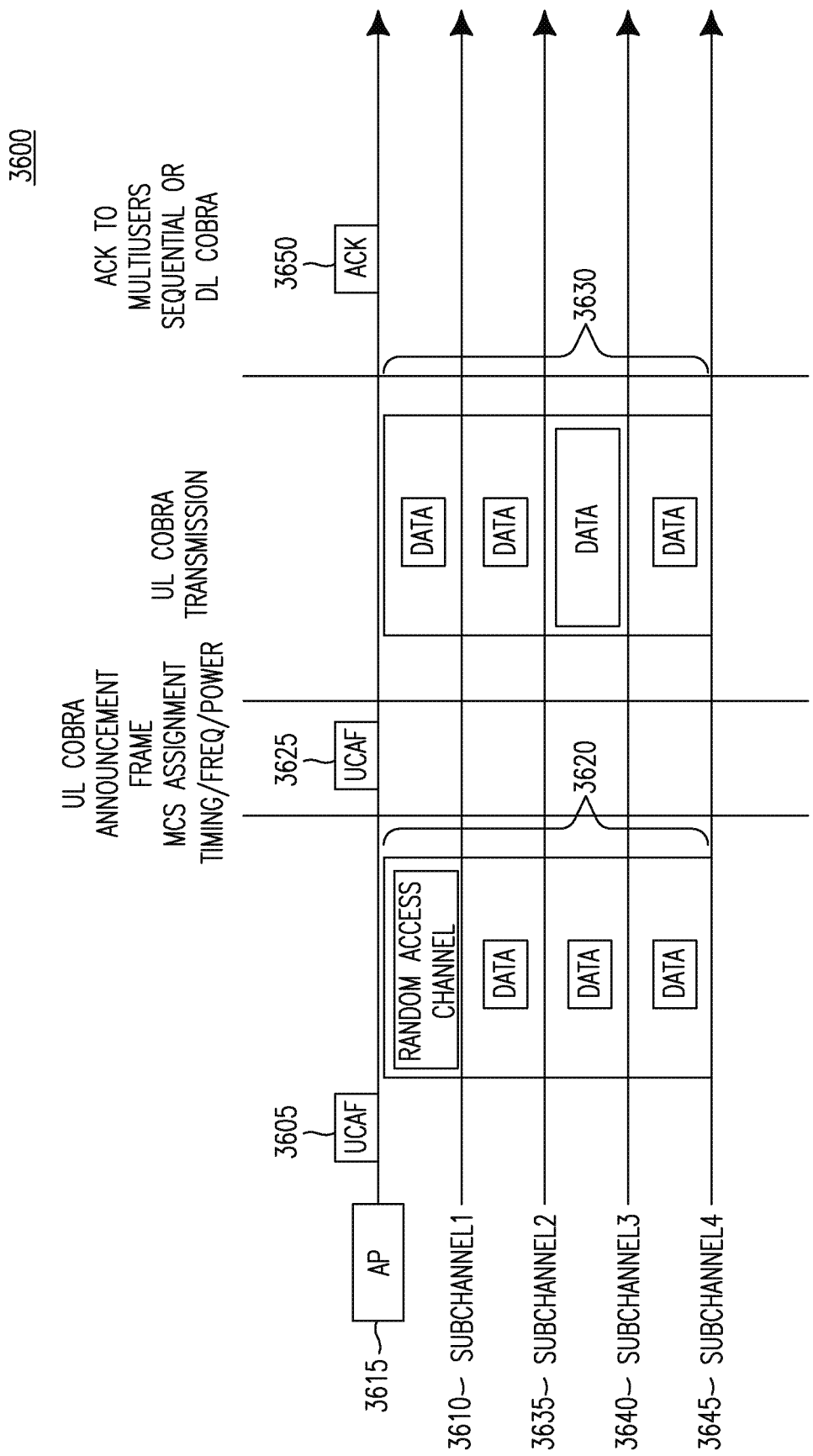
FIG. 36 is a diagram of an example dedicated random access channel.

To enable this feature, the AP may advertise the time and location of one or more RA channels, either in advance or when they may be enabled. FIG. 36 is a diagram of an example dedicated random access channel 3600. In this example, the UCAF 3605 may announce that sub-channel 1 3610 may be used as a dedicated random access channel. One or more STAs may utilize this sub-channel for random access. During a UL COBRA transmission, the AP 3615 may use the random access channel to estimate timing, frequency and power, for example, for the RACH STAs. The AP 3625 may be using one of the sub-channels that has been designated as a RA channel to perform timing, frequency and power estimation, while data is being transmitted 3620 on the other sub-channels. For example, subchannels 2-4 may be utilized for normal uplink data transmission. Subchannel 1 may be used as an RA channel so that all the STAs that may detect the allocation of the RA channel may use it for uplink access. In this example, each STA may use a pre-assigned random access code as a signature and the AP may distinguish the STAs based on the random access code. The AP may also estimate the frequency offset, timing offset based on the received signal on the RA channel. The received power of each uplink user may also be estimated so that the AP may use this information later to perform a frequency offset adjustment, timing adjustment, and/or power adjustment in the UCAF for a next UL COBRA transmission. Once the AP 3615 decodes the random access channel successfully, the AP 3615 may choose to perform a grouping algorithm and add, delete, and/or update a group ID. The AP may arrange a new COBRA session based on the updated groups and transmit another UCAF 3625. In response, each STA may transmit data 3630 on a respective sub-channel 3610, 3635, 3640, and 3645. The AP 3615 may transmit an ACK 3650 to each STA sequentially, or it may use a DL COBRA frame or transmission.

Asymmetrical bandwidth communications between uplink and downlink may be configured for a single user transmission with one or more pre-defined sub-channels.

The wideband channel may be divided into several sub-channels. Both the AP and STAs may know the division of the sub-channels. The AP may operate on the wideband channel and transmit and receive on all of the sub-channels, while the STAs may transmit and receive on a subset of the sub-channels. This method of communicating may be referred to as asymmetrical communications between uplink and downlink.

For a beacon transmission with asymmetrical communications, the beacon may be transmitted with the duplicate mode. For example, the beacon may be transmitted repeatedly on all the sub-channels with or without phase rotation. In an IEEE 802.11ah example, the smallest channel width supported may be 1 Mhz. Accordingly, the beacon may be transmitted with the 1 MHz duplicate mode. In another example, different beacon content may be transmitted on different sub-channels. The beacon frames transmitted on different sub-channels may include a common beacon information element or field that may carry general beacon information, such as country code, operation mode, and the like, and a specific beacon part, which may be utilized to assign sub-channel specific information, such as a group of users that are allowed to transmit on this sub-channel. This example may be referred to as sub-channelized beacon transmission.

A STA may operate on one sub-channel or a subset of sub-channels. The STA may monitor the beacon frames on each sub-channel and choose the best one or the best subset of sub-channels to operate on. If a STA can only monitor a sub-channel or a subset of sub-channels each time, the STA may choose to monitor several beacon frames before it determines to choose a sub-channel for transmission or change to a new sub-channel. The STAs may inform the AP about the changes of one or more sub-channels implicitly by transmitting uplink traffic on the selected one or more sub-channels. Alternatively, the STAs may transmit a request to change one or more sub-channels explicitly, and the AP may then transmit a response to either approve or reject the change. Other than beacon frames, the AP may also transmit sounding frames for sub-channel selection.

Figure 37:
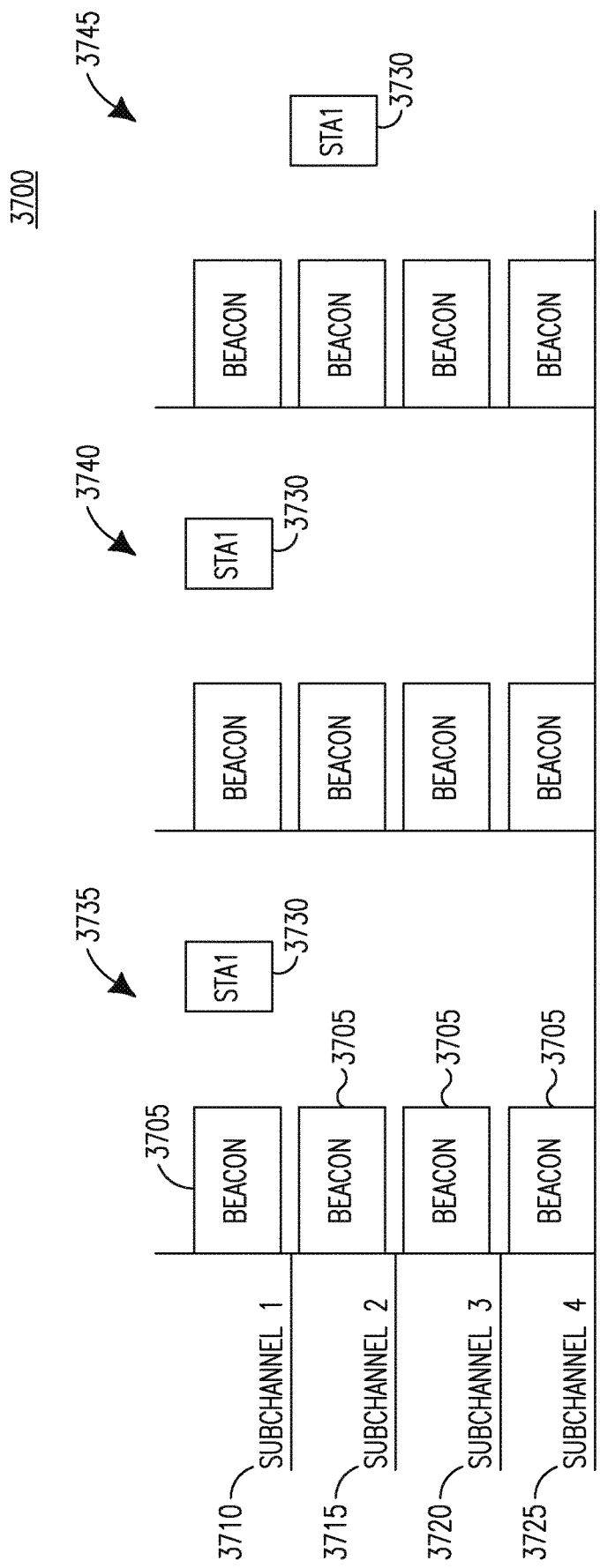
FIG. 37 is a diagram of an example general procedure for asymmetrical transmission between downlink and uplink.
Figure 38:
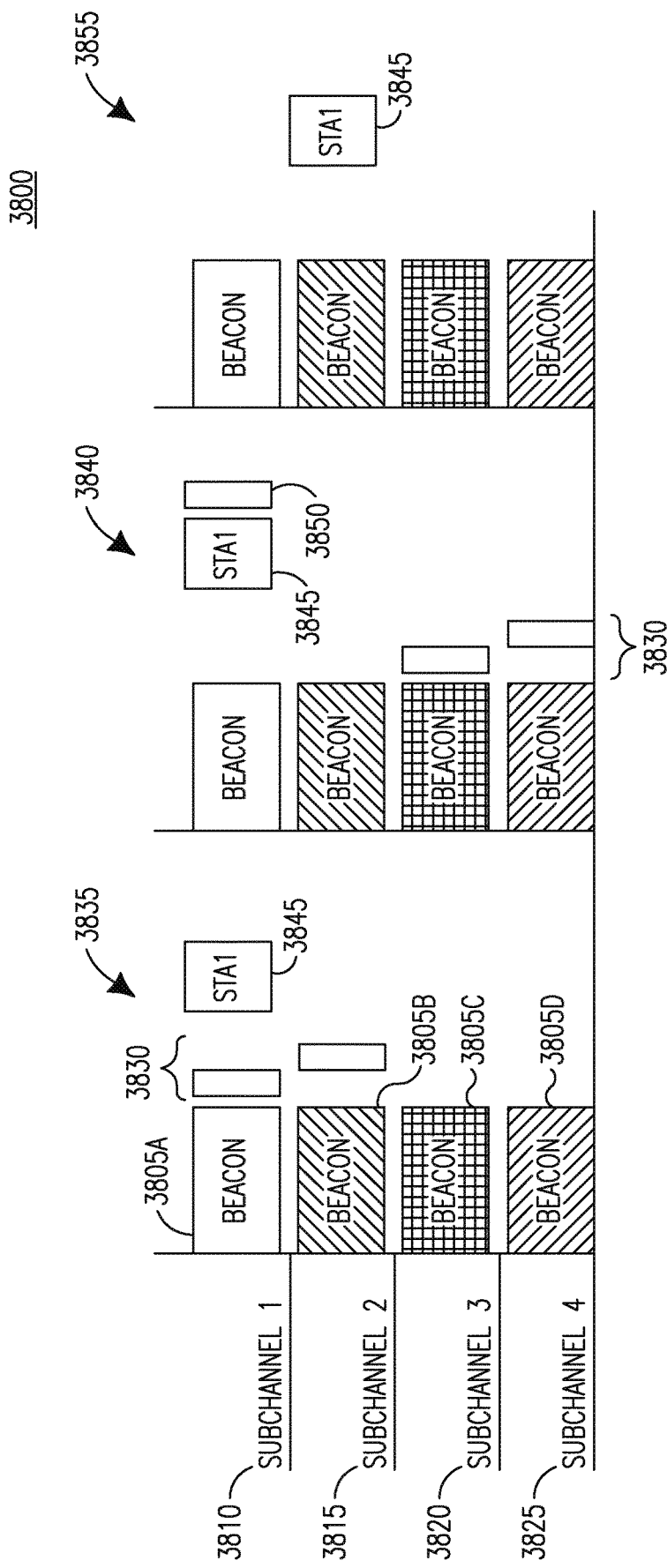
FIG. 38 is a diagram of another example general procedure for asymmetrical transmission between downlink and uplink.

FIGS. 37 and 38 are diagrams of example general procedures for asymmetrical transmission between downlink and uplink. In the example asymmetrical transmission procedure 3700 shown in FIG. 37, a beacon 3705 may be transmitted with duplicate mode, and the AP may transmit beacons repeatedly with or without phase rotation over the four sub-channels 3710, 3715, 3720, and 3725. STA1 3730 may operate on sub-channel 1 3710 in a first beacon interval 3735. However, STA1 3730 may determine that this sub-channel is not satisfactory for further use. Therefore, STA1 3730 may listen to the beacon transmitted on the other sub-channels. STA1 3730 may continue operating on sub-channel 1 3710 in a second beacon interval 3740, and may also monitor beacon frames on other sub-channels. In a third beacon interval 3745, STA1 3730 may compare the received signal strength on multiple sub-channels, and determine to move to sub-channel 2 3715. STA1 3730 may begin uplink transmission on sub-channel 2 3715 to implicitly inform the AP that STA1 3730 moved from sub-channel 1 3710 to sub-channel 2 3715.

FIG. 38 is a diagram of another example asymmetrical transmission procedure 3800 with sub-channelized beacon transmission. The AP may transmit a sub-channelized beacon 3805*a*, 3805*b*, 3805*c*, and 3805*d*, where the beacon may be transmitted on each sub-channel 3810, 3815, 3820, and 3825. The AP may use a sub-channelized beacon to assign users or a group of users that may transmit over the sub-channel. In this way, the STAs may listen to the beacon transmitted on their own sub-channel. The AP may transmit sub-channel selection sounding packets 3830 on each sub-channel 3810, 3815, 3820, and 3825. The sounding packets 3830 may be transmitted sequentially. However, it may not be necessary to complete all of the sounding packet transmissions within one beacon interval.

As shown in FIG. 8, the sounding packets for sub-channel 1 3810 and sub-channel 2 3815 may be transmitted in a first beacon interval 3835, while the sounding packets for sub-channel 3 3820 and sub-channel 4 3825 may be transmitted in a second beacon interval 3840. STA1 3845 may be assigned by the AP to transmit on sub-channel 1 3810 for the first two beacon intervals 3835 and 3840, respectively. However, after monitoring the sounding packets, STA1 3845 may intend to move to sub-channel 2 3815. STA1 3845 may transmit a request frame 3850 to indicate to the AP that it intends to operate on sub-channel 2 3815. STA1 3845 may transmit on the old sub-channel, i.e., sub-channel 1 3810 in this stage. The AP may receive the request frame 3850, and reply with a response frame. The AP may allow or reject the request. In this example, the AP may allow STA1 3845 to move from sub-channel 1 3810 to sub-channel 2 3815. In a third beacon interval 3855, the AP may map STA1 3845 to sub-channel 2 3815 and may include the relative information in the beacon for sub-channel 2 3815. STA1 3845 may monitor the beacon 3805*b* on sub-channel 2 3815 and begin transmission on sub-channel 2 3815.

In order to solve the hidden node problem created by the asymmetrical communication, a modified RTS/CTS protection mechanism may be implemented. The AP may have a wide-band transmission capability, and therefore it may be desirable to transmit RTS/CTS frames on all of the sub-channels or one or more targeted sub-channels.

FIGS. 39A, 39B, 39C and 39D show examples of request to send (RTS)/clear to send (CTS) protection mechanisms for asymmetrical communications. In these examples, the AP may have acquired 4 sub-channels 3905, 3910, 3915, and 3920. In FIGS. 39A and 39B, the STA may intend to communicate in one of the sub-channels, while in FIGS. 39C and 39D, the STA may communicate with the AP using two sub-channels. FIGS. 39A and 39C serve as examples where the AP may initiate the transmission, and FIGS. 39B and 39D serve as examples where the STA may initiate the transmission.

As shown the example procedure 3900A in FIG. 39A, the AP may transmit an RTS 3925 in the duplicate mode on every sub-channel 3905, 3910, 3915, and 3920 with or without phase rotation. The RTS 3925 may set a NAV on all of the sub-channels 3905, 3910, 3915, and 3920 for unintended STAs. The STA may reply with a CTS 3930 on sub-channel 3 3915, and set a NAV on sub-channel 3 3915. The AP and the STA may begin communication on sub-channel 3 3915, where the STA may transmit data 3932 and receive an ACK 3934 from the AP on sub-channel 3 3915.

As shown in the example procedure 3900B in FIG. 39B, the STA may transmit an RTS 3935 on sub-channel 3 to the AP, and set the NAV on sub-channel 3 3915. The AP may transmit CTS 3940 in the duplicate mode on every sub-channel 3905, 3910, 3915, and 3920 with or without phase rotation. The CTS 3940 may set the NAV on all of the sub-channels 3905, 3910, 3915, and 3920. The AP and the STA may begin communication on sub-channel 3 3915, where the STA may transmit data 3942 and receive an ACK 3944 from the AP on sub-channel 3 3915.

As shown in the example procedure 3900C in FIG. 39C, the STA may communicate on two sub-channels, for example sub-channel 2 3910 and sub-channel 3 3915. The AP may transmit an RTS 3945 in the duplicate mode on every sub-channel 3905, 3910, 3915, and 3920 with or without phase rotation. The RTS 3945 may set the NAV on all of the sub-channels 3905, 3910, 3915, and 3920 for unintended STAs. The STA may reply with a CTS 3950 on sub-channel 2 3910 and sub-channel 3 3915 in the duplicate mode with or without phase rotation, and set the NAV on sub-channel 2 3910 and sub-channel 3 3915. Then, the AP and the STA may begin communication on sub-channel 2 3910 and sub-channel 3 3915, where the STA may transmit data 3952 and receive an ACK 3954 from the AP on sub-channel 2 3910 and sub-channel 3 3915. The data 3952 and ACK frames 3954 may be transmitted on a wider bandwidth on aggregated sub-channel 2 3910 and sub-channel 3 3915.

As shown in the example procedure 3900D in FIG. 39D, the STA may communicate on two sub-channels, for example sub-channel 2 3910 and sub-channel 3 3915. The STA may transmit an RTS 3960 in the duplicate mode on sub-channel 2 3910 and sub-channel 3 3915 with or without phase rotation. The AP may transmit a CTS 3965 in the duplicate mode on every sub-channel 3905, 3910, 3915, and 3920 with or without phase rotation. The RTS 3960 may set a NAV on all of the sub-channels 3905, 3910, 3915, and 3920 for unintended STAs. The AP and the STA may begin communication on sub-channel 2 3910 and sub-channel 3 3915, where the STA may transmit data 3967 and receive an ACK 3969 from the AP. The data 3967 and ACK frames 3969 may be transmitted on a wider bandwidth on aggregated sub-channel 2 3910 and sub-channel 3 3915.

All of the unintended STAs may monitor all of the channels on which they may be operating, and perform a clear channel assessment (CCA) on them. For example, if a STA is operating on sub-channel 3, then it may have to monitor sub-channel 3, whether it is the primary channel or not. If a STA is operating on sub-channels 3 and 4, then it may monitor both sub-channels 3 and 4 and follow the NAV setting there.

A long training field (LTF), a short training field (STF), and/or a SIG field may be configured to minimize overhead. Backwards compatibility with OFDM systems may also be a criteria for a preamble design. For short bursts, the overhead associated with the preamble may be significant. A preamble for downlink may be divided into two parts. The first part of the preamble for this frame may be similar to legacy systems for backwards compatibility. The second part of the preamble may be sub-channelized. The second part of the preamble may be referred to as the COBRA part. One or more fields in different sub-channels may be targeted for a STA in those sub-channels.

Figure 40:
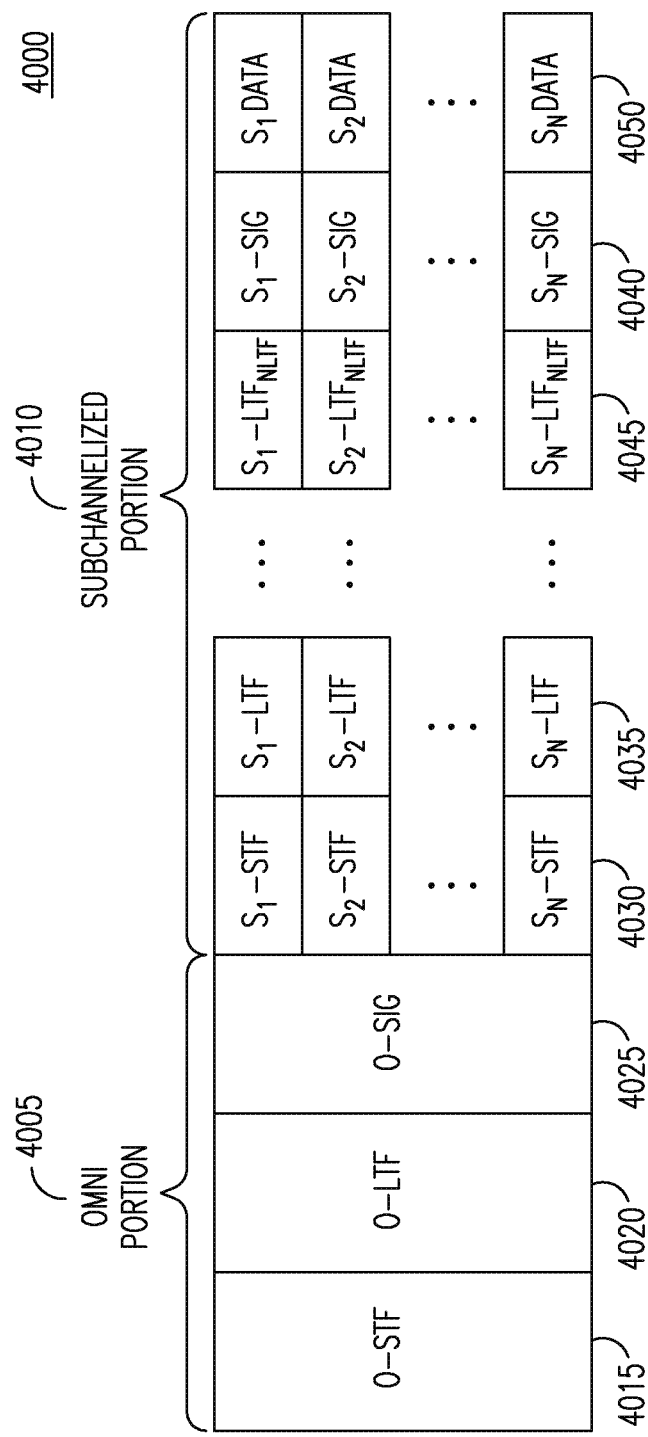
FIG. 40 is a diagram of an example DL COBRA preamble.

FIG. 40 is a diagram of an example DL COBRA preamble 4000. A DL COBRA preamble 4000 may include an omni portion 4005 and a sub-channelized portion 4010. The omni portion 4005 may include a full band omni short training field (O-STF) 4015, an omni long training field (O-LTF) 4020, and/or an omni signal (O-SIG) field 4025 and may precede the COBRA part of the preamble. A full band portion of the preamble may be used for packet detection, channel estimation for the O-SIG field, and/or initial time frequency synchronization. From the O-SIG field, the STA may find out more information about the packet. This portion of the DL COBRA preamble 4000 may have one spatial stream (Nss=1).

The sub-channelized portion 4010 of the DL COBRA preamble 4000 may be divided into different sub-channels in frequency for different users. For example, there may be a sub-channelized short training field (S-STF) 4030, a sub-channelized long training field (S-LTF) 4035, a sub-channelized signal (S-SIG) field 4040, an S-LTFNLTF field 4045, and/or a sub-channelized data (S-Data) field 4050 for each STA 1 to N. NLTF may denote the number of LTFs that are transmitted, depending on the number of data streams. The ellipses may denote the progression of 1 to NLTF. The S-SIG field 4040 may be STA specific, and may contain the MCS and other information for the STA to decode in a data part of the packet following the preamble.

Figure 41:
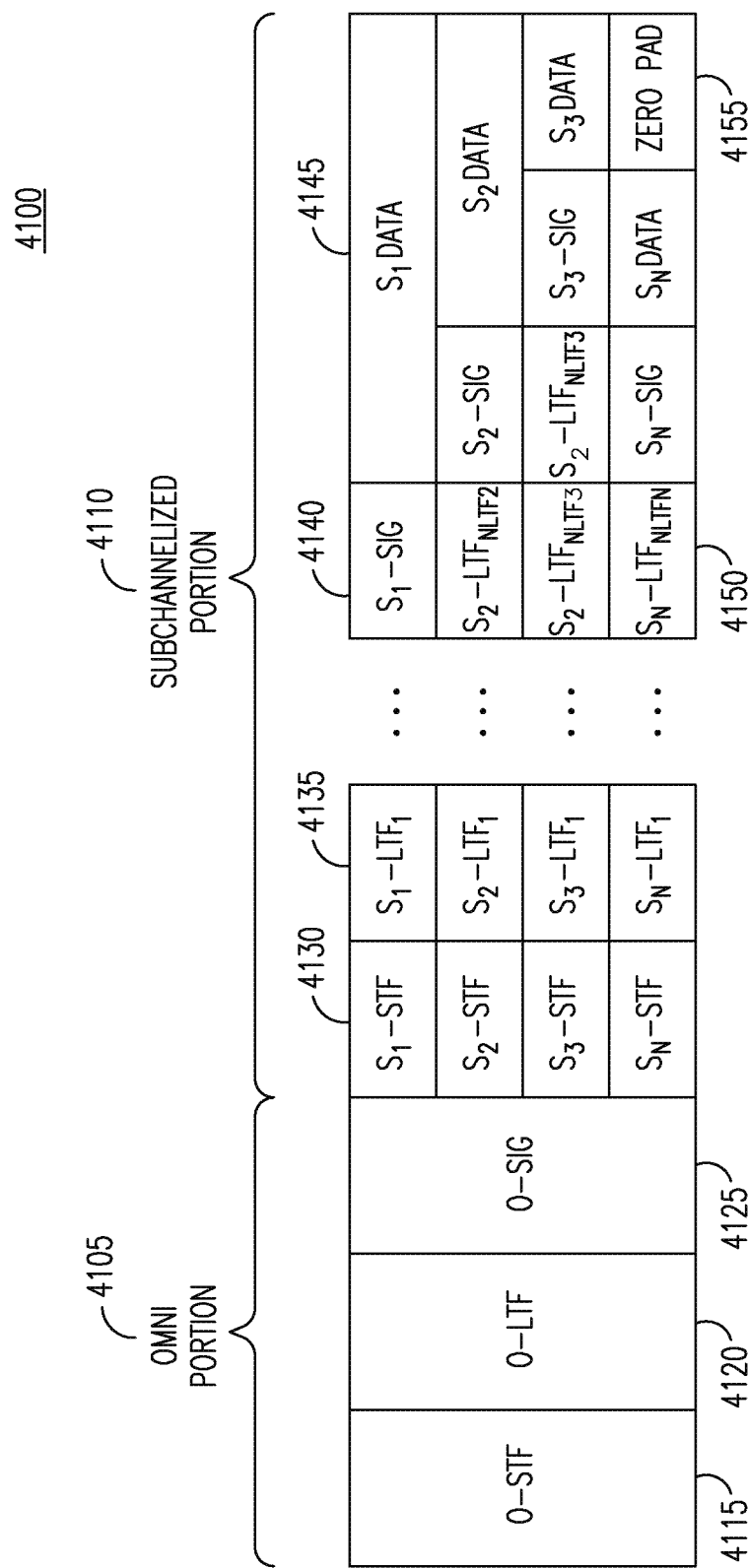
FIG. 41 is a diagram of another example DL COBRA preamble.

FIG. 41 is a diagram of an example DL COBRA preamble 4100 with different Nsts for different STAs. A DL COBRA preamble 4100 may include an omni portion 4105 and a sub-channelized portion 4110. The omni portion 4105 may include a full band O-STF 4115, an O-LTF 4120, and/or an O-SIG field 4125 and may precede the COBRA part of the preamble. The sub-channelized portion 4110 may include, for each STA, an S-STF 4130, an S-LTF 4135, an S-SIG 4140, and an S-Data field 4145. For some STAs, one or more S-LTFNLTF 4150 may be included. For some STAs, one or more Zero-Pad fields 4155 may be included. The one or more S-LTF1-NLTF 4150 fields may be included when more than on data stream is being transmitted per STA. The zero-pad field 4155 may be a string of zeros that may be appended to the data packet to ensure that the transmitted data packets from each STA are of the same length.

An STF may span the whole bandwidth of the transmission. It may have the same format as an 802.11ac L-STF. If the number of antennas at the transmitter is greater than 1, the O-STF may be transmitted from each antenna with a different cyclic shift (CSD). The O-STF may be used by the receiving STA for packet detection, AGC, and/or initial frequency and timing estimation. The Nss for O-STF may be one.

An LTF, similar to an O-STF, may span the complete bandwidth of the transmission. It may have the same format as an 802.11ac L-LTF. If the number of antenna at the transmitter is greater than 1, an O-LTF may be transmitted from each antenna with a different cyclic shift. These example fields may be used for more accurate frequency and timing offset estimation and the channel estimation of a subsequent SIG field. The Nss for O-LTF may be one.

FIG. 42 is a diagram of an example O-SIG field 4200. The O-SIG field 4200 may include a length subfield 4210, an Nsts subfield 4220, a group ID subfield 4230, a short GI subfield 4240, and an assignment sequence subfield 4250. The length subfield 4210 may indicate a length corresponding to the STA that requires a maximum number of OFDMA symbols. The Nsts field 4220 may be a matrix that indicates how many spatial streams are used for a STA in the sequence. The group ID field 4230 may indicate an ID for the target COBRA group. The short GI subfield 4240 may indicate whether a short guard interval is used in the data field. The assignment sequence subfield 4250 may indicate an order of different STAs of the group that may be assigned a different sub-channel. After reception of the O-SIG field, if the STA determines that packet didn't have information for itself, it may enter a sleep mode. Accordingly, this example may also serve as a PHY layer power saving mechanism.

The configuration of a sub-channelized short training field (S-STF) may depend on the size of a sub-channel assigned to the STA. The configuration of an S-STF in a frequency domain may be similar to an STF sequence corresponding to bandwidth. For example, for an 80 MHz COBRA transmission, if 3 STAs are assigned sub-channel 1, and a combination of sub-channel 1 and sub-channel 2, the S-STF sequence for the first two STAs may be the same as a 20 MHz STF and the S-STF sequence for the third STA may be the same as a 40 MHz STF. These S-STFs may be concatenated in a frequency domain before performing IFFT and appending cyclic prefixes to it. If the number of antennas at a transmitter is greater than 1, an S-STF may be transmitted from a different antenna with a different CSD. An S-STF may be used by the receiving STA to recreate the AGC in its own band for more accuracy.

In another example, an S-STF may be identical in all the sub channels. For reducing PAPR, phase rotated copies of the first sub-channel S-STF may be used in the other sub-channels. The configuration of an S-STF in a frequency domain may be similar to an STF sequence corresponding to the bandwidth of the smallest sub-channel. For example, for an 80 MHz COBRA transmission, if there are 4 STAs assigned to 4 sub-channels, the S-STF sequence may be the same as a 20 MHz STF. This may be repeated and/or concatenated for all the different sub-channels in the frequency domain before performing IFFT and appending cyclic prefixes to it. They also may be repeated in time. If the number of antennas at the transmitter is greater than 1, the S-STF may be transmitted from different antennas with a different cyclic shift delay (CSD). The S-STF may be used by the receiving STA to recreate the automatic gain control (AGC) in its own band for more accuracy.

The configuration of a sub-channelized long training field (S-LTF) may depend on the size of the sub-channel assigned to the STA. The configuration of the S-LTF in a frequency domain in may be similar to an LTF sequence corresponding to a bandwidth. For example, for an 80 MHz COBRA transmission, if there are 3 STAs, they may be assigned to sub-channel 1, and a combination of sub-channel 1 sub-channel 2. In this example, the S-LTF sequence for the first two STAs may be the same as the 20 MHz LTF, and the S-LTF sequence for the third STA may be the same as a 40 MHz LTF. The S-LTFs may be concatenated in a frequency domain before performing IFFT and appending cyclic prefixes to it. The S-LTFs may be repeated in a time domain before or after appending cyclic prefixes. For every STA, the AP may be transmitting an Nsts number of S-LTFs. Hence, different numbers of S-LTFs may be present if a different MIMO mode is used on different sub-channels. These additional S-LTFs may be generated using a P matrix. A P matrix may be an orthogonal permutation matrix. For example, a 4×4 P matrix may be shown as 1 −1 1 1; 1 1 −1 1; 1 1 1 −1; −1 1 1 1. The S-LTFs may be used to estimate one or more MIMO channels for each sub-carrier in the transmission.

In another example, an S-LTF may be identical in all the sub-channels. For reducing PAPR, phase rotated copies of the first sub-channel S-LTF may be used in other sub-channels. The configuration of an S-LTF in a frequency domain may be similar to an LTF sequence corresponding to a bandwidth of the smallest sub-channel. For example, for an 80 MHz COBRA transmission, if there are 4 STAs assigned to 4 sub-channels, the S-LTF sequence may be the same as a 20 MHz LTF. This may be repeated and/or concatenated for all the different sub-channels in a frequency domain before performing IFFT and appending cyclic prefixes to it. For every STA, an AP may be transmitting a number of S-LTFs that may be equal to Nsts. Accordingly, a different number of S-LTFs may be present if a different MIMO mode is used on the different sub-channels. These additional S-LTFs may be generated using a P matrix. The S-LTFs may be used to estimate one or more MIMO channels for each sub-carrier in the transmission.

FIG. 43 is a diagram of an example S-SIG field 4300. This S-SIG field 4300 may include all the information required by the receiving STA to decode the data portion of the packet in the sub-channel assigned to the STA. For example, the S-SIG field 4300 may include an MCS subfield 4310, an STBC subfield 4320, an FEC coding subfield 4330, a beamformed subfield 4340, and a CRC subfield 4350. The MCS subfield 4310 may indicate a modulation and coding for a sub-channel. The STBC subfield 4320 may indicate whether STBC is used for the sub-channel. The FEC coding subfield 4330 may indicate whether LDPC is enabled for the sub-channel. The beamformed subfield 4340 may indicate whether beamforming was performed for the sub-channel, and the CRC subfield 4350 may indicate whether the CRC may be computed and masked by the partial AID of the STA for added protection. Alternatively, the CRC subfield 4350 may indicate a simple CRC.

Figure 44:
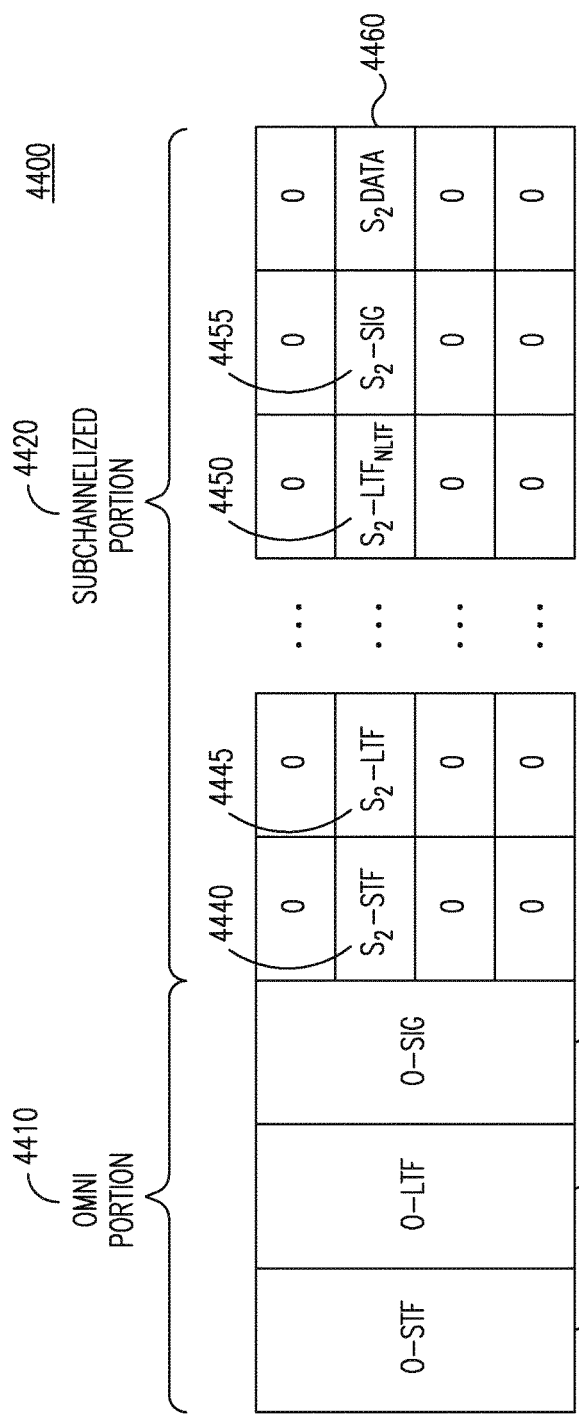
FIG. 44 is a diagram of an example UL COBRA preamble.

FIG. 44 is a diagram of an example UL COBRA preamble 4400 with an omni portion. The UL COBRA preamble 4400 may be divided into two portions. The first portion of the UL COBRA preamble 4400 may be referred to as the omni portion 4410, and may be optional. The second portion of UL COBRA preamble 4400 may be a sub-channelized portion 4420. In this example, one or more fields in different sub-channels may be used by a STA transmitting in those sub-channels.

The omni portion 4410 of the UL COBRA preamble 4400 may include a full band uplink omni short training field (UL-O-STF) 4425, an uplink omni short training field (UL-O-LTF) 4430, and/or an O-SIG field 4435. The UL-O-STF 4425, UL-O-LTF 4430, and the O-SIG field 4435 may precede the sub-channelized portion of the frame. The omni portion 4410 of the UL COBRA preamble 4400 may include one spatial stream (Nss=1).

The sub-channelized portion 4420 of the UL COBRA preamble 4400 may be divided into different sub-channels in frequency for different STAs. The sub-channelized portion 4420 of the UL COBRA preamble 4400 may include, for each STA, an S-STF 4440, an S-LTF 4445, an S-LTFNLTF 4450, an S-SIG field 4455, and an S-Data field 4460. The ellipses may represent the numbering of LTFs from 1 to NLTF. The S-SIG field 4455 may be STA specific and contain the MCS and other information for the AP to decode the S-Data field 4460.

Figure 45:
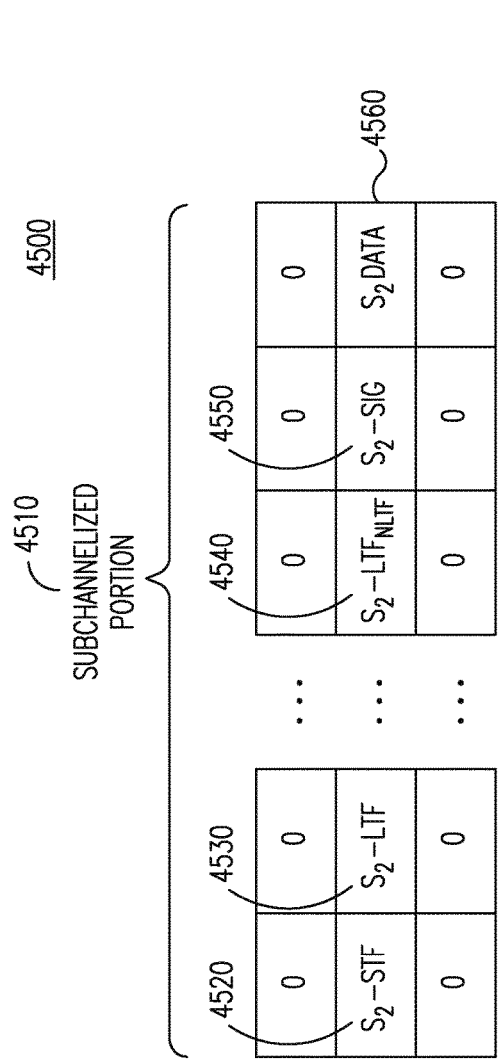
FIG. 45 is a diagram of another example UL COBRA preamble.

FIG. 45 is a diagram of an example UL COBRA preamble 4500 without an omni portion. In this example, the sub-channelized portion 4510 of the UL COBRA preamble 4500 may be divided into different sub-channels in frequency for different STAs. The sub-channelized portion 4510 of the UL COBRA preamble 4500 may include, for each STA, an S-STF 4520, an S-LTF 4530, an S-LTFNLTF 4540, an S-SIG field 4550, and an S-Data field 4560. The ellipses may represent the numbering of LTFs from 1 to NLTF. The S-SIG field 4550 may be STA specific and contain the MCS and other information for the AP to decode the S-Data field 4560.

The uplink O-STF (UL-O-STF) may span the complete bandwidth of the transmission. The UL-O-STF may have the same format as an 802.11ac L-STF. The UL-O-STF may be transmitted from each STA with a different and pre-defined cyclic shift. If the number of antennas at transmitter is greater than 1, each antenna may also have a different cyclic shift. To successfully detect the entire packet, all the STAs may be well-synchronized. This synchronization may be an optional part of the transmission. However, it may help in backward compatibility and add protection to hidden nodes in an OBSS, where the hidden nodes may not hear the AP but may hear a specific STA.

The UL-O-LTF, similar to the UL-O-STF, may also span the complete bandwidth of the uplink transmission. The UL-O-LTF may have the same format as an 802.11ac L-LTF. The UL-O-LTF may be transmitted from each STA with a different and pre-defined cyclic shift. If the number of antennas at transmitter is greater than 1, each antenna may have a different cyclic shift. The Nss for the UL-O-LTF may be one. The UL-O-LTF may be used at the AP to estimate a frequency and timing offset estimation and the channel estimation of SIG field following it more accurately.

If used, this information may be identical in all the uplink transmitting STAs. Since the AP may have scheduled this transmission, this information may not be useful. The UL-O-LTF and the UL-O-STF may be an optional part of the transmission. However, they may help in backward compatibility and add protection to hidden nodes in an OBSS, where the hidden nodes may hear the STA but not the AP.

Figure 46:
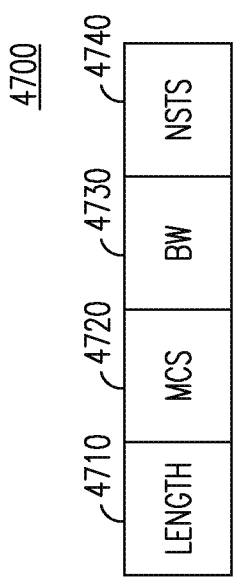
FIG. 46 is a diagram of an uplink omni SIG (UL-O-SIG) field.

FIG. 46 is a diagram of an uplink omni SIG (UL-O-SIG) field 4600. The UL-O-SIG field 4600 may include a length subfield 4610, an MCS subfield 4620, a bandwidth (BW) subfield 4630, and an Nsts subfield 4640. The length subfield 4610 may indicate a length corresponding to a UL COBRA STA that may require a maximum number of OFDM symbols. The MCS subfield 4620 may indicate an MCS corresponding to a UL COBRA STA that may require a maximum number of OFDM symbols. The BW field 4630 may indicate a total bandwidth for a UL COBRA transmission. The Nsts field 4640 may indicate the highest number of uplink space-time streams among all the UL COBRA STAs.

A UL-S-STF may be transmitted in a sub-channel assigned to a STA. The UL-S-STF may be transmitted in a frequency domain that may be similar to an STF sequence corresponding to a bandwidth of the sub-channel. For example, for an 80 MHz COBRA transmission, if one or more STAs are assigned one sub-channel of 20 MHz, a UL-S-STF sequence may be same as an 802.11ac 20 MHz STF. All the other sub-carriers for all other sub-channels in frequency may be nulled, and assigned a 0 power. IFFT may be applied and cyclic prefixes may be appended to the signal if the number of antennas at a transmitter is greater than 1, and an S-STF may be transmitted from a different antenna with a different cyclic shift. This procedure may be used by the AP to recreate the AGC in that band for more accuracy.

The configuration of an uplink S-LTF in a frequency domain may be similar to an LTF sequence corresponding to a bandwidth of a sub-channel to which a STA may be assigned. For example, for ab 80 MHz COBRA transmission, if one or more STAs are assigned one sub-channel of 20 MHz, an S-LTF sequence may be same as an 802.11ac 20 MHz STF. All the other sub-carriers for all other sub-channels in the frequency may be nulled and assigned a 0 power. IFFT may be applied and cyclic prefixes may be appended to the signal if the number of antennas at the transmitter is greater than one. For every STA, a number of S-LTFs may equal a number of Nsts. The number of S-LTFs may be used to estimate one or more MIMO channels for each sub-carrier in the uplink transmission. A different STA may have a different number of Nsts, and therefore may transmit a different number of S-LTFs in the uplink transmission. This may result in an offset I, where I may be a variable representing the offset, for processing different sub-channels in an example situation where the AP may be receiving data from one STA and receiving an S-SIG from another STA. To reduce complexity, the AP may schedule a STA to transmit an identical number of spatial streams (Nsts) as the AP.

The AP may determine how to schedule one or more UL COBRA transmissions for different STAs since the AP may have knowledge of traffic information, a physical channel, an/or an RSSI, etc. for all the STAs. The AP may also determine the modulation and coding scheme for a different STA in UL COBRA transmissions. Therefore, it may be possible to remove or shorten the uplink S-SIG field (UL-S-SIG) transmitted by the UL COBRA STAs if the UL COBRA transmission is within a contention free period or within an acquired TXOP. Mixed transmission of STBC and non-STBC may be allowed in UL COBRA transmissions.

When a UL COBRA transmission is protected by MAC signaling or handshakes, such that the transmission may be within a contention free period or within an acquired TXOP, it may be possible to remove the SIG field in the UL COBRA transmission. For example, all the information, such as BW, STBC, group ID, NSTS, GI, Length, and MCS may be assigned by AP, and broadcast in a UL COBRA management frame.

Even though the transmission of a UL COBRA session may be within a contention free period or within an acquired TXOP, the unintended STAs may expect to detect a SIG field and set NAV accordingly. In this case, a shortened SIG field may be transmitted. The shortened SIG field may follow an LTF field with a length of two OFDM symbols. Additional LTFs for multiple space-time streams may be transmitted following the shortened SIG field. All the information normally carried in the SIG field, such as BW, STBC, group ID, NSTS, GI, Length, MCSs, may be assigned by the AP, and broadcast in a UL COBRA management frame.

Figure 47:
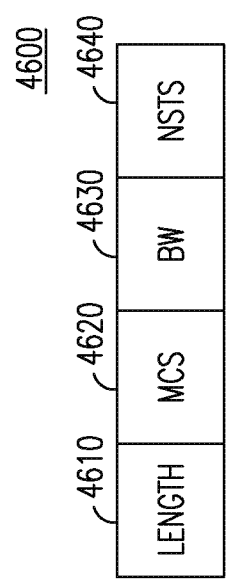
FIG. 47 is a diagram of an example shortened SIG field.

FIG. 47 is a diagram of an example shortened SIG field 4700. The shortened SIG field 4700 may include a length subfield 4710, an MCS subfield 4720, a BW subfield 4730, and an Nsts subfield 4740. The length subfield 4710 may indicate a length corresponding to a UL COBRA STA that may require a maximum number of OFDM symbols. The MCS subfield 4720 may indicate an MCS of the sub-channel. The BW subfield 4730 may indicate a bandwidth of the sub-channel. The Nsts subfield 4740 may indicate an Nsts used in the sub-channel.

For transmit beamforming (TxBF) in downlink 802.11 systems, knowledge of channel state information (CSI) may be needed. For example, the channel may be sounded between two devices participating in TxBF. The basic concept of sounding may be similar to 802.11n, where the channel may be measured at the receiver using the LTF during a null data packet (NDP) and transmitted back to the transmitter. However, in 802.11n, this may be configured for a single STA occupying the entire frequency band. The system may be modified to accommodate multiple STAs in different frequency bands.

Feedback mechanisms and sequences of operation may be modified for multiple STAs. CSI obtained from sounding may also be used for assigning different sub-channels to different STAs. In a frequency selective environment, a bad channel for one STA may be a good channel for another STA. TxBF may be important when the AP is transmitting to multiple STA with different capabilities. For example, an AP may have 2 antennas, STA1 may have 2 antennas, and STA2 may have 1 antenna. STA1 and STA2 may occupy different sub-channels. The AP may communicate with STA1 using Spatial Multiplexing (SM) but not with STA2. In this example, using TxBF with a dominant mode may improve link performance at minimal cost or complexity to either one or both of the STAs and also improve system capacity.

TxBF may be important when the AP is transmitting to multiple STAs on multiple sub-channels with varied SNR conditions. Using TxBF with different MCS modes may improve link performance and system capacity. Power loading algorithms in conjunction with TxBF also may be used for COBRA systems.

In order to determine the weights or precoding matrix for TxBF, knowledge of the CSI for all the STAs in all sub-channels may be required at the transmitter. The algorithm of computing TxBF weights may be based on eigenvalue decomposition per STA, with or without using a codebook. The channel may be sounded between the AP and multiple STAs.

The AP may simultaneously transmit a null data packet (NDP) for all the STAs that may be part of the COBRA group. The NDP may have a similar preamble as a data bearing packet with no data. A packet that does not include data may be indicated by a length field=0. In this example, however, the Nsts and MCS may be selected according to the channel dimensionality to be sounded. Typically the Nsts and MCS may correspond to a maximum number of antenna at the AP, however, the number may be smaller to reduce the preamble overhead, if less data rate is required or if a dominant mode transmission is required. The AP may transmit an NDP to a single STA or it may transmit a sub-channelized NDP to multiple STAs. The AP may transmit a different number of sub-channel NDPs to different channels. After receiving a sounding packet, the STA may transmit CSI feedback or a Beamforming report. The CSI feedback and the Beamforming report may be compressed or non-compressed.

If the STA needs to sound the channel from the AP, it may transmit a request to the AP for a sounding grant. This request may be piggybacked in a data frame or an ACK frame, or it may be a separate request to sound, similar to an RTS. The AP may group different STAs together for uplink transmission and transmit a sub-channelized CTS (sCTS) frame requesting an NDP. Some STAs may have uplink COBRA transmission and others may have NDP transmission. All STAs may have NDP transmission. If there is no other transmission, the AP may request that the STA sound a full band instead of a sub-channel. Different STAs may have a different number of S-LTFs for the uplink transmission, and this number may depend on STA capabilities.

Sounding may be performed using a staggered preamble. For example, instead of transmitting an NDP, an AP may increase a number of long training fields (LTF)s (NLTF)s for a dimension of the channel to be sounded and may request the STAs to sound the channel. The STA may then estimate the channel, store one or more CSI and/or Beamforming coefficients, and transmit them in a later uplink transmission. This example may reduce overhead.

A staggered preamble may reduce signaling overhead in an uplink sounding example. During its own transmission, a STA may transmit a number of S-LTFs required for the sounding and it may request the AP to sound the channel. The STA may then estimate the channel, store one or more CSI and/or beamforming coefficients, and transmit them in a later downlink transmission.

A beamforming report may a complete CSI and/or one or more beamforming matrices computed by the beamformee STA in a non-compressed or compressed version. After receiving the sounding packet, the beamformee may compute the beamforming weights with any method. Upon receiving the feedback, the beamformer may apply the weights without any further modification. This approach may offer the beamformer control over the technique used for beamforming. A method for decomposing the channel such as singular value decomposition (SVD) and variant algorithms may be used, but others may be used without loss of generality. The overhead of the feedback with non-compressed beamforming weights may be identical to that of a complete CSI feedback. Non-compressed beamforming weights may be quantized by a number of bits agreed upon by the AP and the STA.

A matrix from these non-compressed beamforming weights may be compressed by nulling some of the entries in the matrix by a rotation and then quantizing the weights. All the following mode of transmission may be packed and transmitted in the same sub-channel STA that may be assigned by the AP. The STA may transmit its own information. The STA may transmit a CSI and/or beamforming matrix of its own band after the sounding. The STA may transmit information for an entire band. Because of the structure of an S-STF, it may be possible for a STA to estimate one or more channels for another band as well. The STA may transmit information for a dominant mode if a rank is lower, where the rank may refer to the number of independent streams that a MIMO channel may support for a specific transmission to a receiver. In one example, a STA may, based on a correlation in the channel, transmit information to beamform for a dominant mode and save some overhead for transmitting a complete CSI.

The STA may transmit differential information about one or more of the other bands. This example may serve as a compression technique that a STA may use to transmit information about one or more other bands without consuming a lot of transmission time. This differential information may be requested by the AP.

The STA may transmit feedback for its own band and Rx-power for one or more other bands. This example may help the AP schedule its transmissions in an optimal fashion. For one or more of the STAs replying back on a full band, all the options stated in the previous paragraph may be transmitted over the entire bandwidth. The AP may schedule a group to transmit their beamforming reports one after another in a sequence in the sounding poll.

The receiving STA may transmit CSI feedback immediately after a SIFS duration after receiving a sounding PPDU. The CSI feedback may be transmitted as a separate response of an aggregated MAC frame.

If the receiving STA is not capable of transmitting a CSI feedback immediately after a SIFS duration, the CSI feedback may be transmitted in a MAC frame or piggybacked with another data frame. A separate TXOP may be used for this CSI feedback transmission.

In the above mentioned example procedures, the beamformee may transmit information for every sub-carrier or every other sub-carrier, and so on, with different feedback density. This information may also be agreed upon between the beamformee and beamformer.

Implicit feedback may be based on the reciprocity relationships for TDD systems. Ideally, the channel state information measured at either end of the link may be equivalent. The AP may be able to measure the channel for an individual STA in an individual sub-channel. However, interference, noise, analog component characteristics, impairments and distortions in RF may not be reciprocal as well. Calibration exchange in a sub-channel may be required for implicit feedback COBRA beamforming in that channel. The AP may determine to perform a calibration for a selected subset of the sub-channels. The subset may be just one sub-channel, some of the sub-channels, or all of the sub-channels. The AP may calibrate one or more STAs for their own bands. The AP may calibrate one or more STAs for full bands, one after another, similar to IEEE 802.11n. The AP may perform a hybrid method where sounding may be performed in multiple bands, but the entire band may be used for uplink CSI transmission at the end of calibration. The AP may poll STAs one after another for using the entire band for uplink transmission of CSI. The AP may also schedule a STA in sequence for uplink transmission of CSI.

The AP may transmit a QoS data frame that may solicit sounding, and may include a request for calibration. This frame may be transmitted to one or more of the STAs individually in same COBRA transmission. The QoS data frame may also indicate that it is a calibration start frame. The QoS data frame may set an ACK policy field to GroupACK. Accordingly, an ACK response may be requested from one or more of the STAs simultaneously. The AP may also reserve an uplink transmission opportunity (TXOP) for the ACK and/or a sounding report from one ore more of the STAs. These selected STAs may transmit a frame that may include a sounding PPDU and/or a piggybacked ACK piggybacked.

The AP may use these sounding PPDUs to measure the channel for the STAs in a reverse direction, and then may transmit its own QoS PPDU. The QoS PPDU may include a CSI feedback request and indicate that sounding is complete. The QoS PPDU may reserve a TXOP for the CSI response from one or more of the STAs. The STA may use this sounding PPDU to measure CSI in a forward direction, and may transmit a CSI response back in a reserved TXOP. The STAs that may not be engaged in a calibration procedure may transmit and/or receive their scheduled data during this period. Alternatively, the sub-channel may be silent during this time. The AP may take the opportunity to calibrate a same STA for another channel for a future transmission, even if it may not be needed in an immediate transmission slot.

The AP may transmit a QoS data frame that may solicit sounding and may include a request for calibration. The AP may also indicate that this QoS data frame is an NDP calibration frame and the NDP may follow. The QoS data frame may be transmitted to one or more of the STAs individually in the same COBRA transmission. The AP may also indicate that the QoS data frame is a calibration start frame. The AP may set an ACK policy field to GroupACK in the QoS data frame. Accordingly, an ACK response may be requested from one or more of the STAs simultaneously. The AP may also reserve an uplink TXOP for the ACK and/or sounding report from one or more of the STAs. These selected STAs may transmit an ACK. In response to receiving the ACK, the AP may transmit its announced NDPs on one or more of the selected sub-channels.

One or more of the STAs may transmit an NDP back on those channels in response. This may be implicitly assumed and covered by an initial TXOP. The STA may use this sounding PPDU to measure CSI in a forward direction and may transmit a CSI response in a reserved TXOP. After this NDP exchange between the AP and participating STAs, the AP may transmit a CSI feedback request and indicate that sounding is complete. The AP may also reserve a TXOP for the CSI response from one or more of the STAs.

The STAs that may not be engaged in a calibration procedure may transmit and/or receive their scheduled data during this period. Alternatively, the sub-channel may also be silent during this time. The AP may take the opportunity to calibrate the same STA for other channels for a future transmission, even if it may not be needed in the immediate transmission slot.

Typically, a STA that transmits to the AP in any of 802.11n/ac/af/ah may be previously synchronized with the AP on the primary channel during the initial setup procedure between the AP and the STA. This may be sufficient for downlink operation including downlink operation that may utilize downlink MU-MIMO, and uplink operation that may utilize SU-MIMO on one STA at any particular symbol time period. When multiple STAs communicate simultaneously on the uplink over the same frequency band, methods for timing alignment may be needed to ensure that these transmissions arrive at the AP within one cyclic prefix.

With the introduction of COBRA, methods that address performance loss due to interference may be needed. For example, interference may be very uneven among resource blocks that may be reserved for communication, necessitating the introduction of methods and/or procedures to address.

If a standalone UL COBRA transmission follows the procedure shown in FIG. 29, a multi-stage frequency synchronization may be applied. Frequency offset estimation may be performed based on the Req and Resp packets transmitted between the AP and the STAs. The AP may transmit a Req frame to one or more of the STAs. The COBRA STAs may receive the Req frame and perform a frequency offset estimation based on the received Req frame. The COBRA STAs may transmit Resp frames sequentially to the AP. The STAs may compensate the estimated frequency offset on the Resp transmission. The AP may receive the Resp frame, estimate the residual frequency offset again and broadcast this information in a UCAF.

Accordingly, a closed loop frequency synchronization may be performed. One advantage of multistage synchronization may be that the AP may broadcast the residual frequency offset, which may be relatively smaller than a normal frequency offset. Thus, it may be transmitted with either fewer bits or with better accuracy, given the same bits.

Multi-stage frequency synchronization may be applied to a combined DL/UL COBRA system. During a DL COBRA transmission, a carrier frequency offset (CFO) may be estimated at each STA. The STA may then apply the estimated CFO to the BA transmission shown in FIG. 35. The AP may transmit a DL COBRA frame to the STAs. The COBRA STAs may perform a frequency offset estimation based on the received DL COBRA frame. The COBRA STAs may transmit BA frames sequentially to the AP. The STAs may compensate the estimated frequency offset on the BA transmission. The AP may receive BAs, estimate the residual frequency offset again and broadcast this information in the UCAF.

The AP may broadcast the residual frequency offset. Accordingly, the residual frequency offset may be transmitted with either fewer bits or with better accuracy given the same bits.

The example MAC signaling procedures shown in FIGS. 29 and 35 may not be necessary. The system may perform frequency synchronization in a separate time slot before the UL COBRA session. In this example, frequency synchronization may be performed by using a random access channel as shown in FIG. 36. The AP may indicate one or more sub-channels as random access channels in the following UL COBRA session in a UCAF. The STAs that may be capable of transmitting UL data may compete for the one ore more UL random access channels. Each STA may select or be pre-assigned a random access sequence. The AP may estimate the frequency offset of each STA that transmitted using a random access channel, and record the information. The AP may group one ore more STAs for a new UL COBRA session, and may utilize the recorded frequency offset to align the STAs.

When the combination of timing difference due to UL COBRA STAs and delay due to multi-path channel are larger than a guard interval of an OFDM system, the receiver may have difficulty detecting the packets. Utilizing long guard intervals for UL COBRA transmissions may be part of the solution. Moreover, the AP may estimate the round trip delay for one ore more STAs, and broadcast this information in the UCAF. The STAs may adjust the transmission time accordingly such that packets from all the UL COBRA STAs may arrive within the guard interval.

In the example shown in FIG. 35, the AP may record the time of departure of packet Req as t0. The STAs may then transmit Resp frames sequentially to the AP. The transmission of a Resp frame may be aligned with the AP instead of aligning with the end of a previous transmission. In the example frame shown in FIG. 19, STA1 may transmit Resp1 at the time t1+SIFS+duration(Req), where t1 is the time of departure of the Req frame estimated by STA1. STA2 may transmit Resp2 at the time t2+2SIFS+duration(Req)+duration(Resp1), where t2 may be the time of departure of Req frame estimated by STA2. STA3 may transmit Resp3 at the time t3+3SIFS+duration(Req)+duration(Resp1)+duration(Resp2), where t3 may be the time of departure of Req frame estimated by STA3. STA4 may transmit Resp3 at the time t4+4SIFS+duration(Req)+duration(Resp1)+duration(Resp2)+duration(Resp3), where t4 may be the time of departure of Req frame estimated by STA4.

The AP may record the time of arrival (TOA) of each Resp packet, and calculate the round trip delay. For example, a single trip delay for each STA may be denoted as $\Delta k$, where k may be a STA index. With the above described procedure, $\Delta k = tk - t0$, and $k = 1, \ldots, 4$. TOA of Resp from STAs may be expressed as:

$$TOA1 = t0 + \Delta_1 + SIFS + duration(Req) + duration(Resp1) + \Delta_1;$$  Equation (5)

$$TOA2 = t0 + \Delta_2 + 2SIFS + duration(Req) + duration(Resp1) + duration(Resp1) + \Delta_2;$$  Equation (6)

$$TOA3 = t0 + \Delta_3 + 3SIFS + duration(Req) + duration(Resp1) + duration(Resp2) + duration(Resp3) + \Delta_3; \text{ and}$$  Equation (7)

$$TOA4 = t0 + \Delta_4 + 4SIFS + duration(Req) + duration(Resp1) + duration(Resp2) + duration(Resp3) + duration(Resp4) + \Delta_4.$$  Equation (8)

Comparing TOAk with t0, the AP may estimate the single trip delay $\Delta k$. The AP may broadcast the estimated single trip delay in the UCAF. According to this information, one ore more STAs may align with others by transmitting at the time SIFS-2$\Delta k$.

The AP may estimate the round trip delay for each STA and broadcast this information in the UCAF. The STA may adjust the timing offset for an UL COBRA transmission accordingly. For example, the AP may record the time of departure of the DL COBRA frame. The AP may also perform a start-of-packet detection on the first BA packet. Comparing the recorded time and detected arrival time, the AP may estimate the round trip delay for the first STA. Similarly, the AP may calculate the time difference between a BAR and a BA to estimate the round trip delay for the rest of the STAs.

The example MAC signaling procedures shown in FIGS. 29 and 35 may not be necessary. The system may perform timing synchronization in a separate time slot before the UL COBRA session. Timing synchronization may be performed by using one ore more random access channels as shown in FIG. 36. Using one ore more random access channels, the STAs may transmit their random access sequence that may include an encoded time stamp of the time of departure. The AP may compare the arrival time with the encoded time stamp, and estimate the single time delay.

Figure 48:
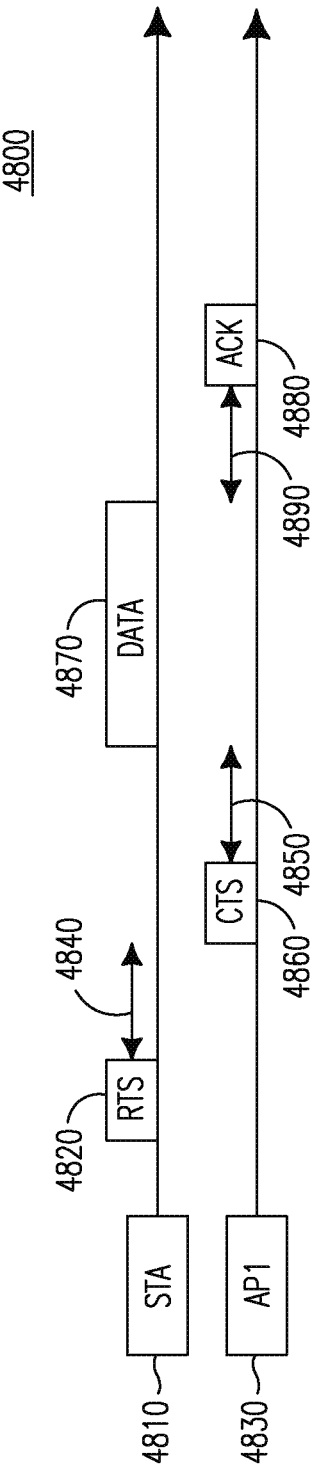
FIG. 48 is a diagram of an example procedure to detect a timing offset.

FIG. 48 is a diagram of an example procedure 4800 to detect a timing offset. A known SIFS gap may be used to detect one or more timing offsets between STAs relative to the AP. As shown in the example in FIG. 48, a STA 4810 may transmit an RTS 4820 to an AP 4830. If the AP 4830 begins timing the SIFS starting at the end of the received RTS 4820, the STA-AP delay 4840, based on the distance between the two devices, may add an additional delay to the exchange. In this example, the STA-AP delay 4840 may be SIFS+2t, where t may be the time delay due to the distance between that STA 4810 and the AP 4830. Once the AP 4830 begins transmitting, that same delay 4850 may occur in the CTS transmission 4860, so the STA may receive the CTS transmission 4860 with an additional delay 4850 that may correspond to 2× the distance between the devices. Similarly, the AP 4830 may measure the time between the end of transmission of the CTS 4860 and the beginning of a reception of the data 4870 and determine the distance between the STA 4810 and the AP 4830. Knowing this information, either the STA 4810 or the AP 4830 may initiate a procedure to adjust the timing of the STA UL transmission. In response to receiving the data 4870 from the STA 4810, the AP 4830 may transmit an ACK 4880 after a SIFS+2t delay 4890.

If the timing control settings are performed in 0.5 µs increments, the worst case residual error may be 0.25 µs. If 1 µs increments are used, the practical range required may be 7 meters (m) for an absolute setting that may adjust for over 1 km distance, which may be 3 bits. Two bits may be used for values of {0-3}, which, in one step, may adjust for 450 m difference. With two rounds of adjustment, a distance of 900 m may be accommodated. One may also consider retarding the time, which may mean a negative time offset. STAs very close to the AP may be asked to retard their UL transmit timing to reduce the amount that distant STAs may need to advance their UL data timing.

The ACK or CTS signal may be used in a manner similar to the timing adjustment parameter to instruct one or more STAs to increase/decrease transmit power levels, which may also be beneficial to the COBRA signal.

In the DL, the AP may transmit to a number of STAs simultaneously. The STAs may not receive the transmission at precisely the same time, but this may not present interference issues. However, in the UL, the STAs may request to transmit at various times, and the interframe spacing (IFS)/timeout mechanisms may come into play because the AP may delay the start of the sub-channelized UL frame until a sufficient number of nodes may be ready to transmit.

The STAs may request the bandwidth on the full band, on a random sub-channel that may be based on a signal quality or one or more bandwidth requirements, or on a dedicated ranging sub-channel.

Figure 49:
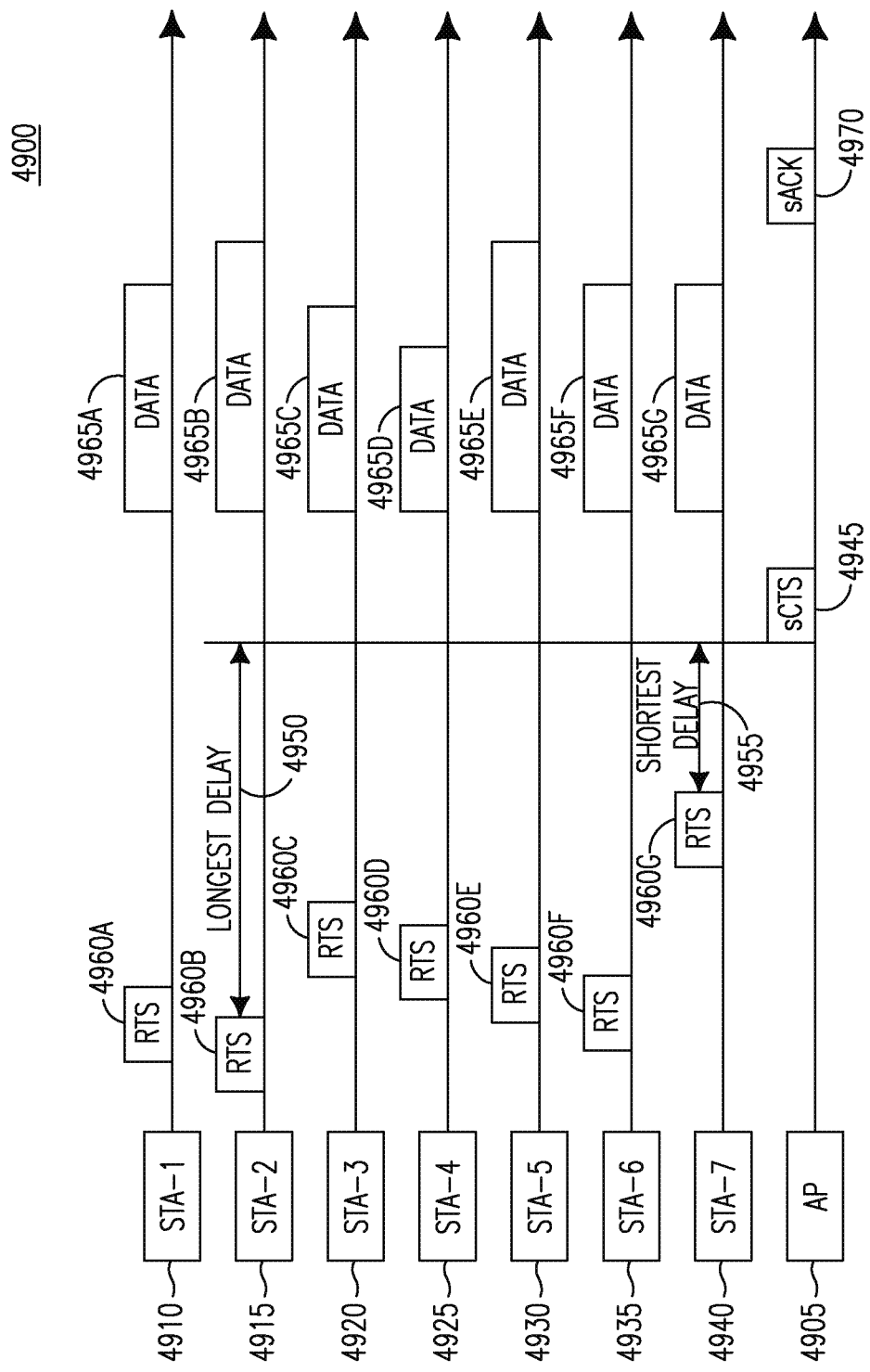
FIG. 49 is a diagram of an example procedure for coordination of a UL transmission.

FIG. 49 is a diagram of an example procedure 4900 for coordination of a UL transmission. The example procedure 4900 shows a coordination of a UL transmission between an AP 4905, and STA-1 4910, STA-2 4915, STA-3 4920, STA-4 4925, STA-5 4930, STA-6 4935, and STA-7 4940. In order to accommodate a random request for a sub-channelized UL transmission bandwidth, the sub-channelized CTS (sCTS) 4945 may have a longer delay allowance for each of the STAs, as shown in FIG. 49. In this example, STA-2 4915 may have the longest delay 4950, and STA-7 4940 may have the shortest delay 4955. The length of the delay for each STA may be based on, for example, the time from which each respective RTS 4960a, 4960b, 4960c, 4960d, 4960e, 4960f, and 4960g is transmitted and the time at which the AP 4905 may transmit the sCTS 4945. In response to receiving a respective data packet 4965a, 4965b, 4965c, 4965d, 4965e, 4965f, and/or 4965g, the AP 4905 may transmit a sACK 4970.

Rather than allowing for a very long delay before sCTS 4945, the AP 4905 may immediately transmit an indication that the respective RTS 4960a, 4960b, 4960c, 4960d, 4960e, 4960f, and/or 4960g was received and an sCTS 4945 may be transmitted within a variable period of time, allowing other devices to submit sub-channelized RTS messages. A predetermined burst transmission, which may include a sub-channel assignment, may be triggered by an sCTS from the AP.

An IEEE 802.11v example may include a location and timing synchronization feature. This feature may utilize a new time of departure (TOD) clock that may implement a higher frequency than a standard time synchronization function (TSF) timer. For example, the TOD clock may implement a timing unit of 10 ns. The propagation delay and TOD clock offset between the STAs and the AP may be estimated using the following procedure.

The COBRA controller may transmit a broadcast or unicast frame that may include a COBRA controller IE that may contain the TOD time stamp of the frame. This frame may conduct synchronization by including the time stamp of the AP (TODAP). Alternatively, the frame may also include other information such as Tx power used to facilitate transmit power control (TPC), and the like.

The COBRA controllee may measure a time of arrival at the STA (TOASTA) of the frame from the COBRA Controller that may contain the TOD timestamp and may calculate the difference between the TOA and TOD time T1=TOASTA−TODAP. The COBRA controllee may provide timing feedback to the AP by transmitting a frame that may contain the COBRA controllee IE with the option of the T1 feedback and the TODSTA, which may be the timestamp of the TOD of the frame departing from the COBRA controllee. The COBRA controller may then measure the TOAAP of the frame that may contain the COBRA controllee IE containing the TODSTA.

Using the information obtained from the COBRA Controller initiated process, the COBRA Controller may determine the propagation delay and TOD clock offset. The propagation delay between the COBRA Controller and the COBRA controllees may be determined using:

$$P\text{Delay}=(T1+(TOA_{AP}-TOD_{STA}))/2, \quad \text{Equation (9)}$$

where T1 and $TOD_{STA}$ may be obtained from the COBRA controllee IE and the $TOA_{AP}$ may be measured at the AP using the TOD clock. For TOD clock offset, the propagation delay between the COBRA controller and controllees may be determined using:

$$C\_\text{Offset}=(T1-(TOA_{AP}-TOD_{STA}))/2, \quad \text{Equation (10)}$$

where T1 and $TOD_{STA}$ may be obtained from the COBRA Controllee IE and the $TOA_{AP}$ may be measured at the AP using the TOD clock.

The COBRA controllee may initiate a propagation delay and TOD clock offset process by transmitting a broadcast or unicast frame that may include a COBRA controllee IE that may indicate the TOD time stamp of the frame, for example, a TODSTA. This frame may perform synchronization by including the TODAP time stamp. Alternatively, the frame may also incorporate other information such as Tx power that may be used to facilitate TPC, and the like.

The COBRA controller may measure the TOAAP of the frame from the COBRA controllee containing the TOD timestamp and calculate the difference between the TOA and TOD time T2=TOAAP−TODSTA.

The COBRA controller may provide timing feedback to the COBRA controllee by transmitting a frame containing the COBRA controller IE with the option of the T2 feedback and the TODAP, which may be the timestamp of the TOD of the frame departing from the COBRA controller. The COBRA controllee may then measure the TOASTA of the frame containing the COBRA controller IE containing the TODAP. The COBRA Controllee may then calculate T1=TOASTA−TODAP and may determine PDelay=(T1+T2)/2 and C_Offset=(T1−T2)/2.

The COBRA controllee may then adjust the TOD clock using C_Offset and transmit a frame that may contain the COBRA controllee IE including the T1 feedback and/or PDelay and/or TOD C_Offset as indicated by the option in the COBRA controllee IE.

One or more MAC operations may be based on a TSF Timer. For example, each STA may maintain a TSF timer with modulus 264 counting in increments of 1 microsecond, which may imply a precision of 1 microsecond. The TSF timers at the STAs and the AP may not be completely synchronized, and may be different for at least the propagation delay, which may depend on the distance between the STAs and the AP.

Coarse timing precision of the TSF timer may cause an extra delay when a STA may respond or transmit packets to the AP in response to a packet from the AP. For example, if the AP requests that a STA may start transmitting a UL COBRA packet after a SIFS duration counting from the end of a Req frame, the Req frame may end at a fraction of a microsecond, for example, 101.52 microseconds. The TSF timer may round the time to 102 microseconds and instruct the PHY to start transmission at 102+SIFS period, and may cause an extra delay of 480 nanoseconds (ns). This extra delay in combination of a propagation delay, for example, a round trip time (RTT) of 667 ns for a STA that may be 100 m away from the AP, may delay the UL COBRA packets such that they do not arrive at the AP within a GI.

In order to prevent excessive delay in the UL COBRA transmission due to coarse precision of the TSF timer, the TSF timer and the TOD clock may be used together for a more precise timing. For example, if the AP requests that the STAs start transmitting their UL COBRA transmissions after a SIFS duration counting from the end of the Req frame, the ns fraction of the TOD clock timestamp at the end of the Req frame may be noted in combination with the TSF timer timestamp. The UL COBRA transmission may be started after the SIFS duration has elapsed according to the TSF timer as well as the TOD clock. In the example mentioned above, the STA may start a UL transmission after the TSF timer reaches 101+SIFS and the ns portion of the TOD clock reaches 520 ns. Propagation delay may also be adjusted. Alternatively, the STA may determine to use the TOD clock for a subset or all MAC level timings.

The TOD Clock at the AP and the STAs may become unsynchronized due to TOD Clock drift. The propagation delay may change as well due to STA or AP movement or due to changes in the environment, and the like. The AP and the STAs may conduct a periodic refresh of the TOD clock offset and propagation delay estimation as well as perform monitoring of these parameters in order to maintain these parameters up-to-date.

After a COBRA controller initiated a TOD clock offset and propagation delay estimation process, the AP may relay information such as C_Offset and PDelay to the STA using a unicast frame that may include a unicast COBRA group management IE or a broadcast frame that may include the broadcast COBRA group management IE. The AP may also determine a refresh rate for the STA based on the TOD C_offset and PDelay changing rate. The exact refresh rate may depend on the tolerance of the AP for UL COBRA transmissions and factors such as TOD clock drift and mobility patterns of the STAs and the AP. At every refresh interval, the AP may initiate the COBRA controller initiated TOD clock offset and propagation delay estimation process again.

After a COBRA controllee initiated TOD clock offset and propagation delay estimation process, the STA may relay information such as C_Offset and PDelay to the AP using a frame that may include the COBRA controllee IE. The AP may determine a refresh rate for the STA based on the TOD C_offset and PDelay changing rate. The AP may inform the STA of such refresh frequency using a unicast frame that may contain the unicast COBRA group management IE or a broadcast frame that may contain the broadcast COBRA group management IE. At every refresh interval, the AP may determine to initiate the COBRA controller initiated TOD clock offset and propagation delay estimation process. The AP may also determine to have the STA initiate the COBRA controllee initiated TOD clock offset and propagation delay estimation process.

Similarly, the STA may monitor the channel conditions and propagation delay between the AP and itself. The STAs may monitor the AP beacons periodically. Since the beacon may contain the COBRA controller IE that may contain the TODAP timestamp of the beacon, the STA may calculate T1=TOASTA−TODAP. Since it may be assumed that the TOD clocks at the AP and at the STA have been adjusted for offset, T1 mostly may be an expression of the propagation delay. If the newly measured propagation delay has changed compared to the previously recorded value by some predefined threshold, the STA may inform the AP of such change by transmitting a frame to the AP including the newly acquired PDelay information in a COBRA controllee IE.

For DL COBRA transmission, the AP may start transmission and since each STA may receive its own packets, there may be no synchronization of the DL COBRA packets needed. When a UL COBRA group concurrently transmits their packets to the AP, these packets may arrive within a GI, which may be challenging due to different propagation delays, assuming that the TOD and TSF clocks may be synchronized using the methods described above. The propagation delay may be adjusted as follows.

Some STAs may be grouped and managed using grouping and group management procedures. For these UL COBRA groups, the AP may estimate a propagation delay and provide the STAs information such as delays that the STAs may adjust for in UL COBRA transmissions using a unicast or broadcast COBRA group management IE.

For example, if a UL COBRA group of STAs have the following round trip propagation delays, 1) STA1: 50 ns; 2) STA2: 100 ns; 3) STA3: 150 ns; 4) STA4: 200 ns, the AP may determine the following delays for the group of the STAs: 1) STA1: 75 ns; 2) STA2: 25 ns; 3) STA3: −25 ns; 4) STA4: −75 ns. The STAs may start their UL COBRA transmission by adjusting the SIFS period with the assigned delay values using any subset of the combination TSF timer and the TOD clock. The STAs in the UL COBRA group may monitor the channel conditions and propagation delays and inform the AP of changes.

Furthermore, a group of STAs may be grouped in an ad hoc manner without pre-arranging them into a group. These STAs, however, may have already performed a TOD clock offset and propagation delay estimation with the AP. The AP may indicate that the ad hoc grouped STAs may start their UL COBRA transmission using a Req frame. The AP may indicate a delay value for each STA in the Req frame. The delay value may be determined based on a propagation delay. The STAs may start their UL COBRA transmission by adjusting the SIFS duration with the assigned delay values using any subset of the combination TSF timer and the TOD clock.

With the introduction of COBRA, the range of preamble and data fields of a physical layer convergence procedure (PLCP) protocol data unit (PPDU) may be different if no change is made to the supported preamble formats. Methods that address the preamble format for possible block based resource allocations may be needed. Further, with the introduction of COBRA, methods that extend the procedures defined in IEEE 802.11ac for link adaptation and feedback beamforming may be needed.

The following examples may address issues associated with link adaptation. COBRA may allow multiple users to share the frequency time resources. Channel quality of the users on different sub-channels may be different. Thus for downlink COBRA, the AP may acquire a channel quality measurement and then assign a reasonable MCS level to a user or a specific sub-channel. For uplink COBRA, both adaptive modulation/coding and power control may be necessary.

The STAs and APs may indicate their capabilities and preferences for COBRA link adaptation prior to COBRA transmissions and receptions. The AP may include in its beacon, probe response or any other type of frame with an indicator that the AP may be capable of COBRA link adaptation. A STA may include in its association request, probe request, and other type of frames an indicator that the STA may be capable of COBRA link adaptation.

If a device is capable of COBRA link adaptation, it may initiate a channel measurement and MCS level mapping on COBRA sub-channels. The device may understand COBRA link adaptation related information elements, and control fields.

A COBRA link adaptation capability may be defined in a COBRA capability field. It may be possible to reuse the MCS feedback field defined in a high throughput (HT) extended capability field. Two (2) bits may be assigned for an MCS feedback field. For example, a value of 0 may indicate that the STA does not provide MFB, a value of 1 may indicate that the STA provides a COBRA MFB, a value of 2 may indicate that the STA may provide only an unsolicited MFB, and a value of 3 may indicate that the STA may provide MFB in response to MRQ as well as an unsolicited MFB.

Downlink link adaptation may require the knowledge of downlink radio channel quality. There may be two methods to estimate the downlink channel quality. One method may be to require explicit CQI feedback from STAs. Another method may be to estimate the downlink channel through uplink transmission given that the transmit power of STAs may be known.

There may be two different channel quality indicator feedback mechanisms. In a first example, in band CQI feedback may be used. In this example, the AP may transmit a CQI requirement on one or more sub-channels that it may intend to utilize to the STA. The STA may measure the channel quality on the one or more sub-channels and provide feedback to the AP. This feedback may be utilized by the AP to assign MCS on the specified sub-channels. In a second example, out of band CQI feedback may be used. In this example, the AP may transmit a general CQI requirement to a STA. The STA may measure CQI on all the sub-channels and provide feedback to the AP. This feedback may assist the AP to schedule one or more sub-channels to STAs.

Three types of feedback mechanisms may be supported. A first type of feedback may be MCS feedback (MFB) which may be used for link adaptation. A second type of feedback may be antenna selection feedback (ASEL). Both MFB and ASEL feedback may be determined using one measurement or an indication over the entire frequency band. A third type of feedback may be beamforming feedback, which may include channel state information (CSI) feedback, compressed feedback and/or non-compressed feedback. Beamforming feedback may be implemented for every sub-carrier, every two sub-carriers or every four sub-carriers. There may not be feedback elements or frames defined for MCS selection on one or more sub-channels.

FIG. 50 is a diagram of an example explicit channel quality indicator (CQI) feedback mechanism 5000 using modulation and coding scheme (MCS) feedback (MFB). One way to implement a sub-channel based CQI feedback mechanism may be to reuse MFB mechanisms, but modify it to allow COBRA support. In a typical IEEE 802.11 example, an MFB requester may transmit a frame containing a HT control field with an MCS request (MRQ) subfield equal to 1. The frame with an MRQ requirement may be transmitted within a sounding PPDU, or with an NDP announcement subfield in the +HTC frame, for example, a frame with an HT control field, set to 1 and following the +HTC frame by an NDP transmission.

In a COBRA example, the MFB requester 5010 may request MCS feedback for one or more sub-channels. The MFB requester 5010 may transmit an MCS feedback request in a frame 5015, for example, a sounding packet, to an MFB responder 5020. A sub-channel ID may be configured and utilized for a COBRA system. For example, if 8 sub-channels are defined, then sub-channel ID 0 to 7 may be utilized to specify the sub-channels. The MRQ subfield in link adaptation control subfield may be redefined as shown in Table 4.

TABLE 4

| Subfield | Meaning | Definition |
|---|---|---|
| MRQ for Sub-channel 1 | MCS request for sub-channel 1 | May be set to 1 to indicate that MFB for sub-channel 1 is requested. May be set to 0 to indicate that MFB for sub-channel 1 is requested. |
| . . . | . . . | . . . |
| MRQ for Sub-channel N | MCS request for sub-channel N | May be set to 1 to indicate that MFB for sub-channel N is requested. May be set to 0 to indicate that MFB for sub-channel N is requested. |

An MRQ subfield may be defined in an HT control field. In a COBRA example, it may be possible to redefine an HT control field. Alternatively, a COBRA variant may be defined in an HT control field. An MRQ for COBRA subfield defined above may be specified in the COBRA variant. For example, the MFB requester 5010 may transmit a frame 5015 that may include an HT control field that may include an MRQ subfield that indicates one or more MRQ sub-channel IDs.

On receipt of a frame 5015 with an MRQ subfield for which COBRA may be specified, an MFB responder 5020 may initiate computation of the MCS estimate based on the associated sounding PPDU. The computation may be performed based on one ore more sub-channels specified in the request, or more sub-channels than requested. The MFB responder 5020 may transmit a feedback packet 5025 that may include an HT control field that includes an MFB subfield that indicates one or more MFB sub-channel IDs, on a per sub-channel basis. An example MFB subfield for COBRA is shown in Table 5.

TABLE 5

| Subfield | Meaning |
|---|---|
| MFB for Sub-channel 1 | MCS index for sub-channel 1 |
| . . . | . . . |
| MFB for Sub-channel N | MCS index for sub-channel N |

FIG. 51 is a diagram of an example MFB subfield 5100. The MFB subfield 5100 for COBRA may also be transmitted with selected sub-channels. For example, the MFB subfield 5100 may include a sub-channel set subfield 5110 and one or more MCS indeces for a respective number of sub-channels, shown as MFB1 5120 and MFBN 5130. In this example, the sub-channel set subfield 5110 may indicate a set of sub-channel IDs for which the MFB is presented. MFB1 5120 may indicate an MCS index for the first sub-channel indicated in the sub-channel set subfield 5110, and MFBN 5130 may indicate an MCS index for the last sub-channel indicated in the sub-channel set subfield 5110. If a number of data stream is not implied by an MCS index, the number of data stream may also be fed back using the MFB subfield 5100.

FIG. 52 is a diagram of an example implicit CQI estimation procedure 5200 through uplink transmission. In this example, a requester 5210, usually an AP for DL link adaptation, may plan to perform DL link adaptation. The requester 5210 may transmit a packet 5220 that may include a TPC request or an implicit CQI request to a responder 5230. The packet 5220 may be a control frame, a management frame or a data frame. On receiving this packet 5220, the responder 5230, usually a STA for DL link adaptation, may transmit an uplink packet 5240 that may include the power and/or link margin used to transmit the uplink packet 5240. According to the uplink transmit power and link margin, the requester 5210 may calculate a suitable MCS level for downlink transmission.

In a COBRA example, both packets 5220 and 5240 may be transmitted with one or more sub-channels. In this example, the definition of transmit power may be clarified and agreed on by both requester 5210 and responder 5230. For example, both transmit power and sub-channels utilized may be required for implicit CQI estimation at requester side. Sub-channel IDs may be utilized to identify which sub-channels are utilized for transmission.

In a typical IEEE 802.11 example, the purpose of uplink link adaptation may be to adjust the MCS levels according to the quality of the radio link. In this example, a non-AP device may manage the MCS level for itself. By introducing COBRA, an extra requirement for uplink transmission may be to control the transmit power on each sub-channel so that the receive power at the AP side may be aligned. Uplink power control may be managed by the AP. As a related function, MCS selection may also be controlled by the AP.

Figure 53:
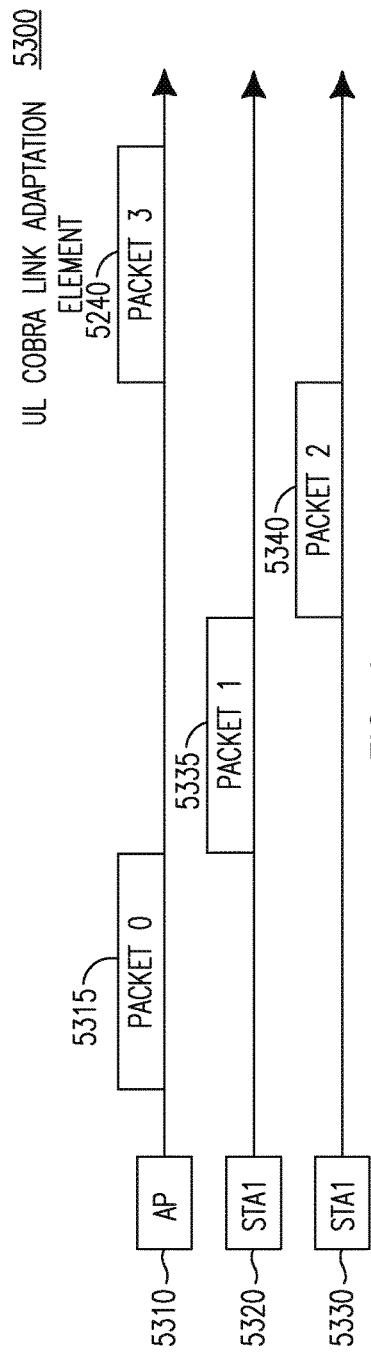
FIG. 53 is a diagram of an example UL COBRA link adaptation and power control procedure.

FIG. 53 is a diagram of an example UL COBRA link adaptation and power control procedure 5300. In this example, the AP 5310 may transmit a UL COBRA TPC request in Packet 0 5315 to STA1 5320 and STA2 5330. STA1 5320 may transmit Packet 1 5335 after a SIFS duration from the end of Packet 0 5315. Transmit power and/or link margin may be indicated in Packet 1 5335. STA1 5320 may also transmit Packet 1 5335 with a delay frame format. After the transmission of Packet 1 5335, the AP 5310 may poll STA2 5330 and STA2 5330 may transmit Packet 2 5340 after a SIFS duration. Transmit power and/or link margin may be indicated in Packet 2 5340. Alternatively, STA2 5330 may transmit Packet 2 5340 immediately after the transmission of Packet 1 5335. Polling from the AP 5310 may be omitted in this way. In yet another alternative, STA2 5330 may transmit a transmit power and/or link margin in a delayed frame. On receiving both Packet 1 5335 and Packet 2 5340, the AP 5310 may calculate the suitable MCS levels and transmit power levels for STA1 5320 and STA2 5330 for uplink transmission, respectively. The AP 5310 may transmit Packet 3 5350 that may include a UL COBRA link adaptation element to both STA1 5320 and STA2 5330. Packet 3 5350 may be transmitted using a UCAF frame.

A UL COBRA link adaptation element may be defined as sub-channel driven or user driven. The sub-channel driven scheme may assign MCS levels and TPC levels based on a sub-channel. Two sub-channels corresponding to the same user may be assigned different MCS levels and TPC levels. In this way, unequal MCS/TPC may be enabled.

Figure 54:
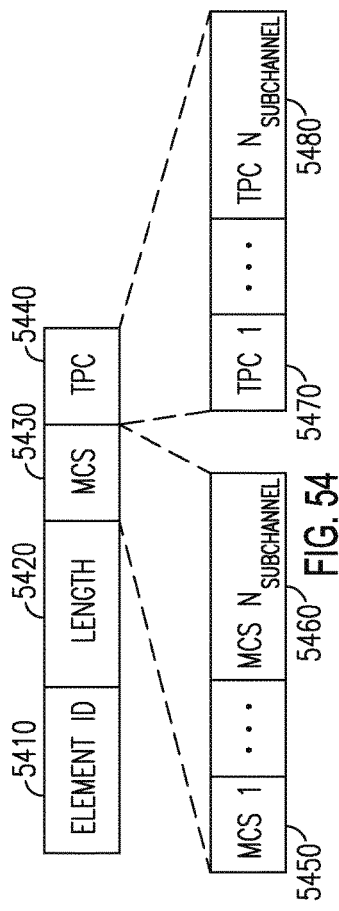
FIG. 54 is a diagram of an example format of a sub-channel driven UL COBRA link adaptation element.

FIG. 54 is a diagram of an example format of a sub-channel driven UL COBRA link adaptation element 5400. The UL COBRA link adaptation element 5400 may include an element ID 5410, a length field 5420, an MCS field 5430, and a TPC field 5440. The MCS field 5430 may include one or more subfields that indicate an MCS assignment for a sub-channel. In this example, MCS 1 5450 may indicate an MCS assignment for sub-channel 1, and MCS Nsub-channel 5460 may indicate an MCS assignment for sub-channel Nsub-channel. The TPC field 5440 may include one or more subfields that indicate a TPC assignment for a sub-channel. In this example, TPC 1 5470 may indicate a TPC assignment for sub-channel 1, and TPC Nsub-channel 5480 may indicate a TPC assignment for sub-channel Nsub-channel. Nsub-channel may be the total number of sub-channels.

Figure 55:
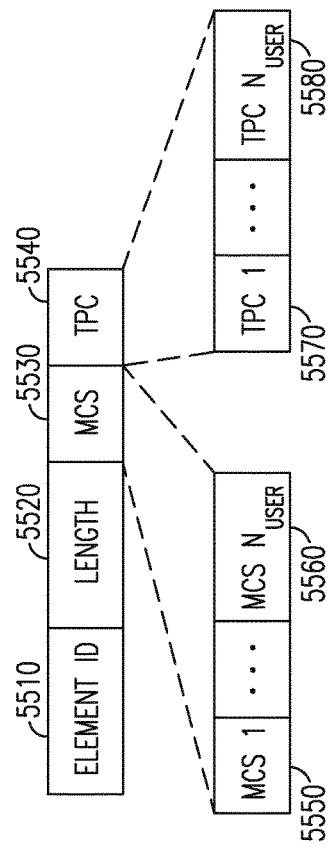
FIG. 55 is a diagram of an example format of a STA driven UL COBRA link adaptation element.

FIG. 55 is a diagram of an example format of a STA driven UL COBRA link adaptation element 5500. The STA driven example may assign MCS levels and TPC levels based on a STA. The UL COBRA link adaptation element 5500 may include an element ID 5510, a length field 5520, an MCS field 5530, and a TPC field 5540. The MCS field 5530 may include one or more subfields that indicate an MCS assignment for a sub-channel. In this example, MCS 1 5550 may indicate an MCS assignment for sub-channel 1, and MCS Nuser 5560 may indicate an MCS assignment for sub-channel Nuser. The TPC field 5540 may include one or more subfields that indicate a TPC assignment for a sub-channel. In this example, TPC 1 5570 may indicate a TPC assignment for sub-channel 1, and TPC Nuser 5580 may indicate a TPC assignment for sub-channel Nuser. Nuser may be the number of STAs for the UL COBRA session.

Although SIFS is used to indicate various inter frame spacing in the examples of the designs and procedures, all other inter frame spacing such as RIFS or other agreed time interval may be applied in the same solutions. It may be understood that uses of the acronym COBRA are interchangeable with references to acronyms for the air interface such as OFDM, OFDMA, SC-FDMA, MCFB, etc.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed:

1. A method for use in an Institute of Electrical and Electronics Engineers (IEEE) 802.11 station (STA), the method comprising:
   receiving a control frame, from an IEEE 802.11 access point (AP), wherein the control frame includes a plurality of per-user information fields for scheduling a plurality of STAs for orthogonal frequency division multiple access (OFDMA) uplink (UL) multi-user (MU) transmission, wherein a first of the plurality of per-user information fields indicates information associated with the IEEE 802.11 STA to be used by the IEEE 802.11 STA in association with an OFDMA UL transmission, wherein the information associated with the IEEE 802.11 STA comprises an allocation of at least one random access resource, an association identifier (AID), a modulation and coding scheme to be used by the IEEE 802.11 STA in association with the OFDMA UL transmission, a coding type to be used in association with the OFDMA UL transmission, and a number of spatial streams to be used in association with the OFDMA UL transmission;
   selecting a random access resource from the allocated at least one random access resource based in part on a value of the AID;
   transmitting an OFDMA UL data frame using the random access resource, as part of an OFDMA UL MU transmission, to the AP in accordance with the received information associated with the IEEE 802.11 STA; and
   receiving, in response to the OFDMA UL data frame, an acknowledgement (ACK) frame from the IEEE 802.11 AP.

2. The method of claim 1, wherein the OFDMA UL data frame is transmitted after receiving the control frame.

3. The method of claim 1, wherein the control frame includes a duration field associated with the IEEE 802.11 STA.

4. An Institute of Electrical and Electronics Engineers (IEEE) 802.11 station (STA) comprising:
   a receiver configured to receive a control frame, from an IEEE 802.11 AP, wherein the control frame includes a plurality of per-user information fields for scheduling a plurality of STAs for orthogonal frequency division multiple access (OFDMA) uplink (UL) multi-user (MU) transmission, wherein a first of the plurality of per-user information fields indicates information associated with the IEEE 802.11 STA to be used by the IEEE 802.11 STA in association with an OFDMA UL transmission, wherein the information associated with the IEEE 802.11 STA comprises an allocation of at least one random access resource, an association identifier (AID), a modulation and coding scheme to be used by the IEEE 802.11 STA in accordance with the OFDMA UL transmission, a coding type to be used in association with the OFDMA UL transmission, and a number of spatial streams to be used in association with the OFDMA UL transmission;

a processor configured to select a random access resource from the allocated at least one random access resource based in part on a value of the AID;

a transmitter configured to transmit an OFDMA UL data frame using the random access resource, as part of an OFDMA UL MU transmission, to the IEEE 802.11 AP in accordance with the received information associated with the IEEE 802.11 STA; and the receiver configured to receive, in response to the OFDMA UL data frame, an acknowledgement (ACK) frame from the IEEE 802.11 AP.

5. The STA of claim 4, wherein the OFDMA UL data frame is transmitted after receiving the control frame.

6. The STA of claim 4, wherein the control frame includes a duration field associated with the IEEE 802.11 STA.

\* \* \* \* \*